(12) United States Patent
Rhoads et al.

(10) Patent No.: US 8,661,066 B2
(45) Date of Patent: *Feb. 25, 2014

(54) SYSTEMS, METHODS, AND SOFTWARE FOR PRESENTING LEGAL CASE HISTORIES

(75) Inventors: Forrest Rhoads, North Oaks, MN (US); Daniel Gannon, Prescott, WI (US); Paul Werner, Apple Valley, MN (US); Steve Hestness, Apple Valley, MN (US); Kimberly Anne Kothe, Cottage Grove, MN (US); Jonathan James Medin, Nerstrand, MN (US); Nick Bieter, St. Paul, MN (US)

(73) Assignee: West Service, Inc., Eagan, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/495,592

(22) Filed: Jun. 13, 2012

(65) Prior Publication Data
US 2012/0317042 A1    Dec. 13, 2012

Related U.S. Application Data

(63) Continuation of application No. 13/339,861, filed on Dec. 29, 2011, now Pat. No. 8,250,118, which is a continuation of application No. 12/857,322, filed on Aug. 16, 2010, now Pat. No. 8,145,675, which is a continuation of application No. 11/370,194, filed on Mar. 6, 2006, now Pat. No. 7,778,954, which is a continuation of application No. 11/182,028, filed on Jul. 13, 2005, now abandoned, which is a continuation-in-part of application No. 09/746,557, filed on Dec. 22, 2000, now Pat. No. 7,529,756, which is a continuation of application No. 09/120,170, filed on Jul. 21, 1998, now abandoned.

(51) Int. Cl.
*G06F 17/00*        (2006.01)

(52) U.S. Cl.
USPC ........... 707/804; 707/798; 707/927; 707/825; 707/822

(58) Field of Classification Search
USPC .................. 707/798, 804, 822, 825, 942, 927
See application file for complete search history.

(56) References Cited

U.S. PATENT DOCUMENTS 5,157,783 A * 10/1992 Anderson et al. ..................... 1/1
5,265,065 A    11/1993 Turtle (Continued)

FOREIGN PATENT DOCUMENTS

WO    WO-97/12334 A1    4/1997
WO    WO-0026795 A1     5/2000

(Continued)

OTHER PUBLICATIONS

"Findlaw Home Page", [online]. [archived on Dec. 1, 2000]. Retrieved from the Internet: <URL: http://web.archive.org/web/20001201222600/my.findlaw.com/>, 7 pgs.

(Continued)

*Primary Examiner* — Sana Al Hashemi
(74) *Attorney, Agent, or Firm* — Edwards Wildman Palmer LLP; David J. Silvia; Christopher J. Capelli

(57) ABSTRACT

Systems and methods for automatically processing a textual document by identifying occurrences of a piece of text having a predetermined format in the textual document; determining a depth-of-treatment value for each piece of formatted text in the textual document, the depth-of-treatment value indicating a depth of treatment in the textual document afforded to the particular piece of formatted text; associating an abstract with each piece of formatted text in the textual document; and generating a data record containing each identified piece of formatted text from the textual document, the depth-of-treatment value and the abstract associated with each piece of formatted text in the textual document.

37 Claims, 125 Drawing Sheets

(56) References Cited

U.S. PATENT DOCUMENTS

| | | | |
|---|---|---|---|
| 5,321,833 | A | 6/1994 | Chang et al. |
| 5,418,948 | A | 5/1995 | Turtle |
| 5,434,932 | A | 7/1995 | Scott |
| 5,488,725 | A | 1/1996 | Turtle et al. |
| 5,497,317 | A | 3/1996 | Hawkins et al. |
| 5,644,720 | A | 7/1997 | Boll et al. |
| 5,708,825 | A | 1/1998 | Sotomayor |
| 5,794,236 | A | 8/1998 | Mehrle |
| 5,815,392 | A | 9/1998 | Bennett et al. |
| 5,819,260 | A | 10/1998 | Lu et al. |
| 5,832,494 | A | 11/1998 | Egger et al. |
| 5,870,770 | A * | 2/1999 | Wolfe .......................... 715/805 |
| 5,940,821 | A | 8/1999 | Wical |
| 5,991,755 | A | 11/1999 | Noguchi et al. |
| 6,038,574 | A | 3/2000 | Pitkow et al. |
| 6,052,657 | A | 4/2000 | Yamron et al. |
| 6,088,692 | A | 7/2000 | Driscoll |
| 6,098,070 | A * | 8/2000 | Maxwell .............................. 1/1 |
| 6,112,202 | A | 8/2000 | Kleinberg |
| 6,128,608 | A | 10/2000 | Barnhill |
| 6,134,344 | A | 10/2000 | Burges |
| 6,157,921 | A | 12/2000 | Barnhill |
| 6,161,130 | A | 12/2000 | Horvitz et al. |
| 6,289,342 | B1 | 9/2001 | Lawrence et al. |
| 6,339,767 | B1 * | 1/2002 | Rivette et al. ................. 707/781 |
| 6,529,911 | B1 | 3/2003 | Mielenhausen |
| 7,523,126 | B2 * | 4/2009 | Rivette et al. ......................... 1/1 |
| 2002/0019741 | A1 | 2/2002 | Heston |
| 2002/0095378 | A1 | 7/2002 | Cauchon et al. |
| 2002/0188521 | A1 | 12/2002 | Kimmel |
| 2002/0198810 | A1 | 12/2002 | Roger |
| 2003/0046307 | A1 * | 3/2003 | Rivette et al. ............. 707/104.1 |
| 2003/0074559 | A1 | 4/2003 | Riggs |
| 2003/0135520 | A1 | 7/2003 | Mitchell et al. |
| 2004/0024775 | A1 | 2/2004 | Kemp |
| 2004/0025048 | A1 | 2/2004 | Porcari et al. |
| 2004/0163050 | A1 | 8/2004 | Matter |
| 2004/0236753 | A1 | 11/2004 | Porcari et al. |
| 2005/0228788 | A1 | 10/2005 | Dahn et al. |
| 2006/0248440 | A1 | 11/2006 | Rhoads et al. |
| 2007/0208649 | A1 * | 9/2007 | Zborovskiy et al. ............ 705/37 |

FOREIGN PATENT DOCUMENTS

| | | |
|---|---|---|
| WO | WO-0067162 A1 | 11/2000 |
| WO | WO-04001556 A2 | 12/2003 |
| WO | WO-2007009054 A2 | 1/2007 |

OTHER PUBLICATIONS

International Search Report for corresponding PCT Application No. PCT/US2006/027302, (Jan. 16, 2007), 4 pgs.

"Learning lexis.com", Lexis Publishing, Dayton OH (2000), 1-32.

"Loislaw Home Page", [online]. [archived Oct. 10, 2001]. Retrieved from the Internet: <URL: http://web.archive.org/web/20011010000639/www.loislaw.com/Doors.htm>, 15 pgs.

"New PDQ Clipping Service Delivers Your Results Automatically!", Password, vol. 12, No. 8, Westlaw, (Aug. 1992), 8-9.

"Nolo Self-Help Law Home Page", [online]. [archived on Feb. 1, 2001]. Retrieved from the Internet: <URL: http://web.archive.org/web/20010201070800/http://nolo.com, 7 pgs.

"Premise Software User Manual", West Publishing Company, St. Paul, MN (1989), 10 pgs.

West Group Announces KeyCite: New Electronic Service to Revolutionize Legal Research [online]. West Group News Release, Jul. 21, 1997. [observed on Jul. 30, 1997]. Retrieved from the Internet: <URL: http://www.westgroup.com/about/presrlse/keycite/announce.htm>, 3 pgs.

"Westlaw.com Home Page" [online]. [archived on Jan. 25, 1999]. Retrieved from the Internet: <URL: http://web.archive.org/web/19990125092722/http://westlaw.com/>, 29 pgs.

Aha, D. W., "Instance-Based Learning Algorithms", Machine Learning, 6 (1991), 37-66.

Al-Kofahi, K., "Combining Multiple Classifiers for Text Categorization", Proceedings of CIKM '01: Tenth International Conference on Information and Knowledge Management, (Atlanta, GA, Nov. 5-10, 2001) (2001), 97-104.

Bueno, T. C., "JurisConsulto: Retrieval in Jurisprudencial Text Bases Using Juridical Terminology", Proceedings of the 7th International Conference on Artificial Intelligence and Law, 1999, 147-155.

Callan, J. P., "The Inquery Retrieval System", Proceedings of the Third International Conference on Database and Expert Systems Applications, Valencia, Spain; Springer-Verlag (1992), 78-83.

Cochard, S. L., et al., "Chapters 2-4", In: Computer-Assisted Legal Research: A Guide to Successful Online Searching, American Bar Association, Chicago, IL (1997), 17-174.

Cohen, W. W., et al., "Joins that Generalize: Text Classification Using WHIRL", Proceedings of the Fourth International Conference on Knowledge Discovery and Data Mining (KDD-98), New York, NY, AAAI Press (1998), 169-173.

Cohen, W. W, et al., "Context-Sensitive Learning Methods for Text Categorization", Proceedings of the Nineteenth Annual International ACM SIGIR Conference on Research and Development in Information Retrieval, Zurich, Switzerland, 1996, 9 pgs.

Creecy, R. H., et al., "Trading MIPS and Memory for Knowledge Engineering: Classifying census returns on the connection machine", Communications of the ACM, 35 (Jul. 1992), 48-63.

Cristianini, N., et al., "Bayesian Voting Schemes and Large Margin Classifiers", In: Advances in Kernel Methods—Support Vector Learning, MIT Press, 1999, 55-67.

Cristianini, N., "Support Vector and Kernel Machines", http://www.support-vector.net/tutorial.htlm (ICML), 2001, 84 pgs.

Danowski, J. A., "WORDIJ: A Word-Pair Approach to Information Retrieval", NIST Special Publication, Gaithersburg, MD, US (Mar. 1, 1993), 131-136.

Dasarathy, B V., "Table of Contents", Nearest Neighbor (NN) Norms: (NN) Pattern Classification Techniques, IEEE Computer Society Press, 1991, 6 pgs.

Harrison, A. , "KeyCite Review" [online]. [archived Jan. 19, 2000]. Retrieved from the Internet: <URL: http://web.archive.org/web/20000119040942/http://www.11rx.com>, 3 pgs.

Hatzivassiloglou, V., et al., "An Investigation of Linguistic Features and Clustering Algorithms for Topical Document Clustering", 23rd Annual International ACM SIGIR Conference on Research and Development in Information Technology, 34, SIGIR 2000: Athens, Greece (Jul. 24, 2000), 224-231.

Hayes, P., et al., "Construe/TIS: a System for Content-Based Indexing of a Database of News Stories", Second Annual Conference on Innovative Applications of Artificial Intelligence (1990), 49-64.

Hopcroft, J., et al., Introduction to Automata Theory, Languages, and Computation Addison-Wesley Publishing Company, Inc. (1979), 139-142.

Iyer, R. D., "Boosting for Document Routing", Proceedings of the Ninth International Conference on Information and Knowledge Management CIKM 2000, McLean, Va, Nov. 6, 2000, 70-77.

Jackson, P., et al., "Information Extraction from Case Law and Retrieval of Prior Cases by Partial Parsing and Query Generation", Proceedings of the 1998 ACM CIKM: 7th International Conference on Information and Knowledge Management, (1998), 14 pgs.

Joachims, T., "Making Large-Scale Support Vector Machine Learning Practical", In: Advances in Kernel Methods—Support Vector Learning, MIT Press (1999), 169-184.

Joachims, T., "SVMlight Support Vector Machine" [online]. [observed on Apr. 4, 2002]. Retrieved from the Internet: <URL: http://www.cs.cornell.edu/People/tj/svm_light/> (2000), 9 pgs.

Kittler, J., "On Combining Classifiers", IEEE Transactions on Pattern Analysis and Machine Intelligence, 20 (Mar. 1998), 226-239.

Kowalski, A., "Case-Based Reasoning and the Deep Structure Approach to Knowledge Representation", Third International Conference on Artificial Intelligence and Law (1991), 21-30.

Kressel, U., "Pairwise Classification and Support Vector Machines", In: Advances in Kernel Methods—Support Vector Learning, MIT Press (1999), 255-268.

Lam, L., "Classifier Combinations: Implementations and Theoretical Issues", Proceedings of the First International Workshop on Multiple

(56) References Cited

OTHER PUBLICATIONS

Classifier Systems MCS 2000 (Lecture Notes in Computer Science, vol. 1857), Cagliari, Italy (2000), 77-86.
Larkey, L. S., et al., "Combining Classifiers in Text Categorization", Proceedings, 19th Annual International ACM SIGIR Conference on Research and Development in Information Retrieval, Zurich, Switzerland (1996), 289-297.
Levenshtein, V. I., "Binary Codes Capable of Correcting Deletions, Insertions, and Reversals", Soviet Physics—Doklady, 10(8) (1966), 707-710.
Lewis, D. D., "Feature Selection and Feature Extraction for Text Categorization", Proceedings of Speech and Natural Language Workshop, Arden House (1992), 212-217.
Masand, B., "Classifying News Stories using Memory Based Reasoning", Proceedings of the Fifteenth Annual International ACM SIGIR Conference on Research and Development in Information Retrieval, Copenhagen, Denmark (1992), 59-65.
McClaren, W., Westlaw® Research Guide, West Group (Feb. 2001), 111-134.
Merkl, D., et al., "En Route to Data Mining in Legal Text Corpora: Clustering, Neural Computation, and International Treaties", 8th International Workshop on Database and Expert Systems Applications (DEXA '97) 1997, 465-470.
Osuna, E.O., et al., "Reducing the Run-time Complexity in Support Vector Machines", In: Advances in Kernel Methods—Support Vector Learning, MIT Press (1999), 271-283.
Papka, R., et al., "Document Classification Using Multiword Features", Proceedings of the 1998 ACM CIKM 7th International Conference on Information and Knowledge Management (CIKM 98), Bethesda, MD (1998), 124-131.
Piacente, A. J., "Part Five: Researching Statutory Authority", In Computer-Assisted Legal Research Unplugged: The User-Friendly Guide to LEXIS®-NEXIS® and WESTLAW®, Montag Multimedia Publishing Company, Chicago, IL (Oct. 1997), 413-456.
Piacente, A. J., "Part One: Introduction to Computer-Assisted Legal Research", In Computer-Assisted Legal Research Unplugged: The User-Friendly Guide to LEXIS®-NEXIS® and WESTLAW®, Montag Multimedia Publishing Company, Chicago, IL (Oct. 1997), 9-76.
Piacente, A. J., Part Three: Performing a Text Search "To Get a Foothold", In Computer-Assisted Legal Research Unplugged: The User-Friendly Guide to LEXIS®-NEXIS® and WESTLAW®, Montag Multimedia Publishing Company, Chicago, IL (Oct. 1997), 165-318.
Piacente, A. J., Part IV—Using Citation Services "To Do the Legwork," In Computer-Assisted Legal Research Unplugged: The User-Friendly Guide to LEXIS®-NEXIS® and WESTLAW®, Montag Multimedia Publishing Company, Chicago, IL (Oct. 1997), 319-412.
Porter, M. F., "An Algorithm for Suffix Stripping", Program, 14(3), (Jul. 1980), 130-137.
Ragas, H., "Four Text Classification Algorithms Compared on a Dutch Corpus", Proceedings of the 21st Annual International ACM-SIGIR Conference on Research and Development in Information Retrieval (SIGIR '98), Melbourne, Aug. 1998, 369-370.
Salton, G., Automatic Text Processing, Addison-Wesley Publishing Company, Reading, MA, 1989, 229-470.
Scholkopf, B., et al., "Chapters 5, 11, 15 and 16", In: Advances in Kernel Methods: Support Vector Learning MIT Press, 1999, 55-67, 169-184, 255-283.
Scholkopf, B., "Statistical Learning and Kernel Methods", Technical Report, MSR-TR-2000-23, Microsoft Research Limited, Cambridge, United Kingdom (Feb. 29, 2000), 33 pgs.
Stanfill, C., et al., "Toward Memory-Based Reasoning", Communications of the ACM 29(12), 1986, 1213-1228.
Tumer, K., "Order Statistics Combiners for Neural Classifiers", Proceedings, World Congress on Neural Networks, (WCNN '95), 1995 International Neural Network Society Annual Meeting, Washington, D.C. (Jul. 17, 1995), 31-34.
Turtle, H. R., "Inference Networks for Document Retrieval", PhD Thesis, Computer and Information Science Department, University of Massachusetts, Oct. 1991, 214 pgs.
Yang, Y., "A Re-Examination of Text Categorization Methods", Proceedings of SIGIR '99, 22nd International Conference on Research and Development in Information Retrieval, New York, NY, Aug. 1999, 42-49.
Yang, Y., "Expert Network: Effective and Efficient Learning form Human Decisions in Text Categorization and Retrieval", Proceedings of the Seventeenth Annual International ACM SIGIR Conference on Research and Development in Information Retrieval, 1994, 13-22.
"U.S. Appl. No. 09/746,557, Response filed Dec. 9, 2008 to Non-Final Office Action mailed Jun. 9, 2008", 6 pgs.
"U.S. Appl. No. 09/746,557 Notice of Allowance mailed Dec. 29, 2008", 12 pgs.
"European Patent Office Application Serial No. 06787239.0, Office Action mailed May 7, 2008", 7 pgs.
"U.S. Appl. No. 09/746,557 Final Office Action mailed Jun. 9, 2008", 17 pgs.
Harrison, A., "KeyCite Review", http://web.archive.org/web/20000119040942/http://www.11xr.com/features/keycite review. htm, (Jan. 19, 2000), 5 pgs.
McKenzie, E. M, "Comparing KeyCite With Shepard's Online", Legal Reference Services Quarterly, 17(3) (1999), 85-99.
International Patent Application No. PCT/US2006/027302, Written Opinion dated Jan. 13, 2008, 5 pgs.
International Patent Application No. PCT/US2006/027302, International Search Report mailed Jan. 16, 2007, 5 pgs.
Australia Patent Application No. 2006268147, Examiner's First Report dated Nov. 5, 2010, 2 pgs.
China Patent Application No. 200680033627.0, First Office Action issued May 11, 2010, 21 pgs.
China Patent Application No. 200680033627.0, Response to First Office Action dated Nov. 25, 2010, 10 pgs.
China Patent Application No. 200680033627.0, Second Office Action issued Dec. 31, 2011, 11 pgs.
China Patent Application No. 200680033627.0, Response to Second Office Action dated Mar. 14, 2012, 21 pgs.
New Zealand Divisional Application No. 591868, Examination Report dated Mar. 29, 2011, 6 pgs.
New Zealand Application No. 565028, Examination Report dated Sep. 22, 2009, 2 pgs.

* cited by examiner

Slide 1

Slide 2

Slide 3

Slide 4

> Some case Histories in text format can be challenging to follow...

FIGURE 11-4

Slide 5

KeyCite case appearing more than once in history result can be confusing!

FIGURE 11-5

Slide 6

FIGURE 11-6

Slide 7

FIGURE 11-7

Slide 8

Slide 11

Slide 12

Slide 13

Slide 15

Slide 18

Slide 19

Westlaw Server Enhancements

- KeyCite engines to build and return xml representation of direct history chain(s)

- Metadata enhancements to meet new display requirements

- Printing via OPD of images created by the client UI

THOMSON
WEST

Slide 20

Slide 22

Metadata enhancements

- Assign an attribute to each court (approx. 5300) to represent court zone:
  - U.S. Supreme Court
  - State High Court
  - Intermediate Court
  - Trial Court
- Assign new attributes to each treatment phrase:
  - Substantive Weight
    - Procedural Motion
    - Full case
  - Lateral Litigation

THOMSON
WEST

FIGURE 11-22

Slide 24

Print enhancements

- New print options
  - Graphical History
  - Graphical History combined with Textual Citing References
- Modify workflow to build a print result from client created image(s)
  - Images stored and retrieved via the Archive service
  - Image key(s) passed to Westlaw server on print request
- Billing changes to allow separate charges for printing graphical results

THOMSON
WEST

FIGURE 11-24

Slide 25

Slide 26
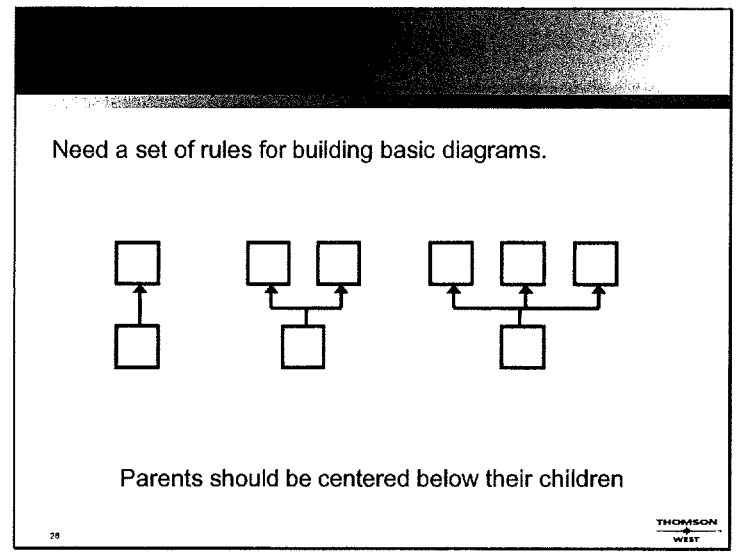
Slide 27
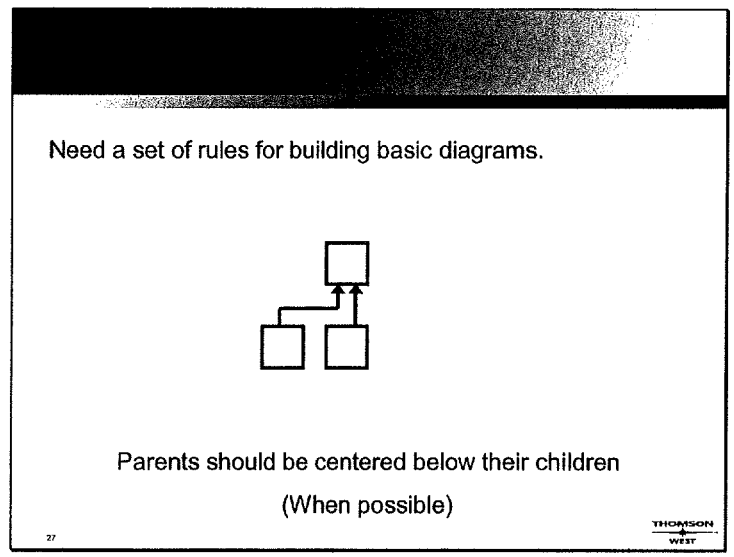
FIGURE 11-26

Slide 28
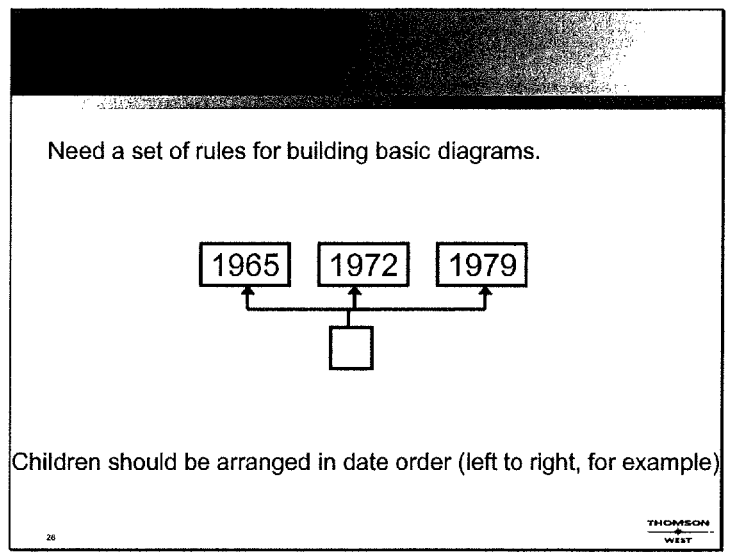
Slide 29
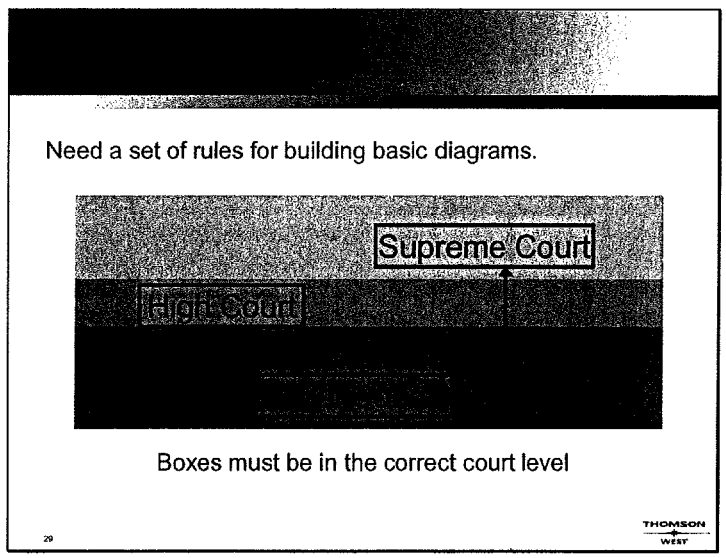
FIGURE 11-27

Slide 30

Slide 32

Relationships
- C -> a
- C -> b
- C -> K
- E -> i
- E -> O
- F -> h
- F -> O
- G -> j

Slide 33
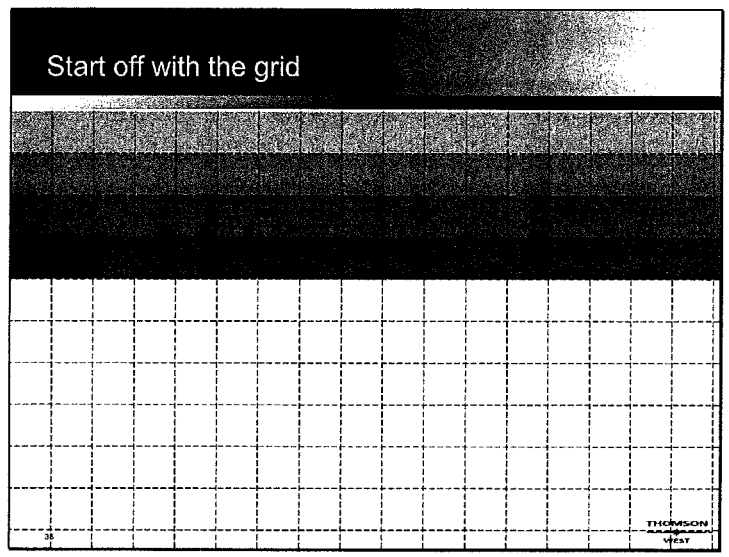
Slide 34
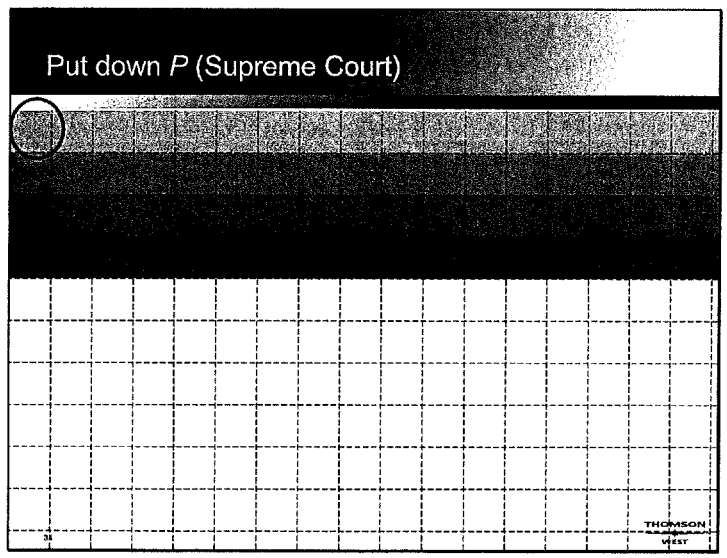
FIGURE 11-31

Slide 35
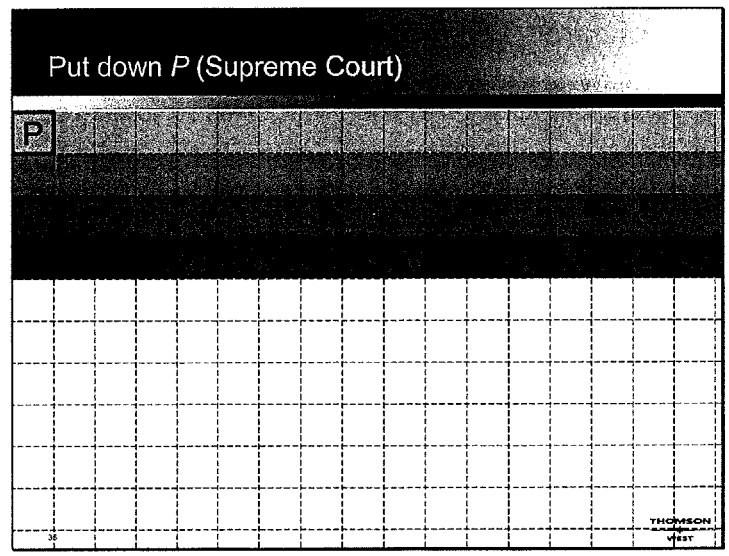
Slide 36
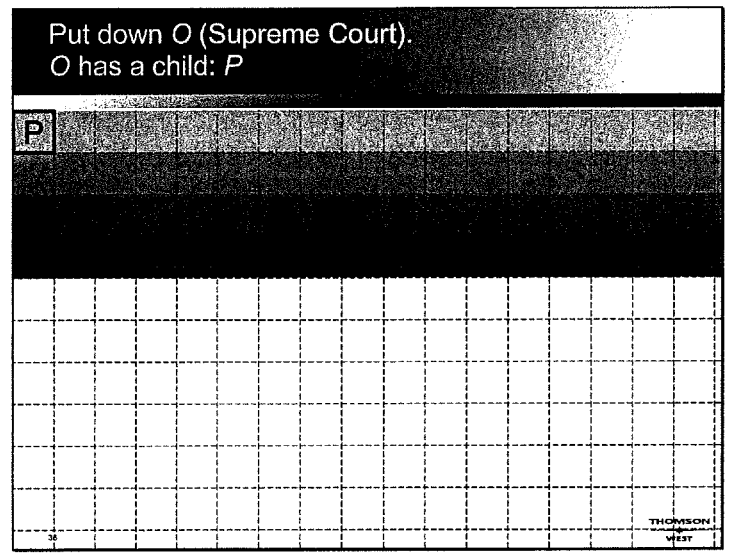
FIGURE 11-32

Slide 37
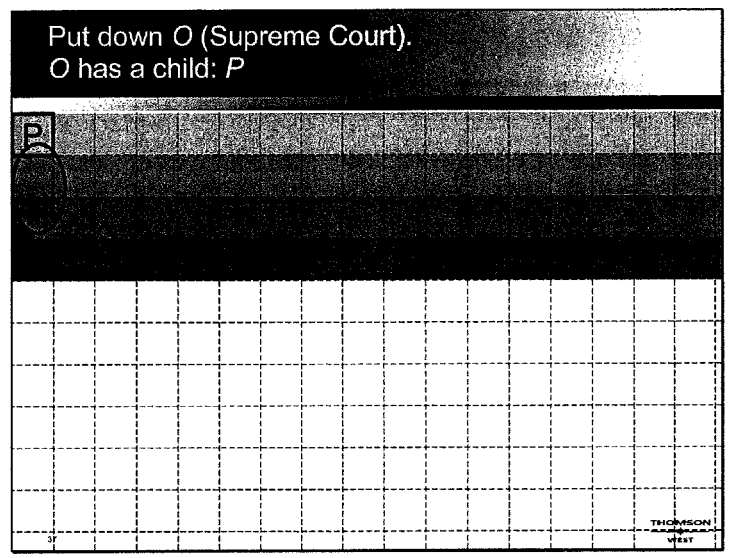
Slide 38
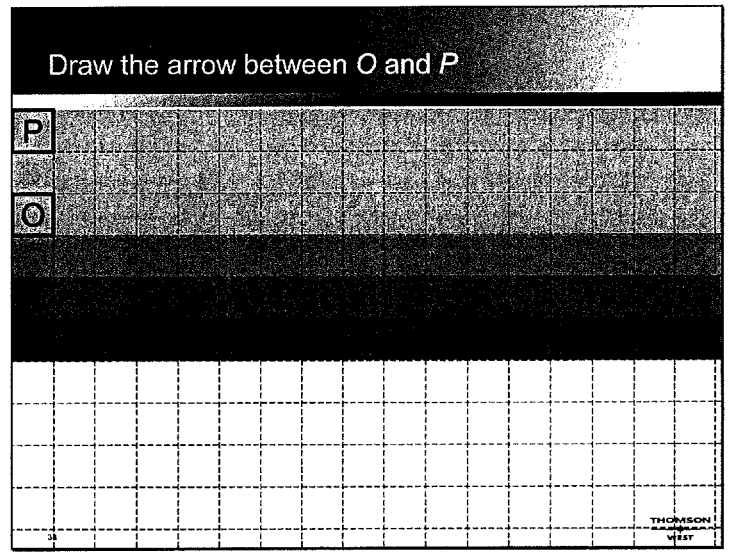
FIGURE 11-33

Slide 39
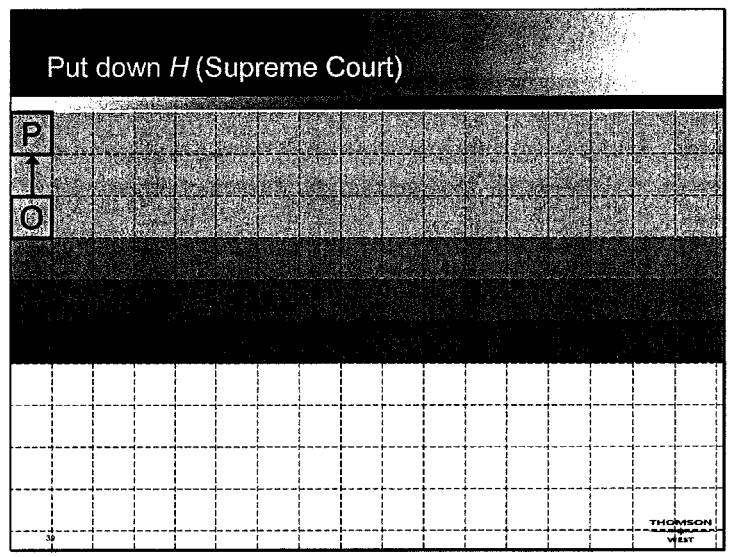
Slide 40
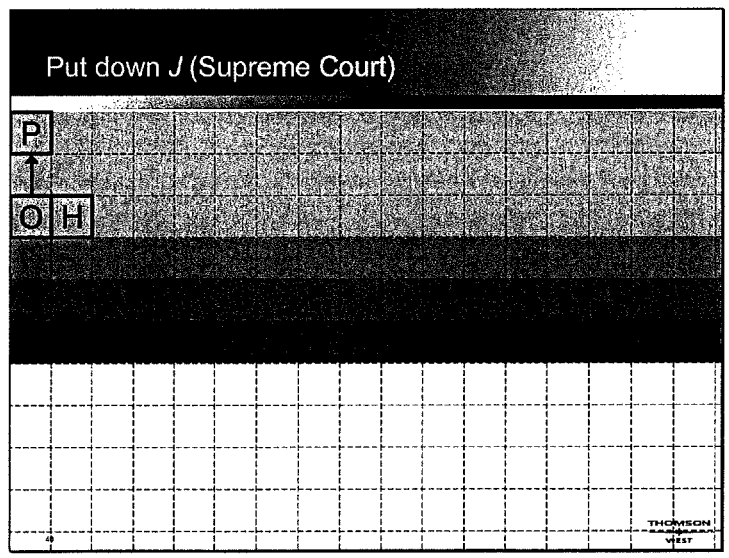
FIGURE 11-34

Slide 41
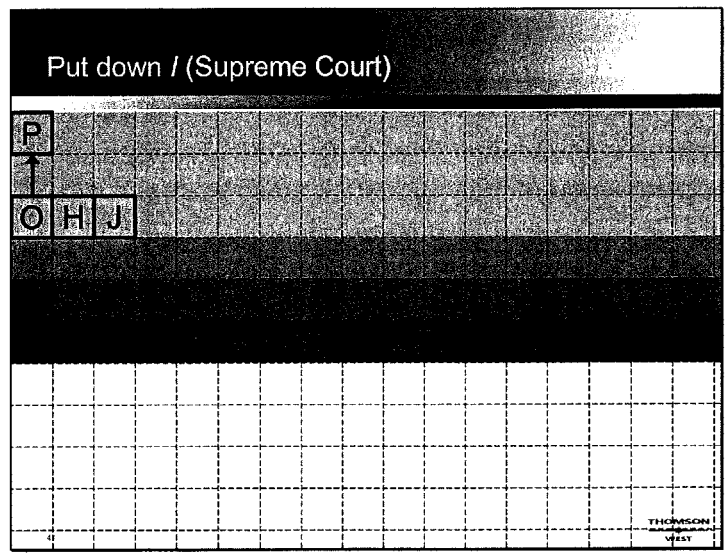
Slide 42
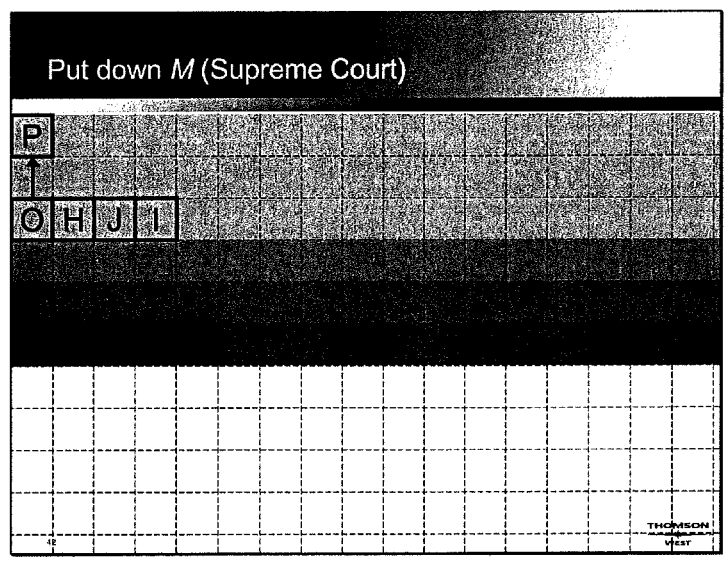
FIGURE 11-35

Slide 43
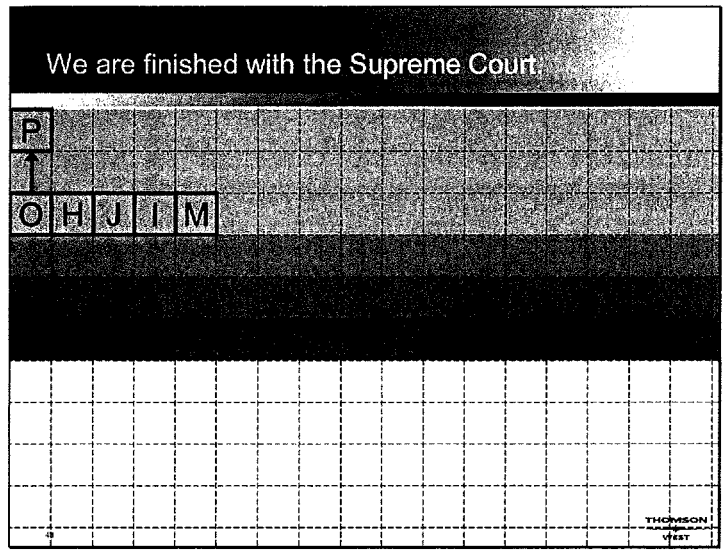
Slide 44
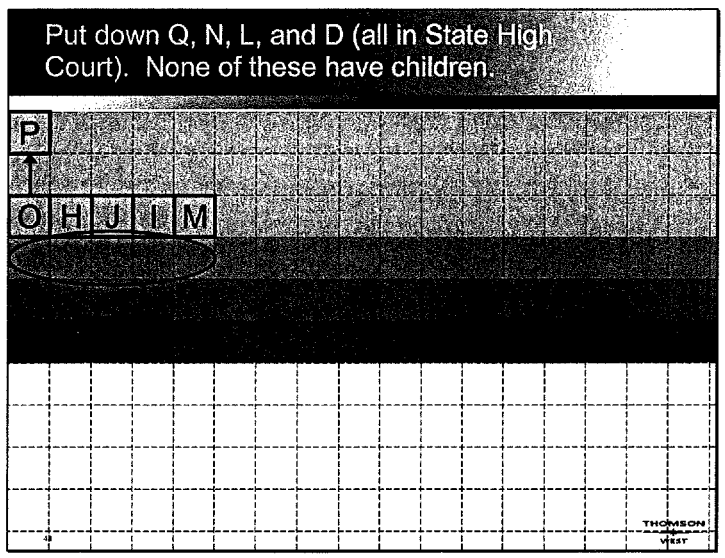
FIGURE 11-36

Slide 45
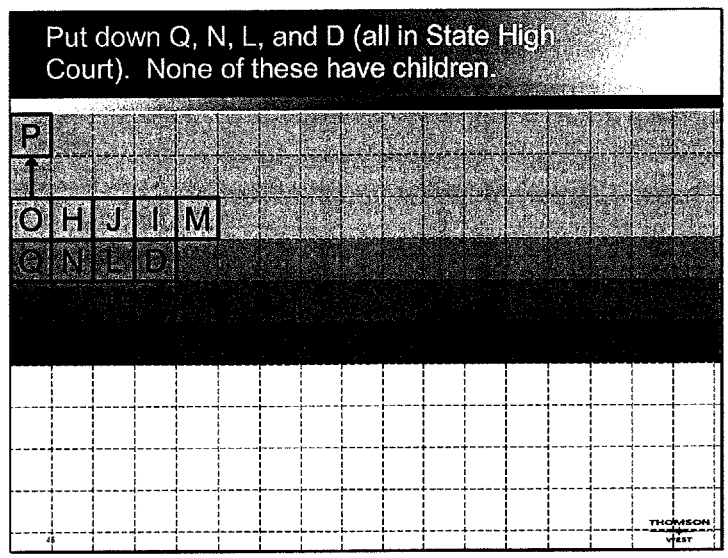
Slide 46
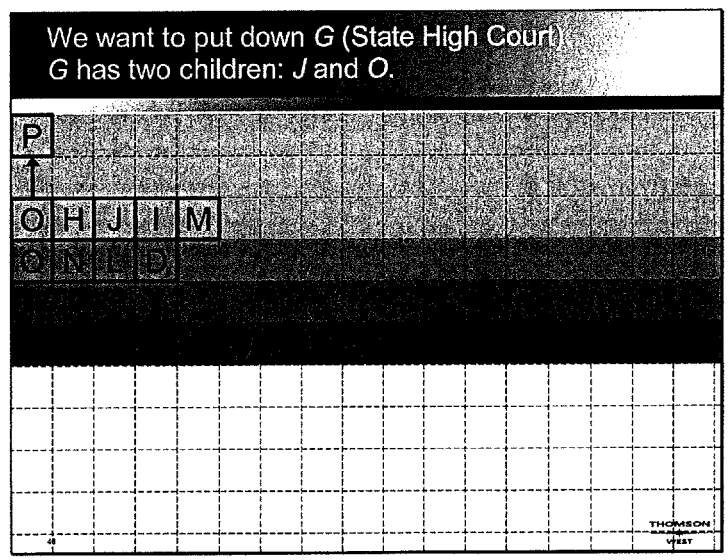
FIGURE 11-37

Slide 47
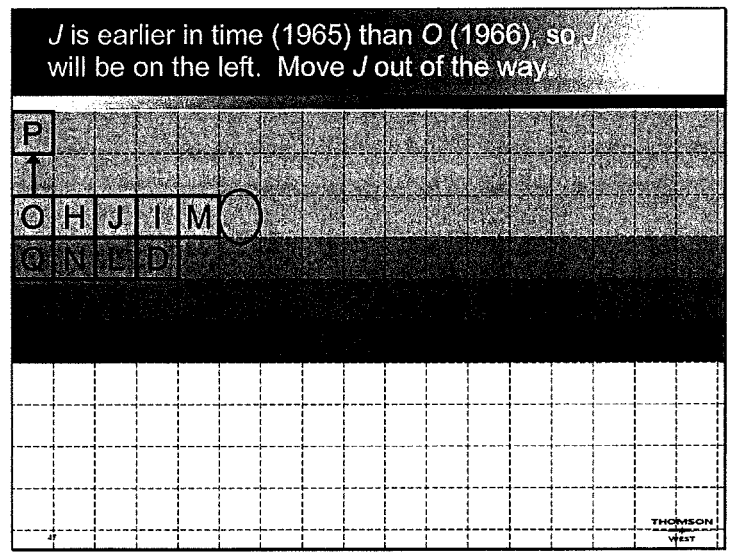
Slide 48
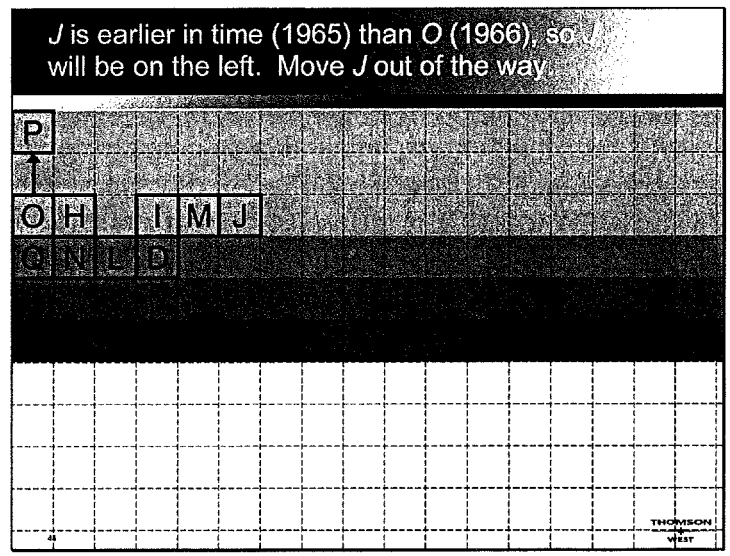
FIGURE 11-38

Slide 49
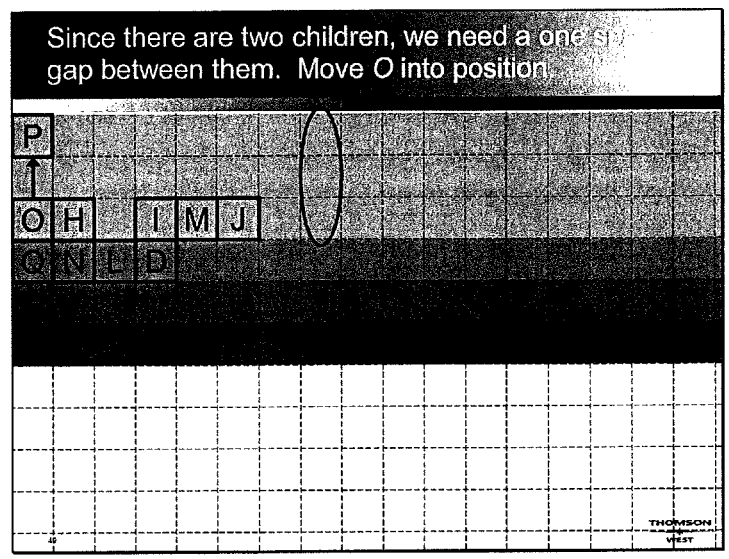
Slide 50
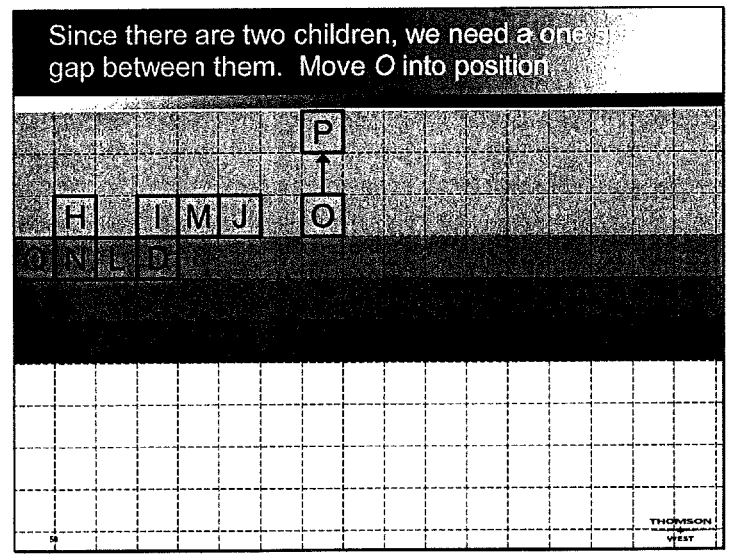
FIGURE 11-39

Slide 51
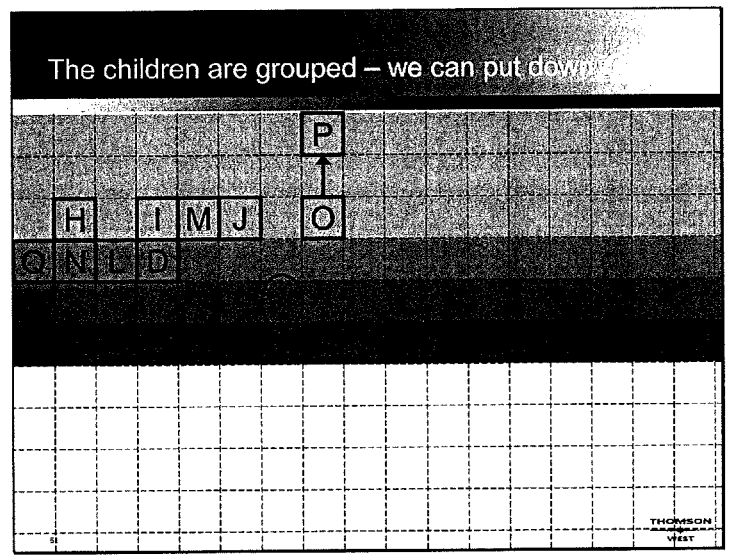
Slide 52
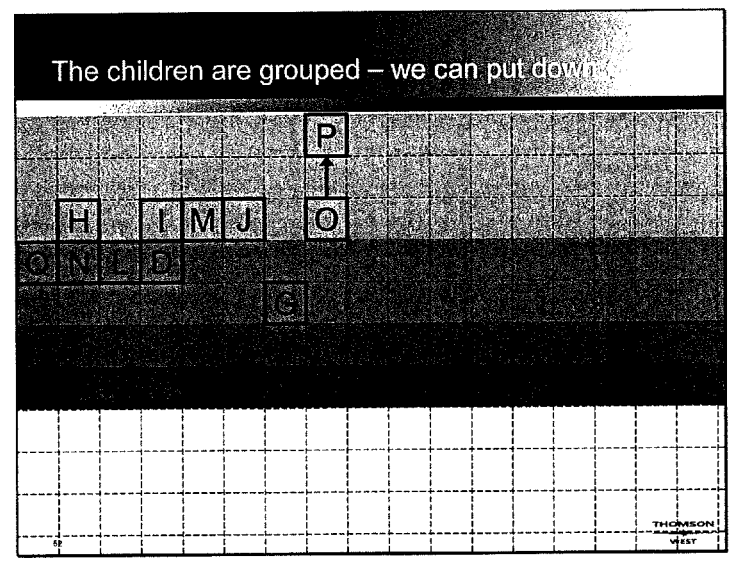
FIGURE 11-40

Slide 53
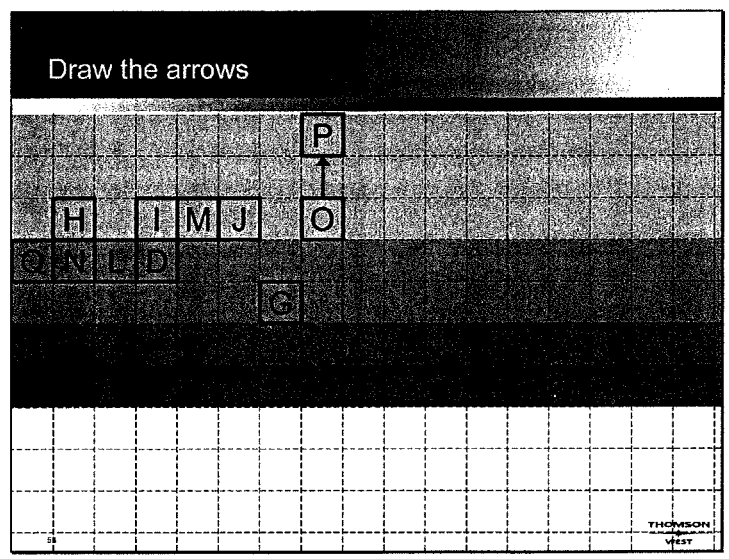
Slide 54
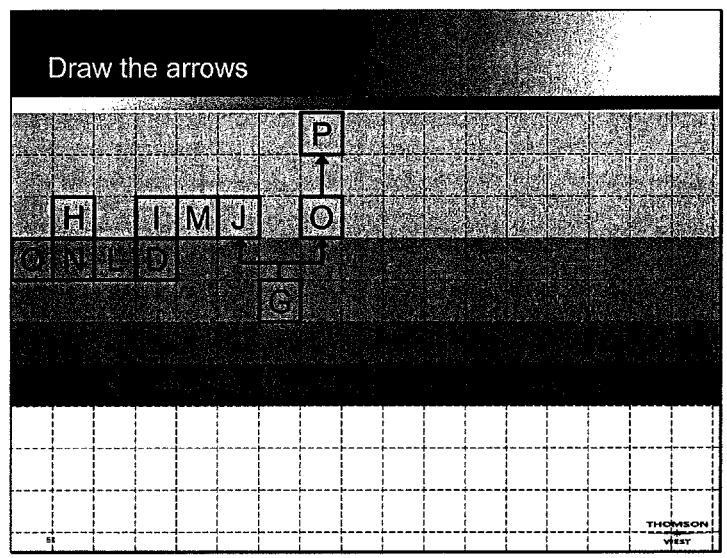
FIGURE 11-41

Slide 55
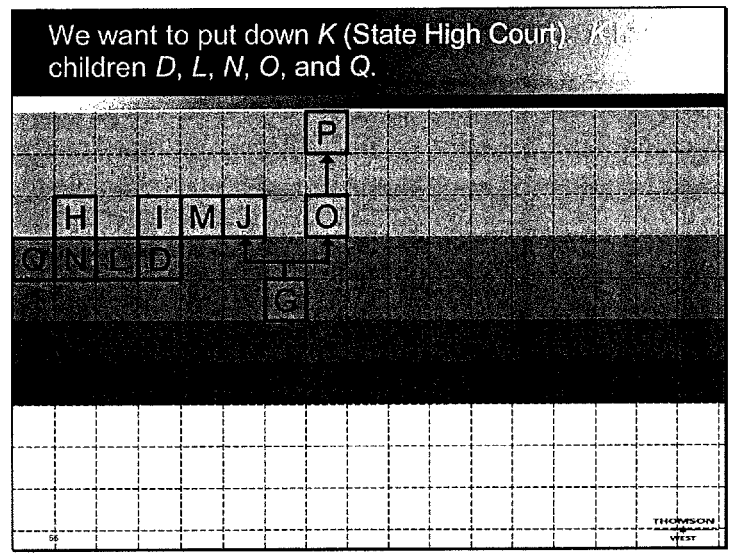
Slide 56
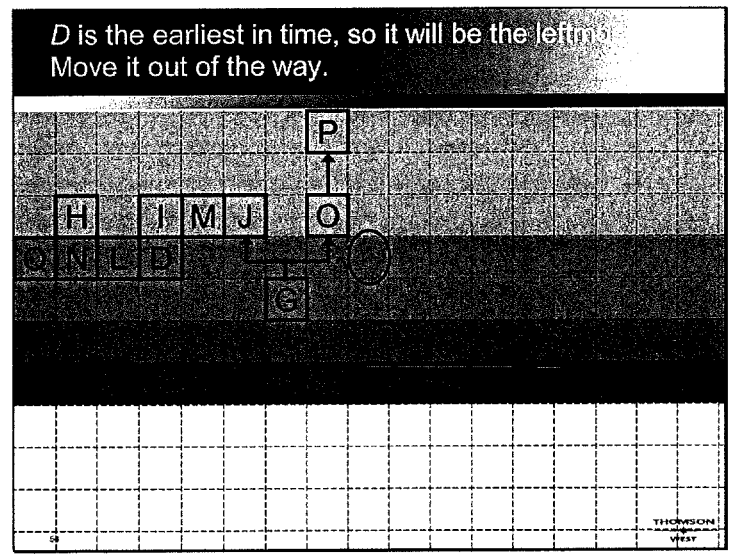
FIGURE 11-42

Slide 57
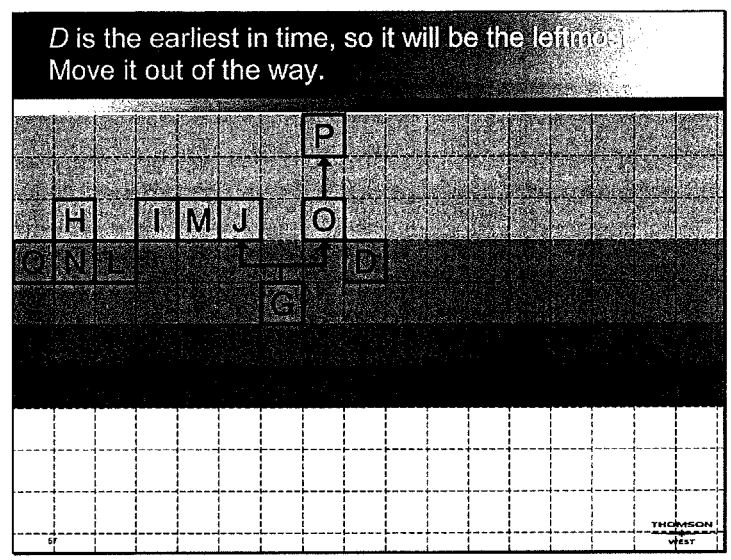
Slide 58
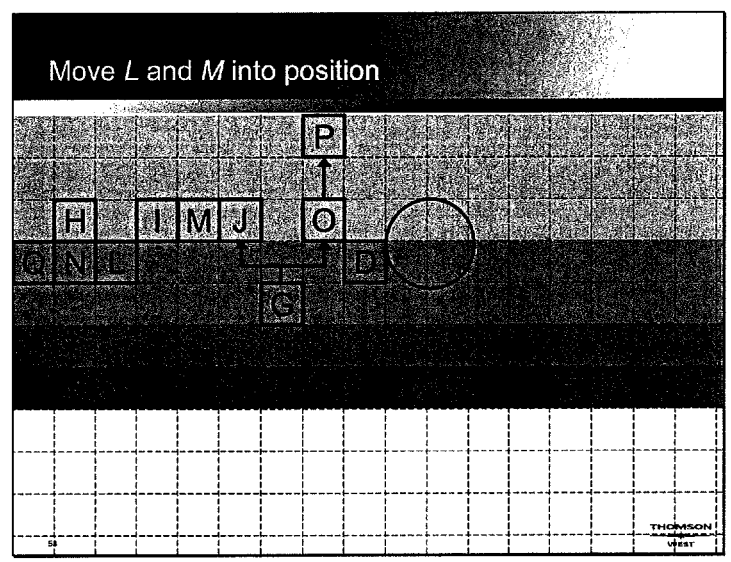
FIGURE 11-43

Slide 59
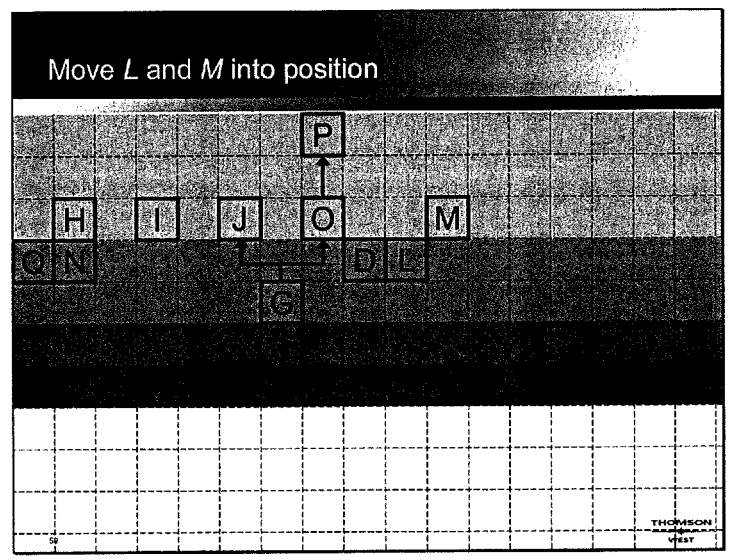
Slide 60
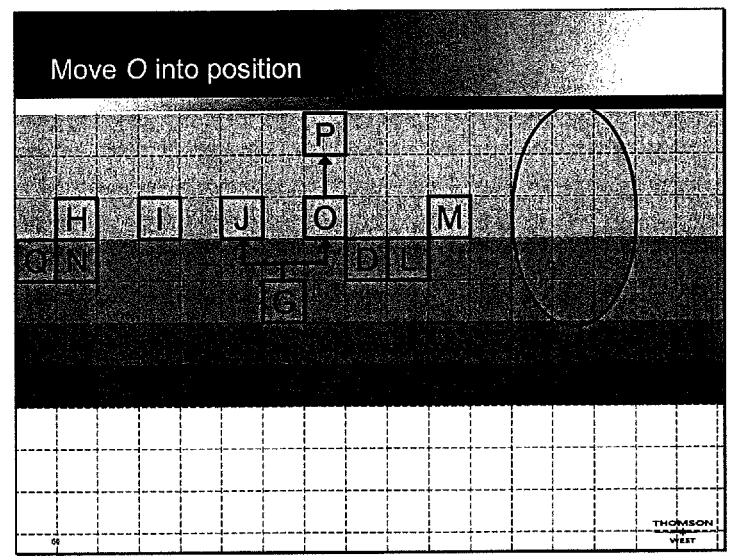
FIGURE 11-44

Slide 61
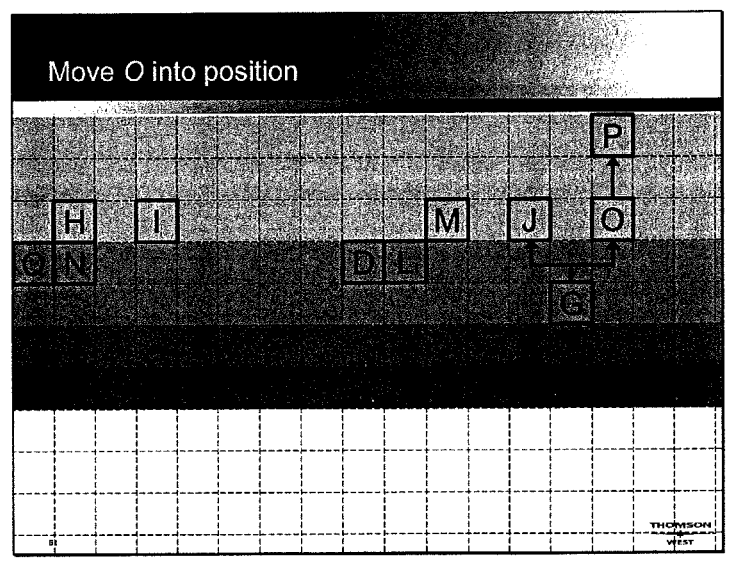
Slide 62
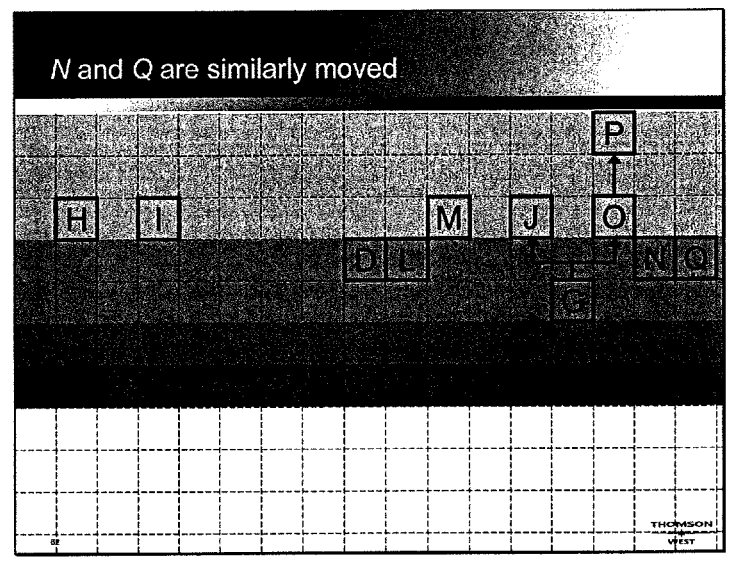
FIGURE 11-45

Slide 63
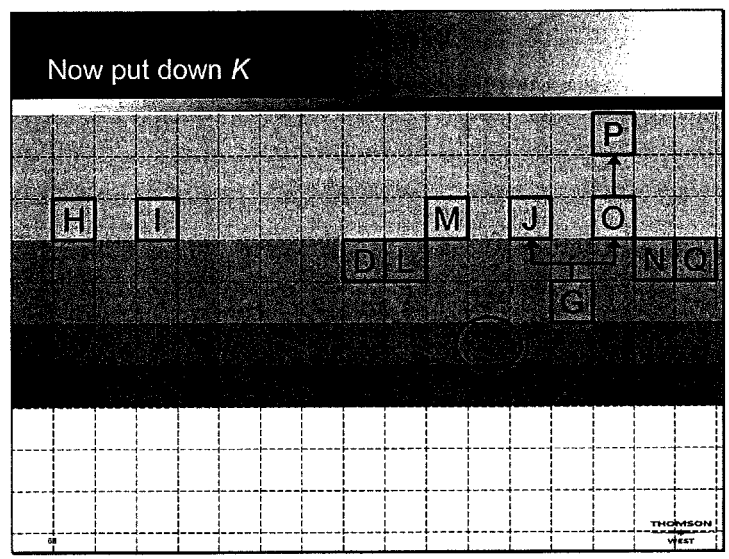
Slide 64
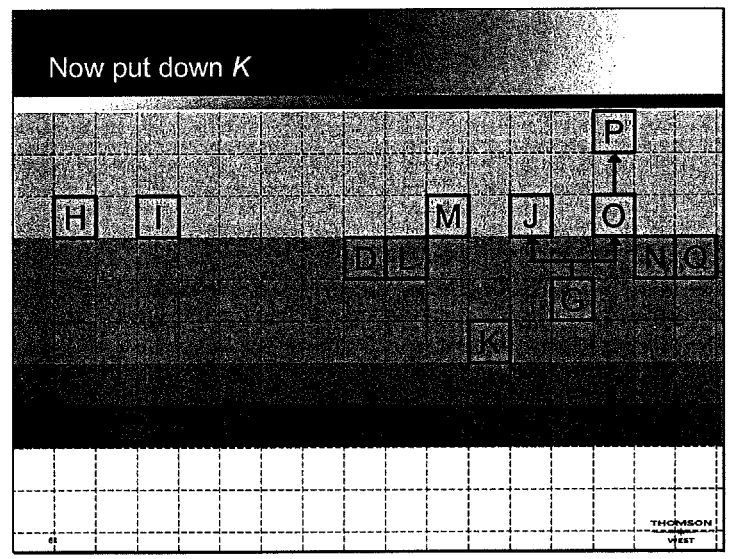
FIGURE 11-46

Slide 65
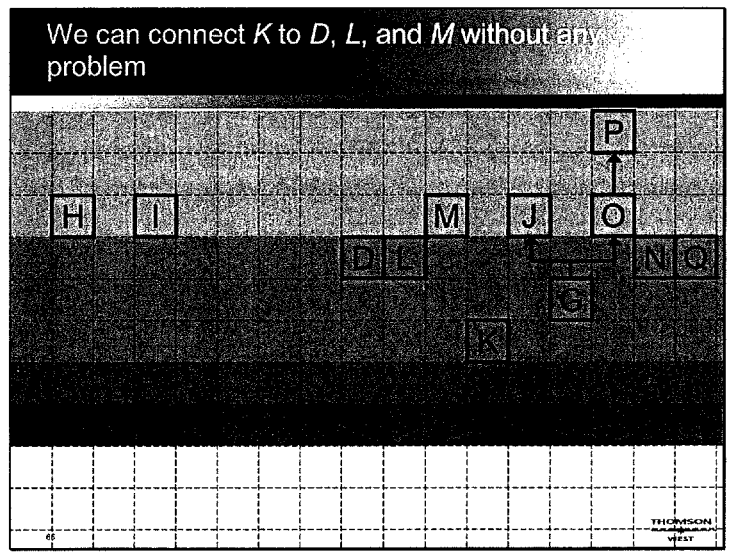
Slide 66
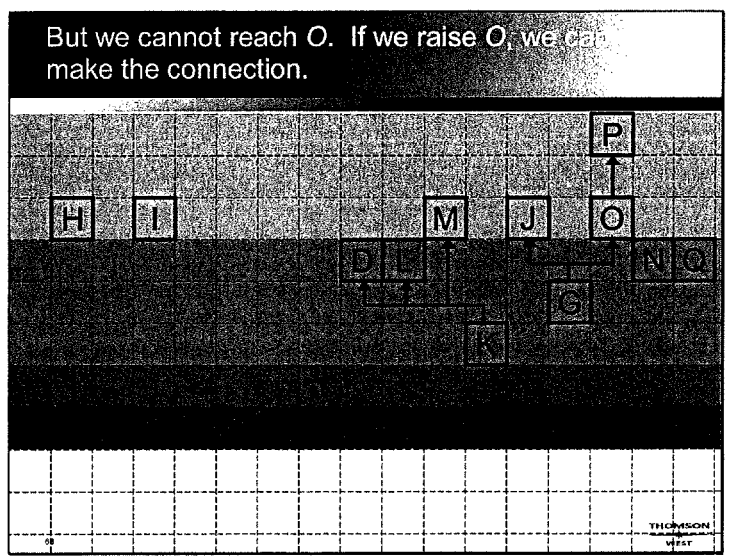
FIGURE 11-47

Slide 67
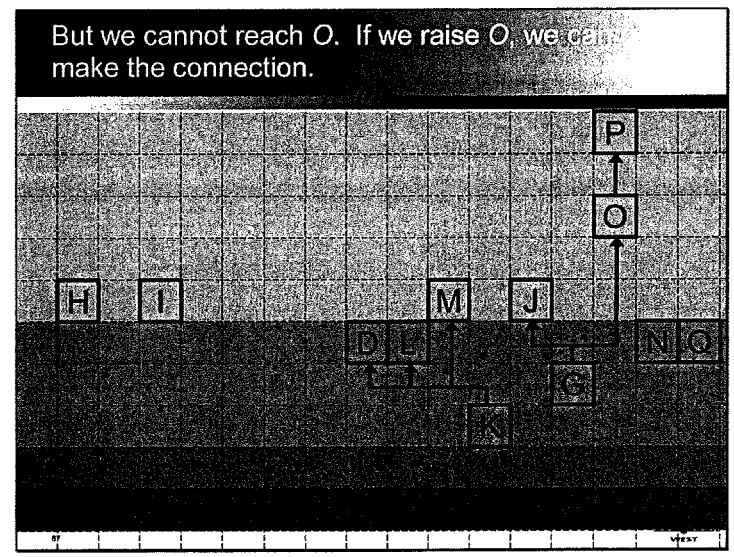
Slide 68
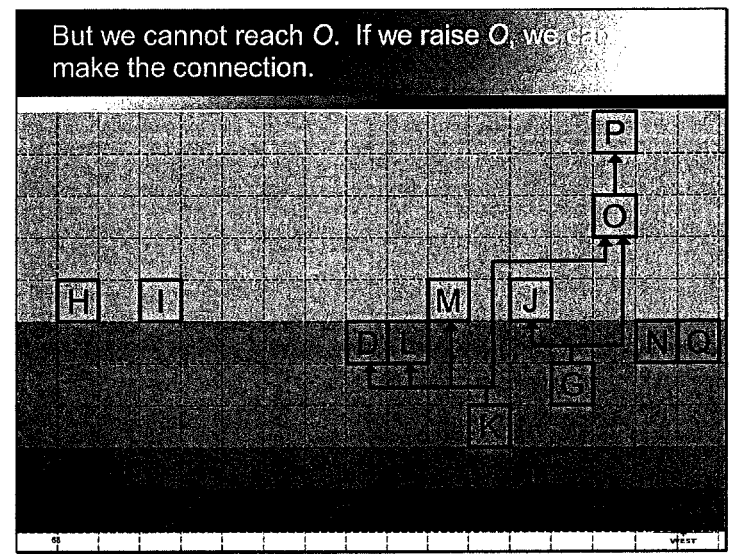
FIGURE 11-48

Slide 69
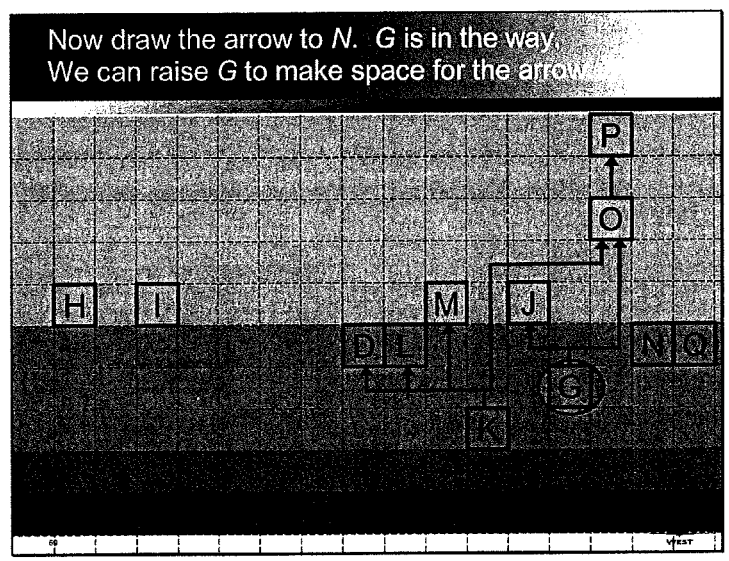
Slide 70
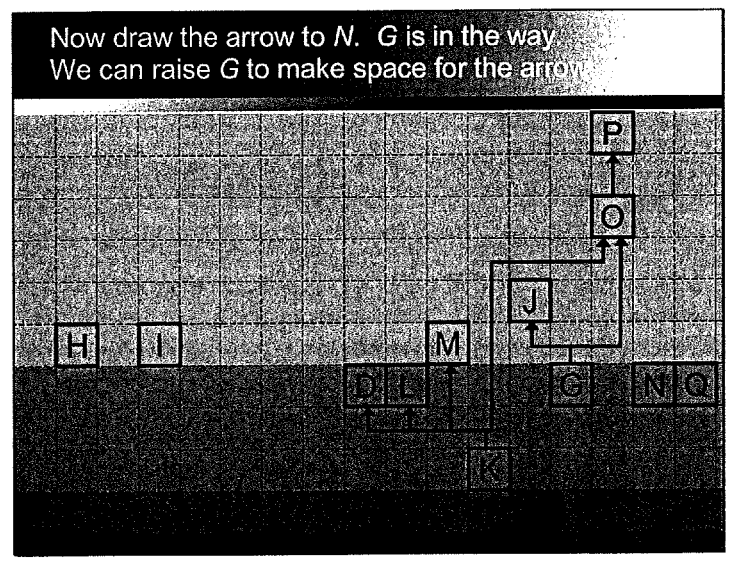
FIGURE 11-49

Slide 71
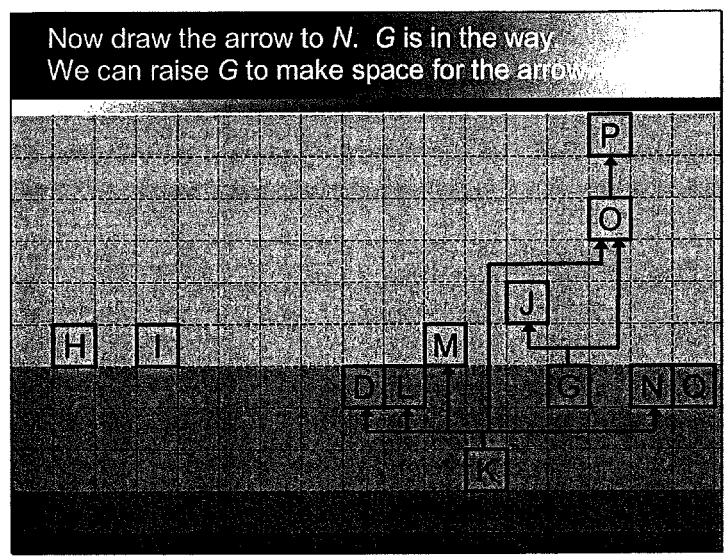
Slide 72
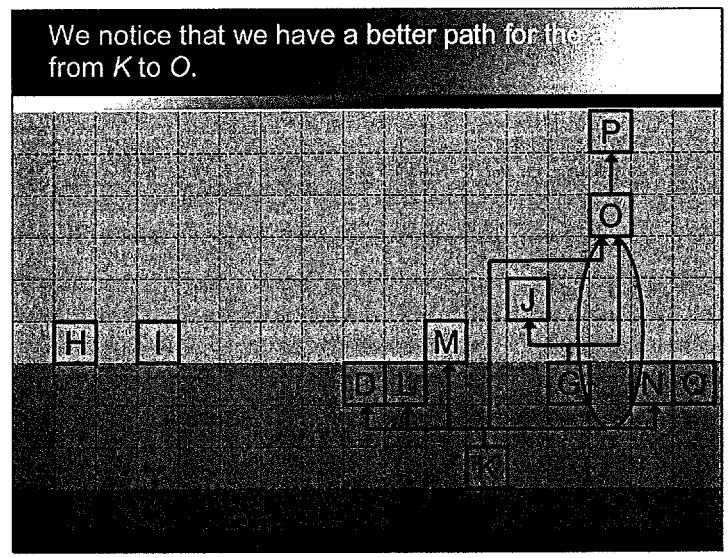
FIGURE 11-50

Slide 73
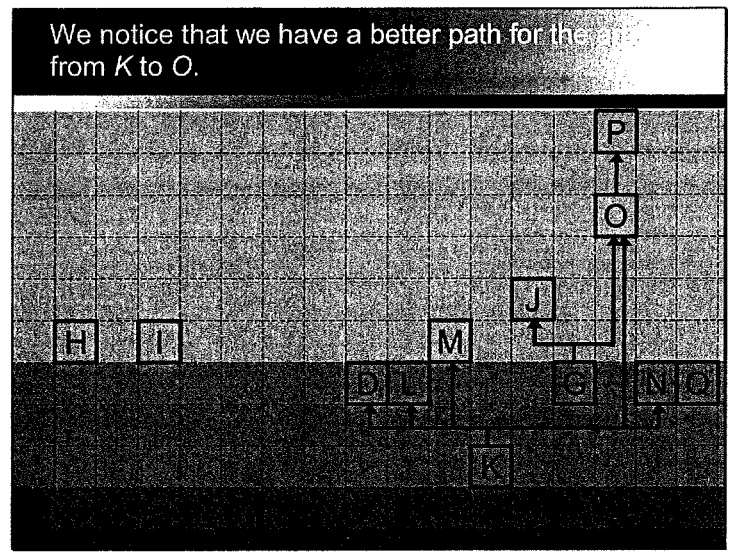
Slide 74
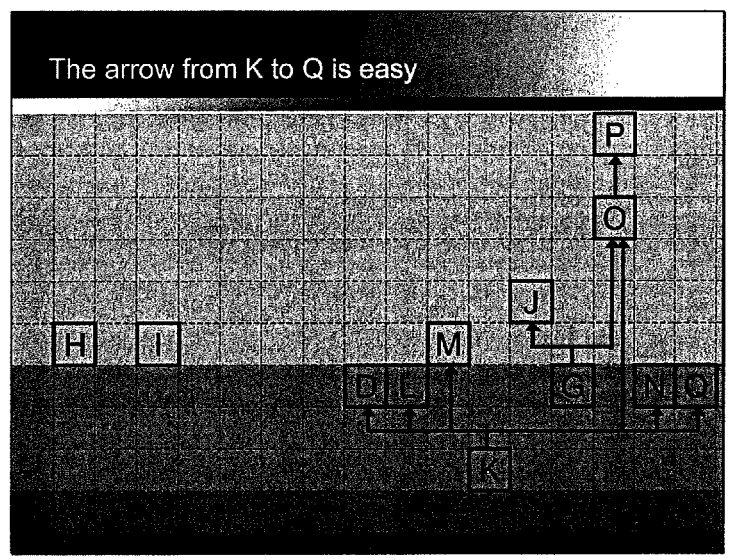
FIGURE 11-51

Slide 75
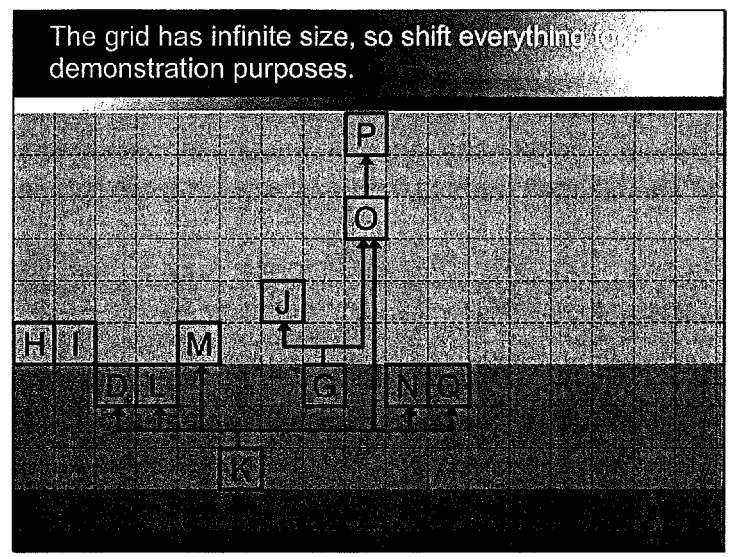
Slide 76
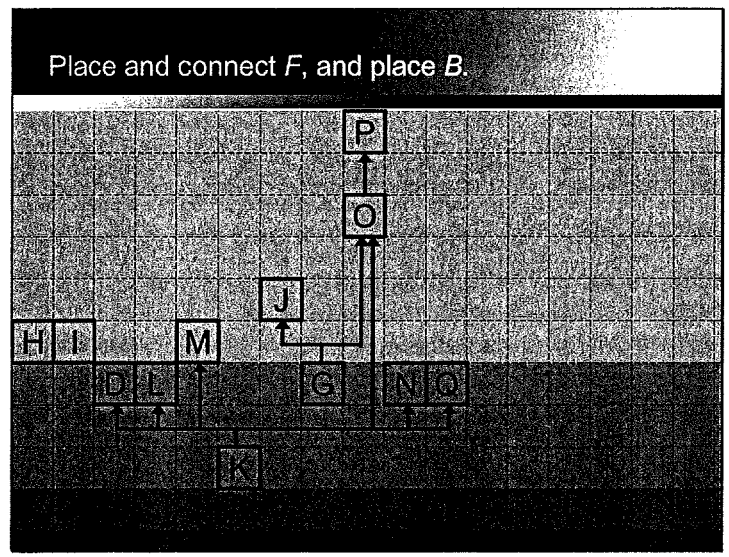
FIGURE 11-52

Slide 77
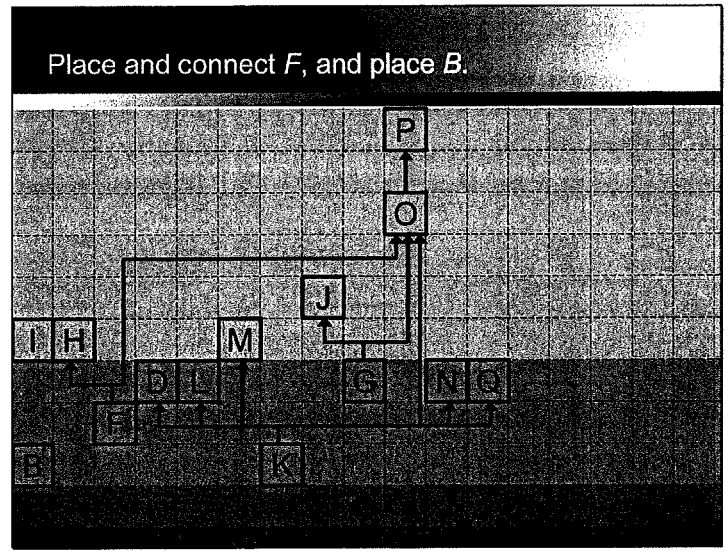
Slide 78
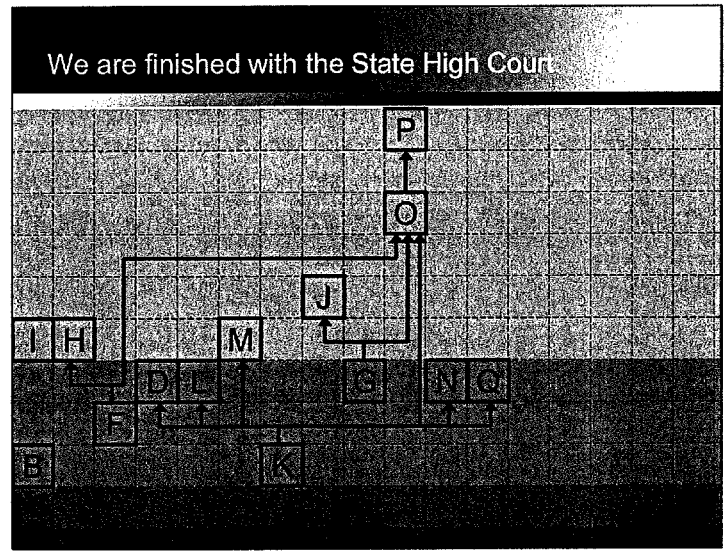
FIGURE 11-53

Slide 79

Slide 81

Rendering
THOMSON WEST

- Use Microsoft Windows GDI+ (Graphical Device Interface)
- Used to draw a bitmap dynamically (vector graphics can also be used.)
- Combination of rectangles, lines, images and text.

FIGURE 11-56

Slide 82

Slide 83

Slide 85

Slide 88

Slide 89

Slide 90

Slide 91

Slide 92

Slide 93

Slide 94

Slide 95

Slide 96

Slide 97

Slide 100

Slide 101

Slide 102

Slide 103

Slide 104

Case Box Layout

Procedural Motion Box Layout

Scenarios

Legend:
    Full Case = UPPER CASE = | A | lower case = procedural motion = | a |

| 1 | *Scenario:*<br>A->B: A is a parent of B<br>A & B are in court 1<br><br>*Rules:*<br>- Parents are centered below their children.<br>- Non-remand relationship arrows should enter from the bottom of the box. | 1<br><br>                B<br>                ↑<br>                A |
| 2 | *Scenario:*<br>A -> B: A is a parent of B<br>A -> C: A is a parent of C<br>A, B & C are in court 1<br><br>*Rules:*<br>- Parents are centered below their children.<br>- Non-remand relationship arrows should enter from the bottom of the box. | 1<br><br>   B    C<br>   ↑    ↑<br>    A |

FIGURE 13-1

| | | |
|---|---|---|
| 3 | *Scenario:*<br>A -> B: A is a parent of B<br>A -> C: A is a parent of C<br>A -> D: A is a parent of D<br>A, B, C & D are in court 1<br><br>*Rules:*<br>• Parents are centered below their children.<br>• When there is a T intersection between a parent and child, the bottom vertical line will be offset. | 1<br><br>　　D　　B　　C<br>　　↑　　↑　　↑<br>　　　　　A |
| 4 | *Scenario:*<br>A -> B: A is a parent of B<br>A -> C: A is a parent of C<br>D -> B: D is a parent of B<br>A, B, C & D are in court 1<br><br>*Rules:*<br>• Parents are centered below their children.<br>• Non-remand relationship arrows should enter from the bottom of the box. | 1<br><br>　　B　　　C<br>　↑↑　　↑<br>　D　　A |
| 5 | *Scenario:*<br>A -> B: A is a parent of B<br>B is in court 1<br>A is in court 2<br><br>*Rules:*<br>• Parents are centered below their children.<br>• Non-remand relationship arrows should enter from the bottom of the box. | 1　　　　B<br>　　　　↑<br>2　　　　A |

FIGURE 13-2

| | | |
|---|---|---|
| 6 | *Scenario:*<br>A -> B: A is a parent of B<br>A -> C: A is a parent of C<br>B & C are in court 1<br>A is in court 2<br><br>*Rules:*<br>• Parents are centered below their children.<br>• Non-remand relationship arrows should enter from the bottom of the box.<br>• The relationship split will occur in the court level of the parent. | 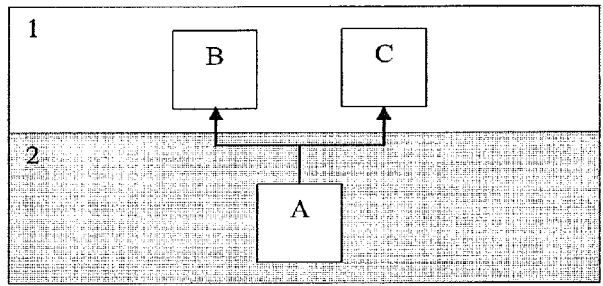 |
| 7 | *Scenario:*<br>A -> B: A is a parent of B<br>A -> C: A is a parent of C<br>C is in court 1<br>A & B are in court 2<br><br>*Rules:*<br>• Parents are centered below their children.<br>• Non-remand relationship arrows should enter from the bottom of the box.<br>• The relationship split will occur in the court level of the parent. | 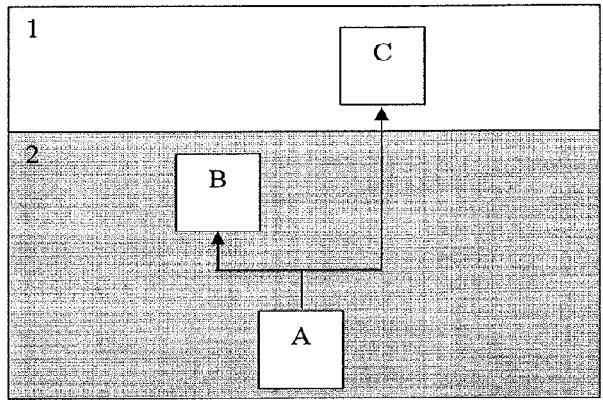 |

FIGURE 13-3

| 8 | *Scenario:*<br>A -> B: A is a parent of B<br>A -> C: A is a parent of C<br>C is in court 1<br>B is in court 2<br>A is in court 3<br><br>*Rules:*<br>▪ Parents are centered below their children.<br>▪ Non-remand relationship arrows should enter from the bottom of the box.<br>▪ The relationship split will occur in the court level of the parent. | 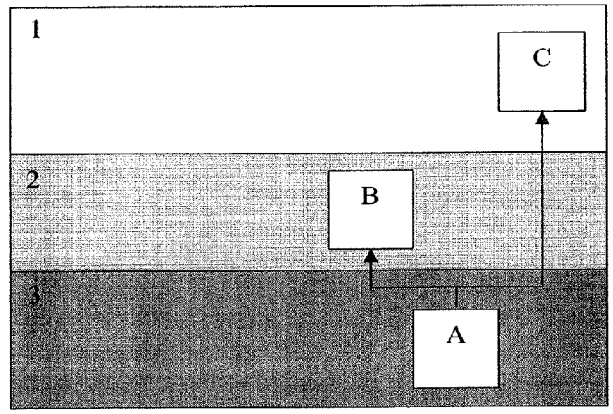 |
|---|---|---|
| 9 | *Scenario:*<br>A->B: A is a parent of B<br>B->C: B sends case down to C<br>B is in court 1<br>A & C are in court 2<br><br>*Rules:*<br>▪ Parents are centered below their children.<br>▪ Non-remand relationship arrows should enter from the bottom of the box.<br>▪ Cases sent down will start with a line from the right of the case to the top of the case sent down to. | 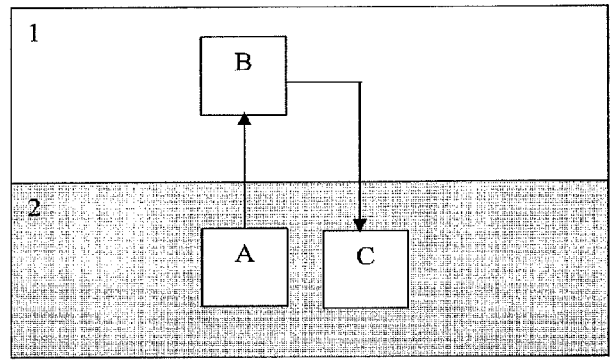 |

FIGURE 13-4

| 10 | *Scenario:*<br>A->B: A is a parent of B<br>B->C: B sends case down to C<br>B->D: B sends case down to D<br>B is in court 1<br>A, C & D are in court 2<br>A (01/01/00)<br>B (02/01/00)<br>C (03/01/00)<br>D (04/01/00)<br><br>*Rules:*<br>- Parents are centered below their children.<br>- Non-remand relationship arrows should enter from the bottom of the box.<br>- Cases sent down will start with a line from the right of the case to the top of the case sent down to.<br>- When there is more than one case sent down from a single parent, the line from the right of the parent will continue on to accommodate the additional cases. | 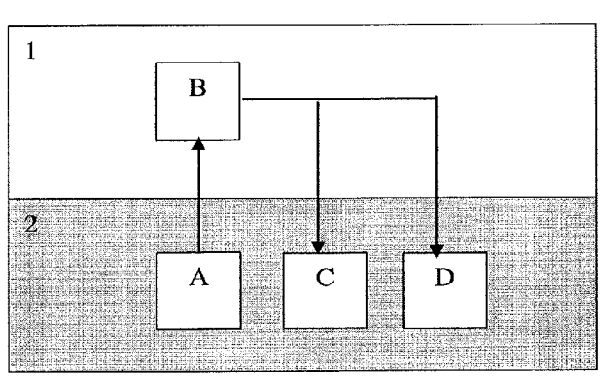 |

FIGURE 13-5

| 12 | Scenario:<br>A->B: A is a parent of B<br>B->C: B sends case down to C<br>C->D: C is a parent of D<br>C->E: C is a parent of E<br>B, D & E are in court 1<br>A & C are in court 2<br>A (01/01/00)<br>B (02/01/00)<br>C (03/01/00)<br>D (04/01/00)<br><br>Rules:<br>• Parents are centered below their children.<br>• Non-remand relationship arrows should enter from the bottom of the box.<br>• Cases sent down will start with a line from the right of the case to the top of the case sent down to.<br>• Parents that have a line coming into the top of the case will have a line coming out of the right that will then connect to it's children. | 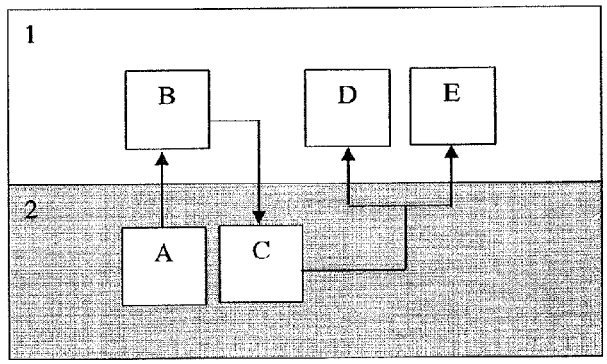 |

FIGURE 13-7

| 13 | Scenario:<br>A->B: A is a parent of B<br>A->C: A is a parent of C<br>B->C: B is a parent of C<br>B is in court 1<br>A & C are in court 2<br><br>Rules:<br>- Parents are centered below their children.<br>- Non-remand relationship arrows should enter from the bottom of the box.<br>- Cases sent down will start with a line from the right of the case to the top of the case sent down to. | 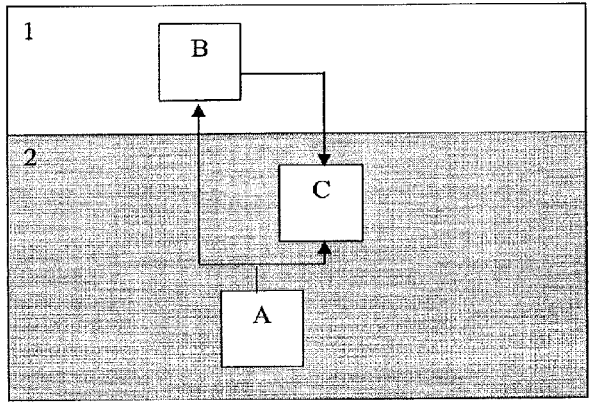 |
|---|---|---|
| 14 | Scenario:<br>A->B: A is the parent of B<br>A & B's relationship is "Appeal after Remand"<br>A & B are in court 1<br><br>Rules:<br>- Parents will be drawn to the left of a child, when they are in the same court level and there relationship is on the Lateral Litigation list. | 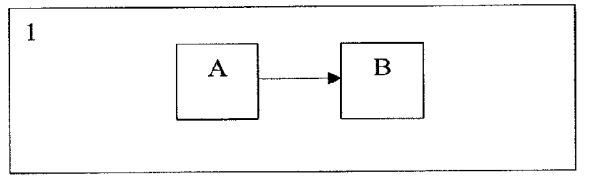 |

FIGURE 13-8

| 15 | *Scenario:*<br>A->B: A is the parent of B<br>A & B's relationship is "Appeal after Remand"<br>A is in court 2<br>B is in court 1<br><br>*Rules:*<br>• Parents are centered below their children.<br>• Non-remand relationship arrows should enter from the bottom of the box.<br>• When the parent and child's relationship is on the Lateral Litigation list, but they are not in the same court level the Lateral Litigation will not be used to determine the placement. | 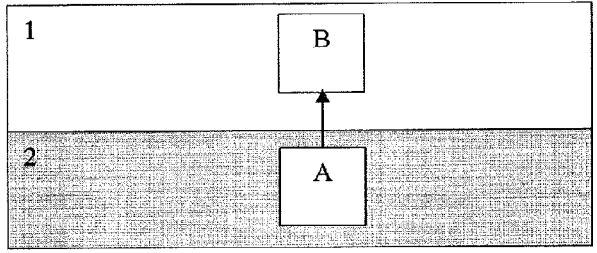 |
|---|---|---|
| 16 | *Scenario:*<br>A->B: A is the parent of B<br>A->C: A is the parent of C<br>A & B's relationship is "Appeal after Remand"<br>A & C's relationship is "Appeal after Remand"<br>A, B & C are in court 1<br><br>*Rules:*<br>• Parents will be drawn to the left of a child, when they are in the same court level and there relationship is on the Lateral Litigation list. | 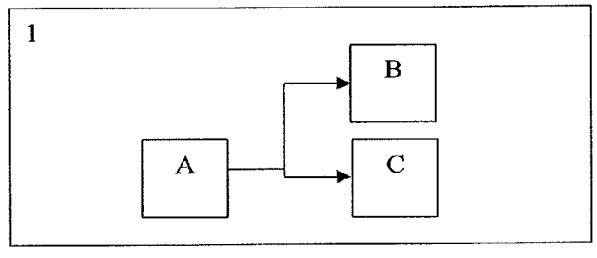 |

FIGURE 13-9

| 17 | Scenario:<br>A->C: A is a parent of C<br>B->C: B is a parent of C<br>C is in court 1<br>A & B are in court 2<br><br>Rules:<br>• Parents are centered below their children.<br>• Non-remand relationship arrows should enter from the bottom of the box.<br>• If a parent cannot be centered below a child, it will be offset below a child. | 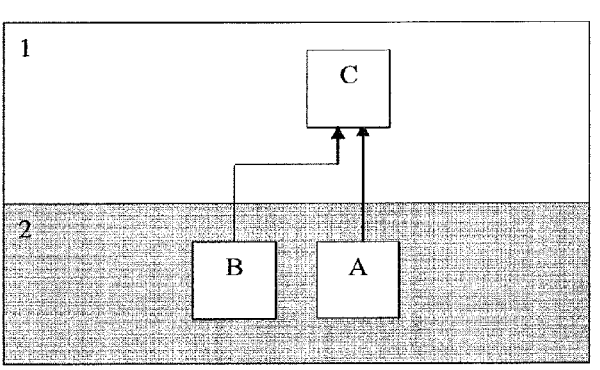 |
| --- | --- | --- |
| 18 | Scenario:<br>A->D: A is a parent of D<br>B->D: B is a parent of D<br>C->D: C is a parent of D<br>D is in court 1<br>A, B & C are in court 2<br><br>Rules:<br>• Parents are centered below their children.<br>• Non-remand relationship arrows should enter from the bottom of the box.<br>• If a parent cannot be centered below a child, it will be offset below a child. | 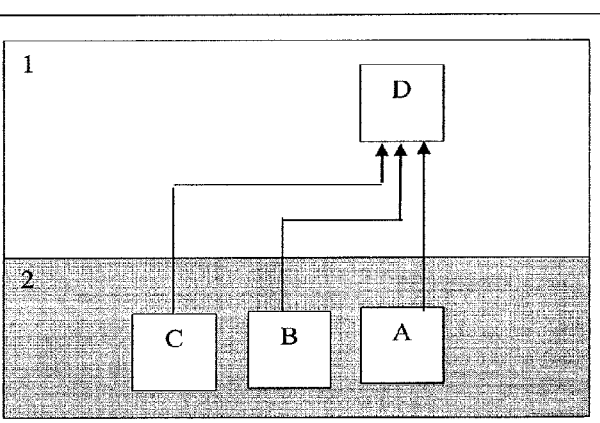 |

FIGURE 13-10

| 19 | Scenario:<br>A->E: A is a parent of E<br>B->E: B is a parent of E<br>C->E: C is a parent of E<br>D->E: D is a parent of E<br>E is in court 1<br>A, B, C & D are in court 2<br><br>Rules:<br>• Parents are centered below their children.<br>• Non-remand relationship arrows should enter from the bottom of the box.<br>• If a parent cannot be centered below a child, it will be offset below a child.<br>• The width of the child will expand to the point necessary in order for all of it's parents relationships to be drawn. | |
|---|---|---|
| 20 | Scenario:<br>A->B: A is a parent of B<br>B->C: B is a parent of C<br>A->C: A is a parent of C<br>C is in court 1<br>B is in court 2<br>A is in court 3<br><br>Rules:<br>• Parents are centered below their children.<br>• Non-remand relationship arrows should enter from the bottom of the box.<br>• When the parent would need to go around one child to get to another it will be offset. | |

FIGURE 13-11

| 23 | *Scenario:*<br>A->b: A is a parent of b<br>b is in court 1<br>A is in court 2<br><br>*Rules:*<br>• Parents are centered below their children.<br>• Non-remand relationship arrows should enter from the bottom of the box. | 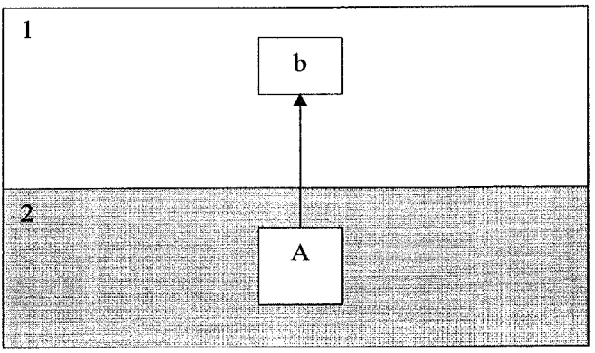 |
|----|---|---|
| 24 | *Scenario:*<br>A->b: A is a parent of b<br>A->c: A is a parent of c<br>A, b & c are in court 1<br><br>*Rules:*<br>• Parents are centered below their children.<br>• Non-remand relationship arrows should enter from the bottom of the box.<br>• Motions for the same parent in the same court level are stacked on top of each other. | 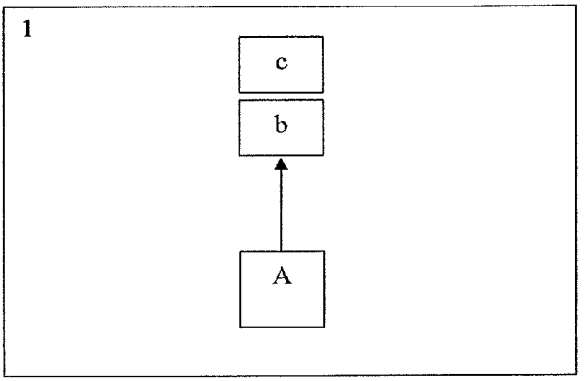 |

FIGURE 13-13

| 25 | *Scenario:*<br>A->b: A is a parent of b<br>A->c: A is a parent of c<br>b & c are in court 1<br>A is in court 2<br><br>*Rules:*<br>- Parents are centered below their children.<br>- Non-remand relationship arrows should enter from the bottom of the box.<br>- Motions for the same parent in the same court level are stacked on top of each other. | 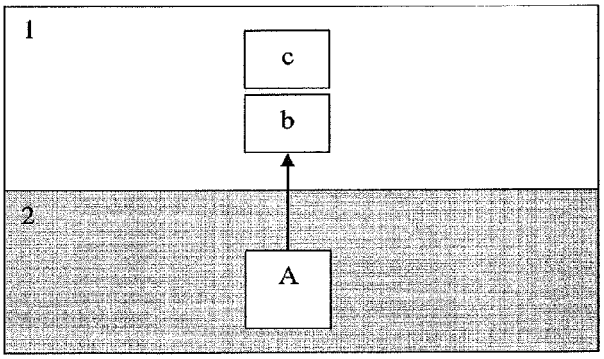 |
|---|---|---|
| 26 | *Scenario:*<br>A->b: A is a parent of b<br>A->c: A is a parent of c<br>A->d: A is a parent of d<br>b & c are in court 2<br>d is in court 1<br>A is in court 3<br><br>*Rules:*<br>- Parents are centered below their children.<br>- Non-remand relationship arrows should enter from the bottom of the box.<br>- Motions for the same parent in the same court level are stacked on top of each other. | 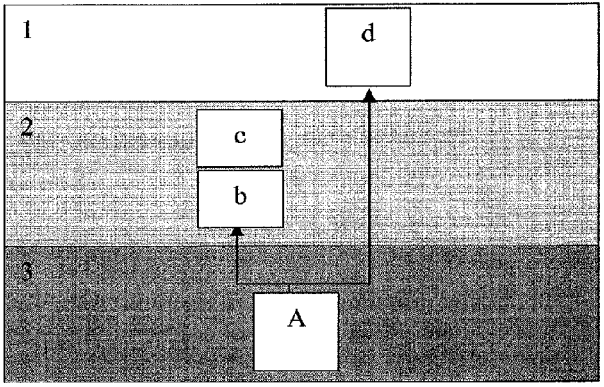 |

FIGURE 13-14

| 27 | *Scenario:*<br>A->b: A is a parent of b<br>A->c: A is a parent of c<br>A, b & c are in court 1<br>A (01/01/00)<br>b (02/01/00)<br>c (03/01/00)<br><br>*Rules:*<br>- Parents are centered below their children.<br>- Non-remand relationship arrows should enter from the bottom of the box.<br>- Motions for the same parent in the same court level are stacked on top of each other<br>- Stacked procedural motions are ordered with the earliest on the bottom and the latest on the top. | 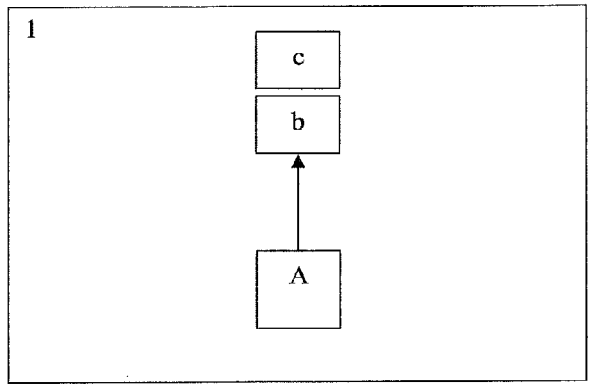 |
| --- | --- | --- |
| 28 | *Scenario:*<br>A->b: A is a parent of b<br>A->c: A is a parent of c<br>A, b & c are in court 1<br>A (01/01/00)<br>b (02/01/00)<br>c (02/01/00)<br><br>*Rules:*<br>- Parents are centered below their children.<br>- Non-remand relationship arrows should enter from the bottom of the box.<br>- Motions for the same parent in the same court level are stacked on top of each other<br>- When procedural motions have the same date, they are stacked in whatever order we receive them. | 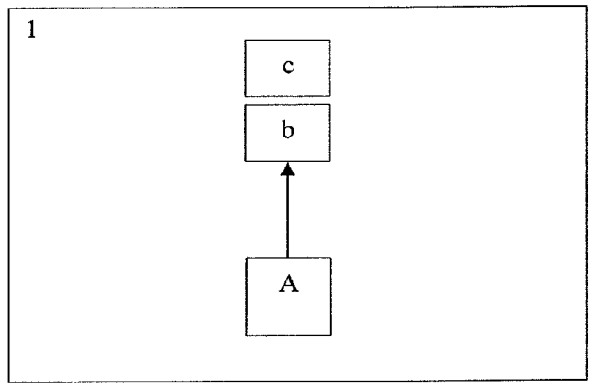 |

FIGURE 13-15

| 29 | *Scenario:*<br>A->b: A is a parent of b<br>A->c: A is a parent of c<br>A->d: A is a parent of d<br>d is in court 1<br>A, b & c are in court 2<br>A (01/01/00)<br>b (02/01/00)<br>d (03/01/00)<br>c (04/01/00)<br><br>*Rules:.*<ul><li>Parents are centered below their children.</li><li>Non-remand relationship arrows should enter from the bottom of the box.</li><li>Motions for the same parent in the same court level are stacked on top of each other.</li><li>Stacked procedural motions are ordered with the earliest on the bottom and the latest on the top.</li><li>When ordering the children from left to right, an entire stack of procedural motions takes on the date of its earliest member.</li></ul> | 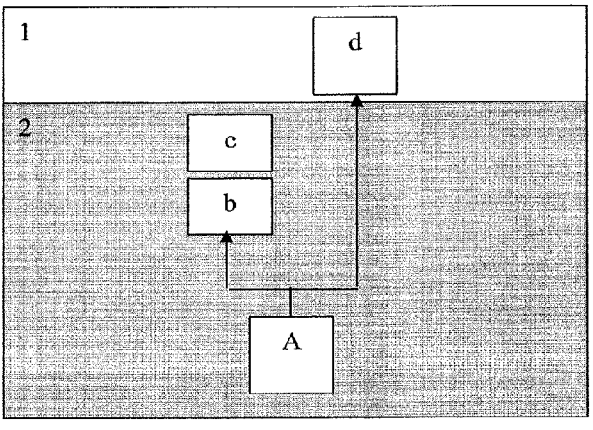 |

FIGURE 13-16

| 30 | Scenario:<br>A->b: A is a parent of b<br>b->c: b is a parent of c<br>A->d: A is a parent of d<br>d is in court 1<br>A, b & c are in court 2<br>A (01/01/00)<br>b (02/01/00)<br>d (03/01/00)<br>c (04/01/00)<br><br>Rules:<br>- Parents are centered below their children.<br>- Non-remand relationship arrows should enter from the bottom of the box.<br>- The relationship split will occur in the court level of the parent | |
|---|---|---|
| 31 | Scenario:<br>A->c: A is a parent of c with history treatment of x.<br>B->c: B is a parent of c with history treatment of y.<br><br>A, B & c are in court 1<br><br>A (01/01/00)<br>B (02/01/00)<br>c (03/01/00)<br><br>Rules:<br>- Parents are centered below their children.<br>- Non-remand relationship arrows should enter from the bottom of the box.<br>- If a procedural box has different history treatments to display, it shall be promoted to a substantive full case box. | |

FIGURE 13-17

| 32 | Scenario:<br>A->B: A is a parent of B<br>A->C: A is a parent of C<br>C is in court 1<br>A & B are in court 3<br><br>Rules:<br>• Parents are centered below their children.<br>• Non-remand relationship arrows should enter from the bottom of the box.<br>• The relationship split will occur in the court level of the parent. | 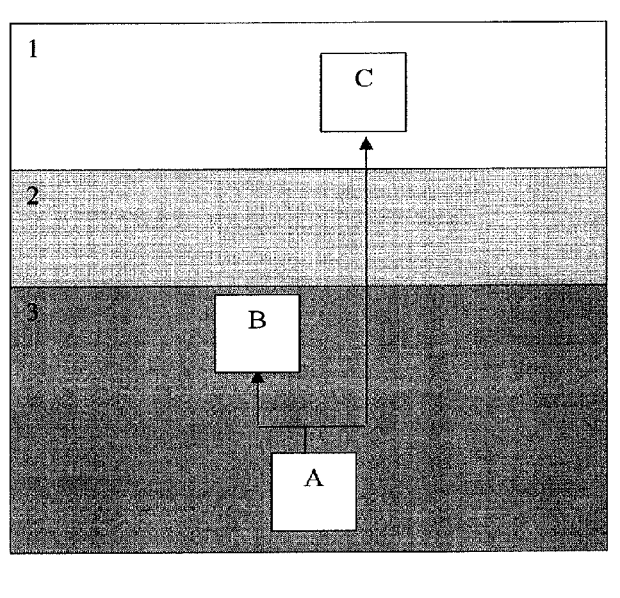 |
| --- | --- | --- |
| 33 | Scenario:<br>A->B: A is a parent of B<br>A->C: A is a parent of C<br>A (01/01/00)<br>B (02/01/00)<br>C (03/01/00)<br>A, B, & C are in court 1<br><br>Rules:<br>• Parents are centered below their children.<br>• Non-remand relationship arrows should enter from the bottom of the box.<br>• The children will be in order with the earliest child on the left and the latest child on the right. | 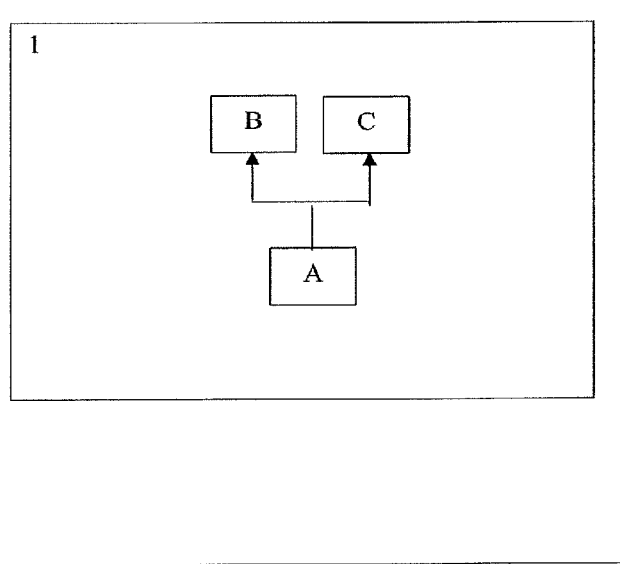 |

FIGURE 13-18

| 34 | *Scenario:*<br>A->B: A is a parent of B<br>A->C: A is a parent of C<br>D->C: D is a parent of<br>D (01/01/00)<br>A (02/01/00)<br>B (03/01/00)<br>C (04/01/00)<br>A, B, C & D are in court 1<br><br>*Rules:*<br>• Parents are centered below their children.<br>• Non-remand relationship arrows should enter from the bottom of the box.<br>• If a parent cannot be centered below a child, it will be offset below a child<br>• The children will be in order with the earliest child on the left and the latest child on the right. | 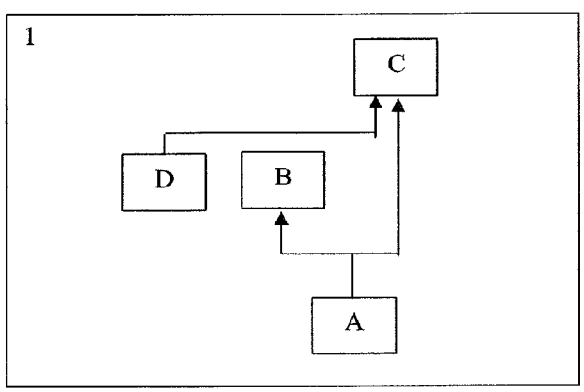 |

FIGURE 13-19

| 35 | *Scenario:*<br>C->E: C is a parent of E<br>C->D: C is a parent of D<br>B->E: B is a parent of E<br>B->C: B is a parent of C<br>A->B: A is a parent of B<br>A->D: A is a parent of D<br>A, B, C, D & E are in court 1<br>A (01/01/00)<br>B (02/01/00)<br>C (03/01/00)<br>D (04/01/00)<br>E (05/01/00)<br><br>*Rules:*<br>• Parents are centered below their children.<br>• Non-remand relationship arrows should enter from the bottom of the box.<br>• If a parent cannot be centered below a child, it will be offset below a child<br>• The children will be in order with the earliest child on the left and the latest child on the right.<br>• When lines need to cross their will be a bump on the horizontal line at the point where the lines cross. | 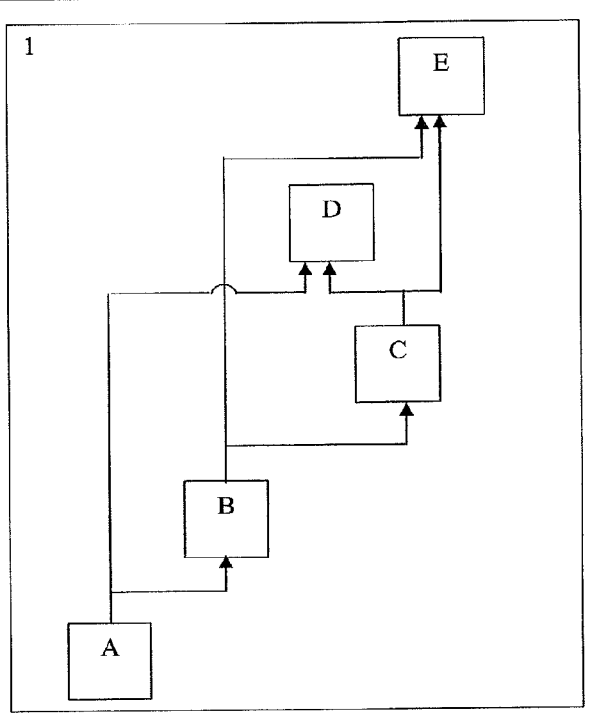 |

FIGURE 13-20

| 36 | Scenario (Miranda - 86 sct 1602): | Rules: |
|---|---|---|
| | A->B: A is a parent of B<br>A->c: A is a parent of c<br>A->d: A is a parent of d<br>B->e: B is a parent of e<br>B->f: B is a parent of f<br>B->g: B is a parent of g<br>B->h: B is a parent of h<br>B->i: B is a parent of i<br>B->P: B is a parent of P<br>K->l: K is a parent of l<br>K->P: K is a parent of P<br>J->m: J is a parent of m<br>J->P: J is a parent of P<br>O->n: O is a parent of n<br>O->P: O is a parent of P<br>P->q: P is a parent of q<br><br>A and J are in court 3<br>B,c,d,e,f,g,h,K, and O are in court 2<br>i,l,m,n,P and q are in court 1 | - Parents are centered below their children.<br>- Non-remand relationship arrows should enter from the bottom of the box.<br>- When there is a T intersection between a parent and child, the bottom vertical line will be offset.<br>- The relationship split will occur in the court level of the parent.<br>- The width of the child will expand to the point necessary in order for all of it's parents relationships to be drawn.<br>- Motions for the same parent in the same court level are stacked on top of each other.<br>- Stacked procedural motions are ordered with the earliest on the bottom and the latest on the top.<br>- When procedural motions have the same date, they are stacked in whatever order we receive them.<br>- When ordering the children from left to right, an entire stack of procedural motions takes on the date of its earliest member.<br>- The children will be in order with the earliest child on the left and the latest child on the right. |

FIGURE 13-21

| | | |
|---|---|---|
| 37 | *Scenario (Festo - 172 F.3d 1361):*<br>A->E: A is a parent of E<br>A->J: A is a parent/great-grandparent of J<br>B->E: B is a parent of E<br>B->J: B is a parent/great-grandparent of J<br>B->C: B is a parent of C<br>D->E: D is a parent of E<br>E->F: E is a parent of F<br>E->G: E is a parent/grandparent of G<br>E->H: E is a parent/grandparent to H<br>F->G: F is a parent of G<br>F->H: F is a parent of H<br>F->J: F is a parent of J<br>H->I: H is a parent of I<br>H->J: H is a parent / sibling of J<br>J->k: J is a parent of k<br>J->L: J is a parent of L<br>L->M: L is a parent of M<br>M->N: M is a parent of N<br>N->o: N is a parent of o<br>N->p: N is a parent of p<br><br>F, k, L, p & O are in court 1<br>E, G, H, I, J, M & N are in court 2<br>C & D are in court 3<br>A & B are in court 4<br><br>A (12/00/1973)<br>B (10/12/1982)<br>C (04/12/1982)<br>D (02/03/1994)<br>E (12/14/1995)<br>F (03/17/1997)<br>G (06/09/1997)<br>H (04/19/1999)<br>I (08/20/1999)<br>J (11/29/2000)<br>k (06/18/2001)<br>L (05/28/2002)<br>M (09/20/2002)<br>N (09/26/2002)<br>o (04/19/2004)<br>p (04/19/2004) | *Rules:*<br>- Parents are centered below their children.<br>- Non-remand relationship arrows should enter from the bottom of the box.<br>- When there is a T intersection between a parent and child, the bottom vertical line will be offset.<br>- The relationship split will occur in the court level of the parent.<br>- Cases sent down will start with a line from the right of the case to the top of the case sent down to.<br>- When there is more than one case sent down from a single parent, the line from the right of the parent will continue on to accommodate the additional cases.<br>- Parents that have a line coming into the top of the case will have a line coming out of the right that will then connect to it's children.<br>- If a parent cannot be centered below a child, it will be offset below a child.<br>- Motions for the same parent in the same court level are stacked on top of each other.<br>- Stacked procedural motions are ordered with the earliest on the bottom and the latest on the top.<br>- When procedural motions have the same date, they are stacked in whatever order we receive them.<br>- When ordering the children from left to right, an entire stack of procedural motions takes on the date of its earliest member.<br>- The children will be in order with the earliest child on the left and the latest child on the right. |

FIGURE 13-23

| 38 | Scenario (Habeas - 666 NYS2d 463):<br>A -> b: A is a parent of b<br>A -> C: A is a parent of C<br>C -> D: C is a parent of D<br>D -> E: D is a parent of E<br>E -> F: E is a parent of F<br>C -> F: C is a parent of F<br><br>b & C are in court level 1<br>A & E are in court level 2<br>D & F are in court level 3<br><br>A (Dec 1997)<br>b (Mar 1998)<br>C (Dec 1998)<br>D (Jun 2003)<br>E (Oct 2004)<br>F (Dec 2004)<br><br>*Rules:*<br>- Parents are centered below their children.<br>- Non-remand relationship arrows should enter from the bottom of the box.<br>- The relationship split will occur in the court level of the parent.<br>- Cases sent down will start with a line from the right of the case to the top of the case sent down to.<br>- When there is more than one case sent down from a single parent, the line from the right of the parent will continue on to accommodate the additional cases.<br>- Parents that have a line coming into the top of the case will have a line coming out of the right that will then connect to it's children.<br>- The children will be in order with the earliest child on the left and the latest child on the right. | 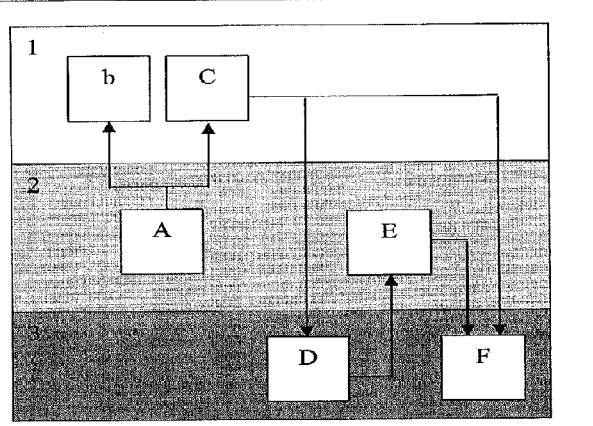 |

FIGURE 13-25

| 39 | Scenario (CPC international 777 Fsupp 549):
A -> B: A is a parent of B
A -> D: A is a parent of D
B -> C: B is a parent of C
B -> D: B is a parent of D
D -> e: D is a parent of e
D -> F: D is a parent of F
D -> G: D is a parent of G
D -> H: D is a parent of H
F -> I: F is a parent of I
I -> J: I is a parent of J e, F, G & H are in court 1
B, C, D & I are in court 2
A & J are in court 3

A (Aug 1991)
B (Jul 1995)
C (Oct 1995)
D (May 1997)
e (Dec 1997)
F (Jun 8, 1998)
G (Jun 15, 1998)
H (Jun 15, 1998)
I (Jun 17, 1998)
J (Nov 2001)

Rules:
- Parents are centered below their children.
- Non-remand relationship arrows should enter from the bottom of the box.
- The relationship split will occur in the court level of the parent.
- Cases sent down will start with a line from the right of the case to the top of the case sent down to.
- When ordering the children from left to right, an entire stack of procedural motions takes on the date of its earliest member.
- The children will be in order with the earliest child on the left and the latest child on the right. | 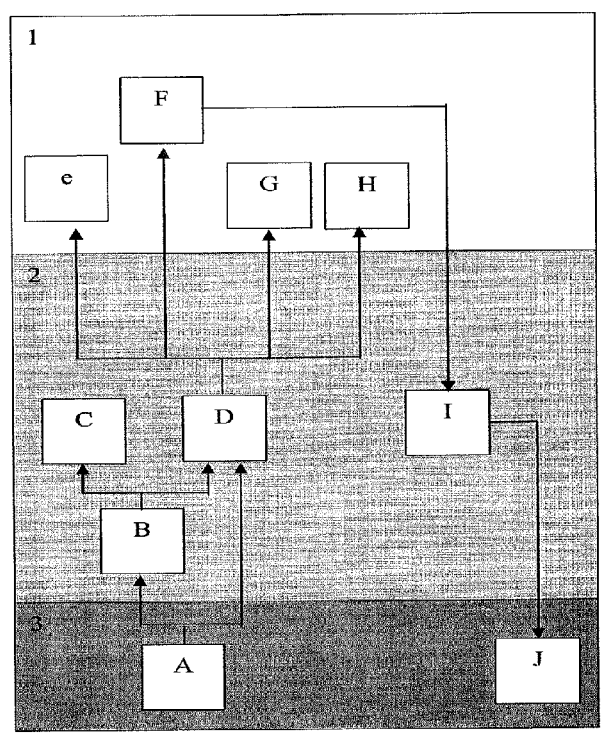 |

FIGURE 13-26

| 40 | *Scenario(583 So2d 276):*<br>A -> B: A is a parent of B<br>B -> c: B is a parent of c<br>B -> D: B is a parent of D<br>A -> E: A is a parent of E<br>E -> F: E is a parent of F<br>E -> g: E is a parent of g<br><br>B & D are joined by a lateral litigation phrase<br>A & E are joined by a lateral litigation phrase<br><br>c & g are in court 1<br>B is in court 2<br>A, D, E & F are in court 3<br><br>A (Aug 3, 1990)<br>B (Apr 11, 1991)<br>c (Mar 2, 1992)<br>D (Aug 14, 1998)<br>E (Dec 16, 2003)<br>F (Feb 18, 2004)<br>g (Oct 4, 2004)<br><br>*Rules:*<br>• Parents are centered below their children.<br>• Non-remand relationship arrows should enter from the bottom of the box.<br>• The relationship split will occur in the court level of the parent.<br>• Cases sent down will start with a line from the right of the case to the top of the case sent down to.<br>• Parents that have a line coming into the top of the case will have a line coming out of the right that will then connect to it's children. | <br><br>• Parents will be drawn to the left of a child, when they are in the same court level and there relationship is on the Lateral Litigation list.<br>• The children will be in order with the earliest child on the left and the latest child on the right. |

FIGURE 13-27

| 41 | Scenario(125 SCt 82): | Rules: |
|---|---|---|
| | B -> A: B is a parent of A<br>C -> A: B is a parent of A<br>D -> A: B is a parent of A<br>E -> A: B is a parent of A<br>F -> A: B is a parent of A<br>G -> A: B is a parent of A<br>H -> A: B is a parent of A<br>I -> A: B is a parent of A<br>J -> A: B is a parent of A<br>K -> A: B is a parent of A<br>L -> A: B is a parent of A<br>M -> A: B is a parent of A<br>N -> A: B is a parent of A<br>O -> A: B is a parent of A<br>P -> A: B is a parent of A<br>Q -> A: B is a parent of A<br>R -> A: B is a parent of A<br>S -> A: B is a parent of A<br>T -> A: B is a parent of A<br>U -> A: B is a parent of A<br>V -> A: B is a parent of A<br>W -> A: B is a parent of A<br>X -> A: B is a parent of A<br>Y -> A: B is a parent of A<br>Z -> A: B is a parent of A<br>AA -> A: B is a parent of A<br>BB -> A: BB is a parent of A<br><br>A is in court level 1<br>B, C, D, F, G, H, I, J, K, L, M, N, O, P, Q, R, S, T, U, V, W, X, Y, Z, AA & BB are in court level 2 | - Parents are centered below their children.<br>- Non-remand relationship arrows should enter from the bottom of the box.<br>- If a parent cannot be centered below a child, it will be offset below a child.<br>- The width of the child will expand to the point necessary in order for all of it's parents relationships to be drawn.<br>- The children will be in order with the earliest child on the left and the latest child on the right. |

FIGURE 13-28

| 43 | *Scenario(212 Fsupp2d 1319):*  A->B: A is a parent of B  B->C: B is a parent of C  C->D: C is a parent of D  A->D: A is a parent of D  B & C are joined by a lateral litigation phrase  C & D are joined by a lateral litigation phrase  A (2002)  B (Apr 2003)  C (Dec 2003)  D (2004)  C is in court level 1  B & D are in court level 2  A is in court level 3  *Rules:* <ul><li>Parents are centered below their children.</li><li>Non-remand relationship arrows should enter from the bottom of the box.</li><li>The relationship split will occur in the court level of the parent.</li><li>Cases sent down will start with a line from the right of the case to the top of the case sent down to.</li><li>Parents will be drawn to the left of a child, when they are in the same court level and there relationship is on the Lateral Litigation list.</li><li>If a parent cannot be centered below a child, it will be offset below a child.</li><li>The children will be in order with the earliest child on the left and the latest child on the right.</li></ul> | |

FIGURE 13-31

| 46 | *Scenario(923 P2d 197):*
A->b: A is a parent of b
A->C: A is a parent of C
C->D: C is a parent of D
D->E: D is a parent of E
A->E: A is a parent of E A & C are joined by a lateral litigation phrase
D & E are joined by a lateral litigation phrase
A & E are joined by a lateral litigation phrase A (1995)
b (1997)
C (2001)
D (2002)
E (2004)

b is in court level 1
A, D & E are in court level 3
C are in court level 4

*Rules:*
- Parents are centered below their children.
- Non-remand relationship arrows should enter from the bottom of the box.
- Cases sent down will start with a line from the right of the case to the top of the case sent down to.
- When there is more than one case sent down from a single parent, the line from the right of the parent will continue on to accommodate the additional cases.
- Parents that have a line coming into the top of the case will have a line coming out of the right that will then connect to it's children.

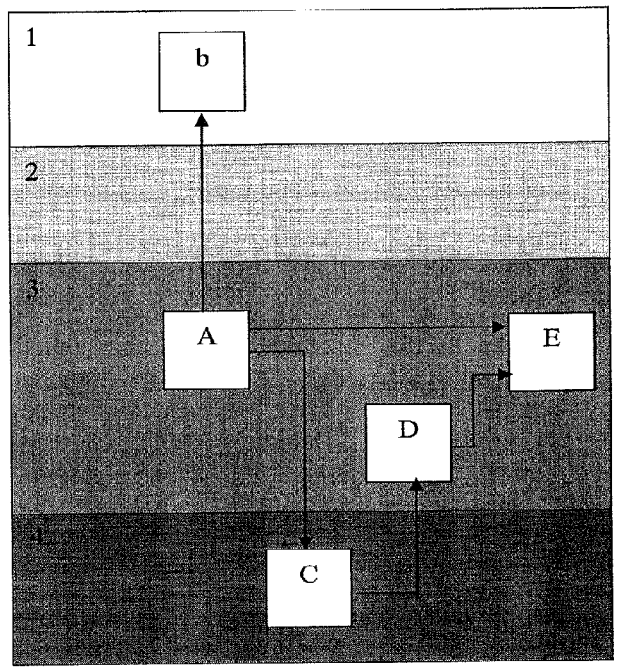

- Parents will be drawn to the left of a child, when they are in the same court level and there relationship is on the Lateral Litigation list.
- A case has remanded Child and a lateral litigation child there should have two lines coming out of the right of the box.

FIGURE 13-34

| 47 | *Scenario(1998 WL 1285714):*
A->B: A is a parent of B
B->C: B is a parent of C
C->D: C is a parent of D
C->E: C is a parent of E
F->B: F is a parent of B B & C are joined by a lateral litigation phrase
C & D are joined by a lateral litigation phrase
C & E are joined by a lateral litigation phrase A (1998)
B (2001)
C (2002)
D (Nov 20, 2002)
E (Nov 20, 2002)
F (2000)

C is in court level 1
B, D & E are in court level 2
A & F are in court level 3

*Rules:*
- Parents are centered below their children.
- Non-remand relationship arrows should enter from the bottom of the box.
- Cases sent down will start with a line from the right of the case to the top of the case sent down to.
- When there is more than one case sent down from a single parent, the line from the right of the parent will continue on to accommodate the additional cases.
- The children will be in order with the earliest child on the left and the latest child on the right. | 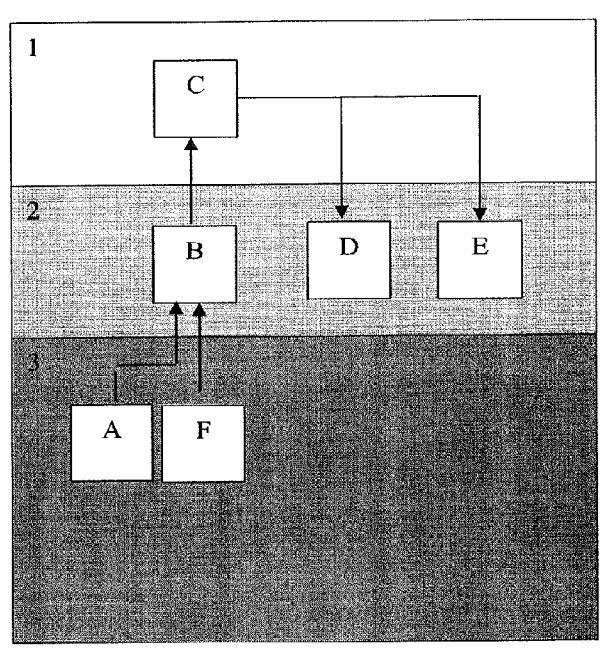 |

FIGURE 13-35

SYSTEMS, METHODS, AND SOFTWARE FOR PRESENTING LEGAL CASE HISTORIES

RELATED APPLICATIONS

This application is a Continuation of U.S. application Ser. No. 13/339,861, filed Dec. 29, 2011, now U.S. Pat. No. 8,250,118, which is itself a continuation of U.S. application Ser. No. 12/857,322, filed Aug. 16, 2010, now U.S. Pat. No. 8,145,675, which is itself a continuation of U.S. application Ser. No. 11/370,194, filed Mar. 6, 2006, now U.S. Pat. No. 7,778,954, which is itself a Continuation of U.S. application Ser. No. 11/182,028, filed Jul. 13, 2005 and now abandoned, which is itself a Continuation-In-Part of U.S. application Ser. No. 09/746,557, filed Dec. 22, 2000 and issued as U.S. Pat. No. 7,529,756, which is itself a Continuation of U.S. application Ser. No. 09/120,170, filed Jul. 21, 1998 which is now abandoned. Each of these applications is incorporated herein by reference in their entirety.

COPYRIGHT NOTICE

One or more portions of this patent document contain material subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Various embodiments of the invention concern systems, methods, and software for extracting and presenting relationships between textual documents, such as judicial opinions or case documents.

The explosion in the number of textual documents being generated has made it increasingly important to generate an electronic version of the documents to enable automated processing to extract data, to determine information about the textual documents, and to identify relationships with other textual documents in a database. This is especially true with very large databases which may contain hundreds of thousands of textual documents, such as a database containing legal cases and other legal material.

A legal database may contain a large number of legal cases. A legal case in this document refers to an individual written decision or judicial opinion issued in the course of a litigation. These decisions usually contain citations to and quotations from other documents, including other legal cases to establish past practice and justify the result (establish precedence) of the decision. Citations are written in distinctive styles which includes special abbreviations and punctuation which facilitate their identification. Also, quotations are usually set off in quotation mark. It is useful to identify these citations and quotations.

In some circumstances, the citations and quotations in a legal case may be identified by automatically parsing through the text of a legal case to identify candidates based upon punctuation and other characteristics. However, the punctuation which sets off a quotation may be used for other purposes, and the abbreviations and formats which characterize a citation are not necessarily unique. To ensure accurate identification, a citation or quotation must be verified. A citation has a predefined format. For example, a written decision of a California Court of Appeals case in 1993 in a lawsuit between Ms. Pleasant and Mr. Celli may have a citation such as, *Pleasant v. Celli*, 18 Cal. App. 4th 841, 22 Cal. Rptr. 2d 663 (1993). The first portion of the citation indicates the two parties last names and their positions in the case. For example, Ms. Pleasant is the first name listed. Since this is an appellate case, she is the appellant and Mr. Celli is the appellee. The next portion of the citation (i.e., 18 Cal. App. 4th 841 for example) indicates where a copy of the written decision may be located. The first number indicates the volume number of the case reporter in which the decision is located and the text portion (i.e., Cal. App 4th) indicates the name of the reporter and the edition of the reporter. The number following the reporter name indicates the starting page number of the decision. Thus, both the text of the citations and quotations in a written reported decision textual document have well defined format which may be automatically identified.

Once the citations and quotations in a legal case are identified and any relationships between these citations and quotations and any prior legal cases are determined, this information may be used for a variety of purposes. For example, this information may be used for both legal case verification purposes and legal case collocation purposes. Verification is a process whose end result is a determination that the legal case currently being reviewed is still good law (i.e., it has not been overruled or limited by some later case due to different reasoning). A case that is not good law may not be persuasive since the reasoning of the case is no longer valid. Thus, the process of verification ensures that the case being used to support an argument is still good law and the reasoning of that case is still valid. Collocation, on the other hand, is a process whose end result may be a list of other legal cases, legal materials or textual documents which cover similar issues to the case currently being reviewed, or a list of cases covering a particular subject matter, such as intellectual property. For example, a user of the legal database may have located a case which is of interest to him and he would then like to identify other cases that are related to the case of interest based on the subject matter. Thus, it is desirable for a user of a legal database to be able to perform both verification and collocation using a single integrated system.

Prior to electronic databases, legal cases were published in several different formats each of which have some advantages and disadvantages. A register publication gathers information at the source of the new law and presents the new law in roughly chronological order. An example of this type of publication is a reporter volume that contains the new legal cases for a particular court in chronological order. These register publications may be rapidly published and provide a good statement of the new law, but these register publications cannot provide collocation (i.e., it cannot provide a researcher with information about other cases which may be related to the subject matter of the instant case). It is also difficult to verify a legal case with a register publication. Another type of legal publication is a code publication which attempts to gather together the law that applies to a particular subject matter so that a researcher may determine the current state of the law from a single source. A code publication may permit a case to be verified since outdated law is removed as a code publication is updated. An example of a code publication is an annotated statutory code publication which gathers information from statutes and legal cases about a particular subject matter. Legal case are not published in a code format. These code publications may provide a researcher with the ability to collocate legal cases and verify a legal case, but the information in these code publications, due to the amount of time required to compile these code publications, only describe the state of the law sometime in the recent past. Therefore, for rapidly changing areas of the law, a code publication may not be accurate and therefore cannot provide either the verification or collocation needs to the researcher.

Numerous efforts have been made to codify case law, but case law tends to resist codification for several reasons. First, there is a tremendously large number of legal cases so it is often very difficult and time consuming to attempt to classify the legal cases by subject matter. In addition, legal cases have a complex hierarchy of authority and control (i.e., whether a case from a particular court controls or influences the outcome of another court, which leads to differences between various courts within various regions of the United States. It is also very difficult to determine the effects that a newly-decided legal case may have on the current state of the law. The attempts to codify the case law have included treatises (which cover the current state of the law for a particular subject matter) or restatements of the law in particular subject areas.

In order to adequately perform legal research, legal researchers need to be able to determine the current state of the case law, and then access the case law in its register form. Any access to the case law itself or free-text access cannot easily provide a current state of the law. Thus, a researcher may use an index to the case law to find the case law. These indexes include a controlled vocabulary, manually created intellectual index to case law which requires extraordinary amounts of manpower to implement. Instead of these options, a citation index (also known as a case law citator) may be used.

There are several conventional case law citators. One citator provides both the required verification and collocation functions, but has several disadvantages. In particular this citator produces citation chains for a particular legal case which list how the legal case was treated by later legal case, such as indicating that the particular legal case was overruled or followed. This citator is not current since it typically waited for a legal case to be in the general case law prior to generating the case law citator information. This conventional system did an adequate job of verification, but did not really provide an adequate collocation function. In particular, it is tedious to locate other case law which relates to a particular case by following the citation strings, retrieving the reporter with a legal case, and then manually reviewing the legal case.

Therefore, it is desirable to provide a system and method which seamlessly integrates general subject matter access to case law with citation information which provides a researcher with the desired verification function as well as the collocation function. Thus, the researcher may use a single integrated system which provides the researcher will all of the information that the researcher needs in a single location.

BRIEF DESCRIPTION OF THE DRAWINGS

FIGS. 11-1 to 11-79 are screenshots (slides 1-104) illustrating examples of graphical user interfaces displayed to a user during a session in accordance with the invention;

FIGS. 13-1 to 13-35 are schematic diagrams illustrating the graphical display outputted to a user for various exemplary scenarios in accordance with the invention.

Figure 1:
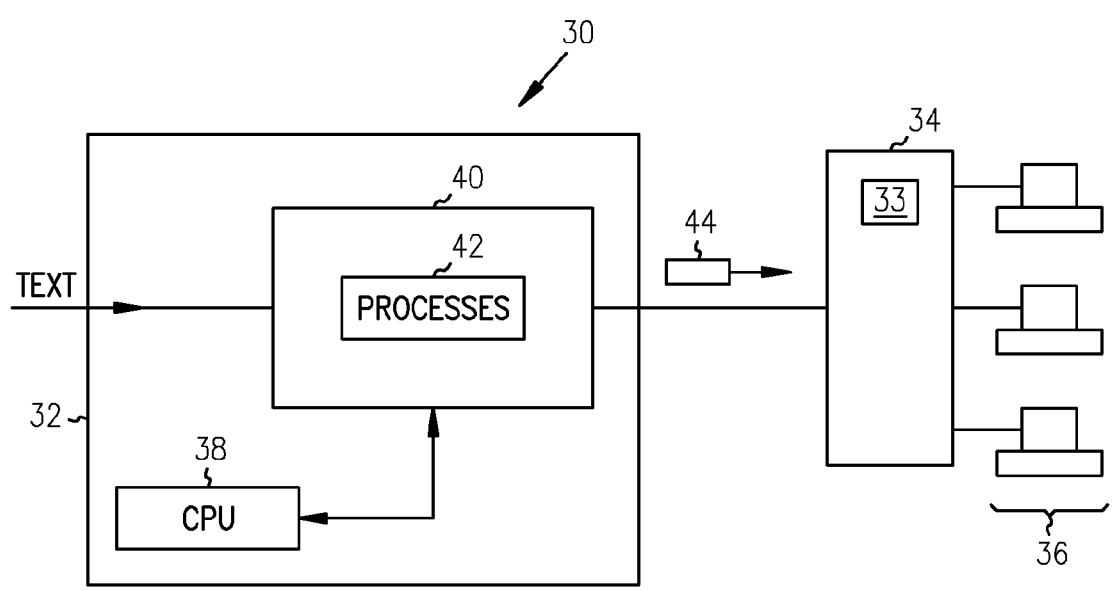
FIG. 1 is a block diagram of a computer system which may be used to automatically generate case law citation data in a legal text processing system in accordance with the invention.

DESCRIPTION OF EXEMPLARY
EMBODIMENTS

This description, which references and incorporate the identified figures and incorporates the appended claims, describes and illustrates one or more exemplary embodiments of the invention(s.) These embodiments, offered not to limit but only to exemplify and teach, are shown and described in sufficient detail to enable those skilled in the art to make and use the invention(s). Thus, where appropriate to avoid obscuring the invention(s), the description may omit certain information known to those of skill in the relevant art.

Some embodiments of the invention are particularly applicable to a computer-implemented legal text processing system and method for semi-automatically identifying characteristics, such as citations and quotations, within a legal document and identifying relationships between the legal document and other legal documents stored in the database. The legal document may be a legal case, a statute, a law review article, an ALR article or a legal treatise. It is in the context of a legal case that the exemplary embodiments are described. It will be appreciated, however, that the system and method in accordance with the invention has greater utility and may be used for different legal documents, such as statutes, legislative histories, and administrative proceedings, and patents. Some embodiments apply the teachings herein to non legal documents, such as scientific literature.

Before describing the preferred embodiment of the invention, a brief description of the terminology that will be used to describe the invention will be provided. Any reported decision of a legal case is presumed to be an authoritative statement of the law when it is written. Then, later events may affect the authoritativeness of this legal case's decision. These later events may include later proceedings or written decisions during the same litigation (e.g., direct history), a decision of a later legal case from a different litigation which resolves the same issues in a different way or using different reasoning and overrules the earlier case, or a decision of a later legal case from a different litigation which resolves the same issue differently, but does not explicitly overrule the case. The direct history of a legal case may include a record of the connections between the legal cases that are part of the same litigation. The direct history may be of varying degrees of relevance and may include positive history (i.e., maintaining or supporting the authority (of the legal case) or negative history (for example, the legal case may no longer have the authority it once had)). The indirect history of a case is a record of the connections between legal case and other legal cases which are not part of the same litigation. The indirect history of a legal case may also be positive or negative. The significance of a particular case may often be indicated by the amount of discussion (i.e., the amount of text) that a later case uses in discussing a decision of another legal case while following, overruling or explaining the case. This is referred to as the depth of treatment of the case, as described below. One or more embodiments described herein may also be implemented on a system, such as that described in co-pending U.S. patent application Ser. No. 10/751,269, which was filed Dec. 30, 2003 and which is incorporated herein by reference.

FIG. 1 is a block diagram of a computer system 30 in which the invention may be embodied. The system may semi-automatically identify characteristics, such as citations and quotations within a legal case document, and then generate information about the legal case in the context of other legal cases. The computer system may include a computer 32, a server 34 and a plurality of client computers 36. The computer 32 may further include a central processing unit (CPU) 38, a memory 40 and one or more processes 42, which may be software applications that are stored in the memory 40. The CPU controls the operation of the computer and executes the software applications stored in the memory. In operation, a plurality of pieces of electronic data corresponding to the text of the published decisions for the legal cases are fed into the computer and temporarily stored in the memory 40. In the following discussion, the written opinion of the legal case is referred to as the legal case. Each piece of electronic data (i.e., each written opinion of a legal case) may be automatically processed by the CPU, using the processes contained in the software applications contained in the memory, to generate information about the legal case, as described below. For example, the CPU may parse the text of the legal case to identify candidate (i.e., unverified) citations to other legal cases and mark these citations for later processing, may identify candidate (i.e., unverified) quotations in the text of the legal case and mark the text accordingly, may verify the source of a quotation in the text of the legal case, may determine a depth of treatment of a cited legal case (i.e., the significance of the cited legal case based on some predetermined criteria), may determine the negative treatment of the legal case, and may assign subject matter text, such as headnotes, in accordance with a predetermined classification system to citations in the legal case. Each of these processes may be performed by a software application in the memory 40, which is executed by the CPU 38. The details of each of these processes will be described below.

Once the processing has been completed by the processes 42, the computer 32 outputs a data record 44 for the particular legal case which contains information about the history of the legal case, information about the depth of treatment of citations in the legal case, information about quotations within the legal case, and information about the subject matter text (i.e., headnotes) assigned to each citation in the legal case. The data record generated by the computer 32 for each legal case may be stored in a database 33 in a server 34. Then, when a user of one of the plurality of client computers 36 requests information about a legal case, the server 34 generates a user interface containing a variety information about the requested legal case based on the data records in the database 33, and presents the user reviewing the legal case with a variety of information about the legal case. An example of the user interface provided to the user of each client computer is described below with reference to FIGS. 2A-2D. In this manner, a user of the client computer may request data about a particular case, and the system in accordance with the invention provides that data to the user.

As the electronic data for the text of each written opinion for a new legal case is received by the computer 32, the legal case is processed as described above and the results of the processing is stored as a data record 44 in the database 33 of the in the server 34. The users of the client computers may then retrieve data about a particular legal case from the server 34. Thus, while the server 34 is providing data about a legal case to the one or more users of the client computers, the computer 32 may be simultaneously processing additional new legal cases and adding the information for that new legal case into the database 33 in the server 34. Now, an example of a preferred user interface and information provided to the user of a client computer will be described in more detail.

Figure 2A:
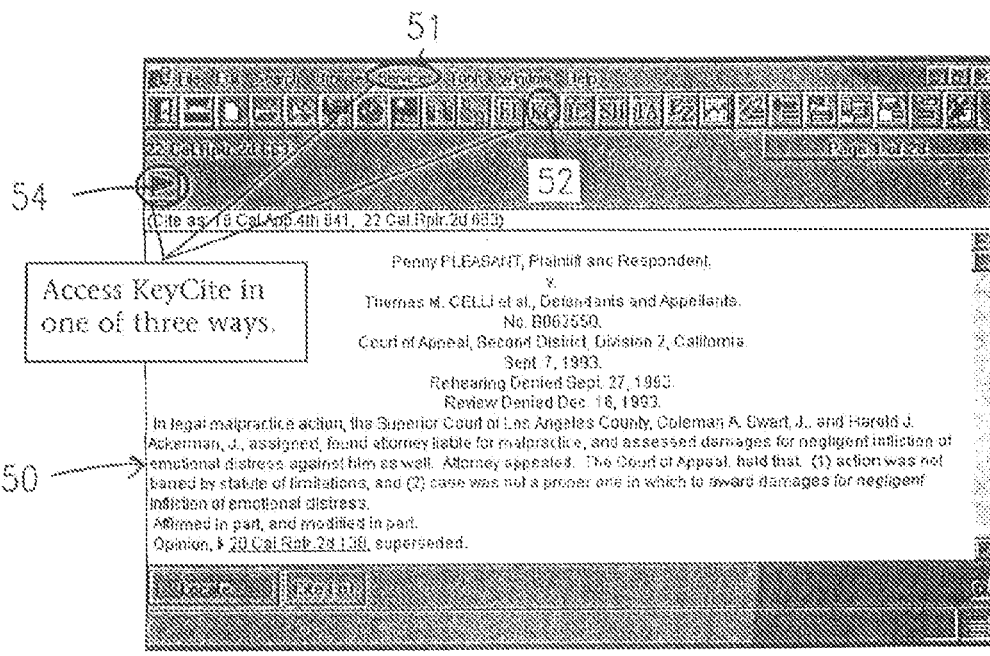
FIGS. 2A-2D are screen shots illustrating examples of the user interface displayed to a user of the case law citation system in accordance with the invention.

FIGS. 2A-2D are screen shots illustrating examples of a preferred user interface and the information provided to and displayed by a client computer in accordance with the invention. FIG. 2A shows a computer screen 50 on a client computer displaying a legal case being reviewed by the user of the particular client computer in which the user interface has a Windows format, a toolbar, pull down menus, etc. In this example, the display is of the text of a legal case called *Pleasant* v. *Celli* which was decided by a California Court of Appeals. As described above, any citation for a legal case has a well-defined format which facilitate the identification of these citations within the text of the written opinion of the legal case. In order to access more information about the displayed legal case, the user of the client computer may select the citation service, which may be referred to as Key-Cite™, from the Services menu 51 by clicking on a "KC" button 52 or click on a symbol 54. KeyCite™ is a trademark of a citator of the assignee of the present invention. The symbol may be a colored symbol, e.g., a flag, which gives a quick status of the legal case. A red colored flag may warn that the legal case being reviewed may not be good law for at least some portion of the legal case, a yellow colored flag may indicate that the legal case has some negative history, as described below, or another colored symbol, such as a blue H, may indicate that the legal case has some history which is not negative. The invention, however is not limited to any particular types of symbols or colors. Once the user of the client computer has selected the citator system in some manner, the screen shown in FIG. 2B may be displayed.

Figure 2B:
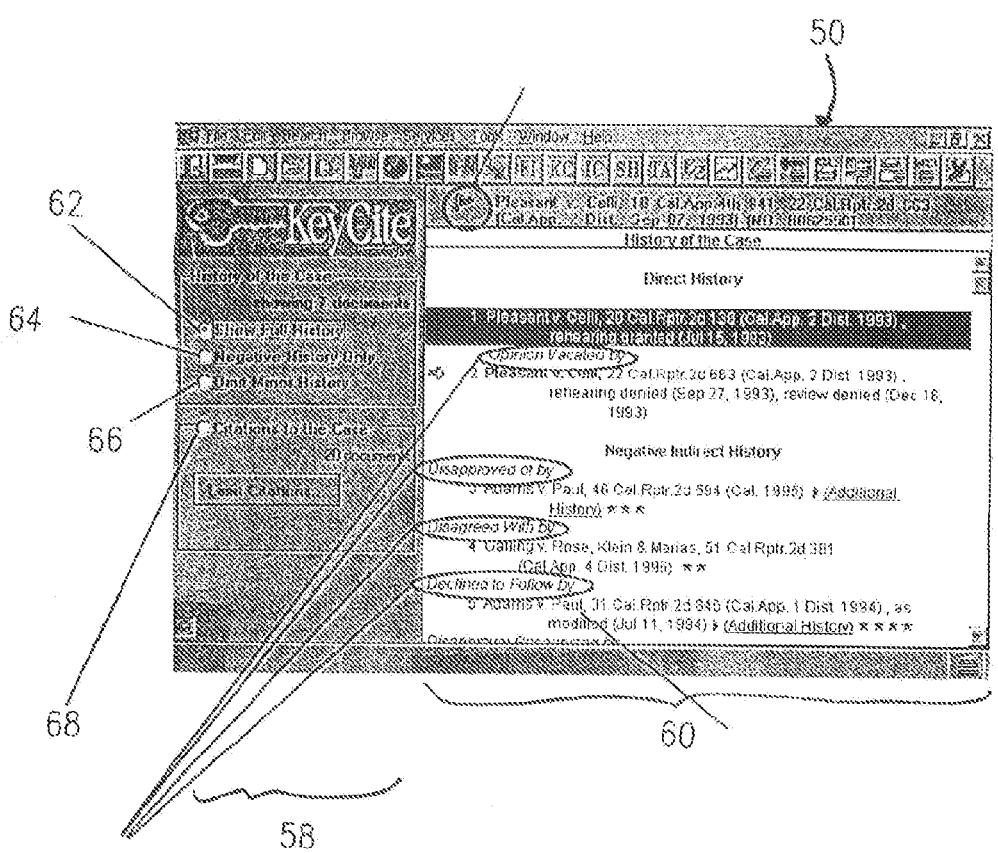

FIG. 2B is a screen shot showing an example of a computer screen 50 which the invention may employ having a control interface portion 58, and a display portion 60. The control interface portion of the display permits the user to customize the information being displayed. For example, if a first radio button 62 is selected, then the full history of the legal case, including direct history which is negative or positive, negative indirect history, and any related references may be shown. If a second radio button 64 is selected then only the negative direct and indirect history may be shown. If a third radio button 66 is selected, then only the direct history of the legal case may be displayed so that any minor direct history (including references), remote direct history (such as appeals after remand) and mildly negative indirect history are not displayed. The control portion 58 of the display also may indicate the number of cases which are considered to be the history of the legal case. The control portion 58 may also include a fourth radio button 68 and an indication of the number of citations to the legal case being displayed. When the fourth radio button is selected, a list of other documents is displayed.

In the example shown in FIG. 2B, the full history of the *Pleasant* v. *Celli* case is indicated. As shown, the various types of history, such as the direct history and the negative indirect history are displayed in the display portion 60 and are separated from one another by headings. For each piece of history, a short description of the history or tag, such as "opinion vacated by", "disapproved of by", or "disagreed with by" may indicate the relationship between the cases listed and the base case. In this example, an earlier decision of the same court was vacated by the *Pleasant* case. (FIGS. 11-1 to 13-35 show other exemplary interfaces that may be used in conjunction with the embodiments described via FIG. 2B and/or elsewhere in this description.) Now, the citations to the legal case will be described with reference to FIG. 2C.

Figure 2C:
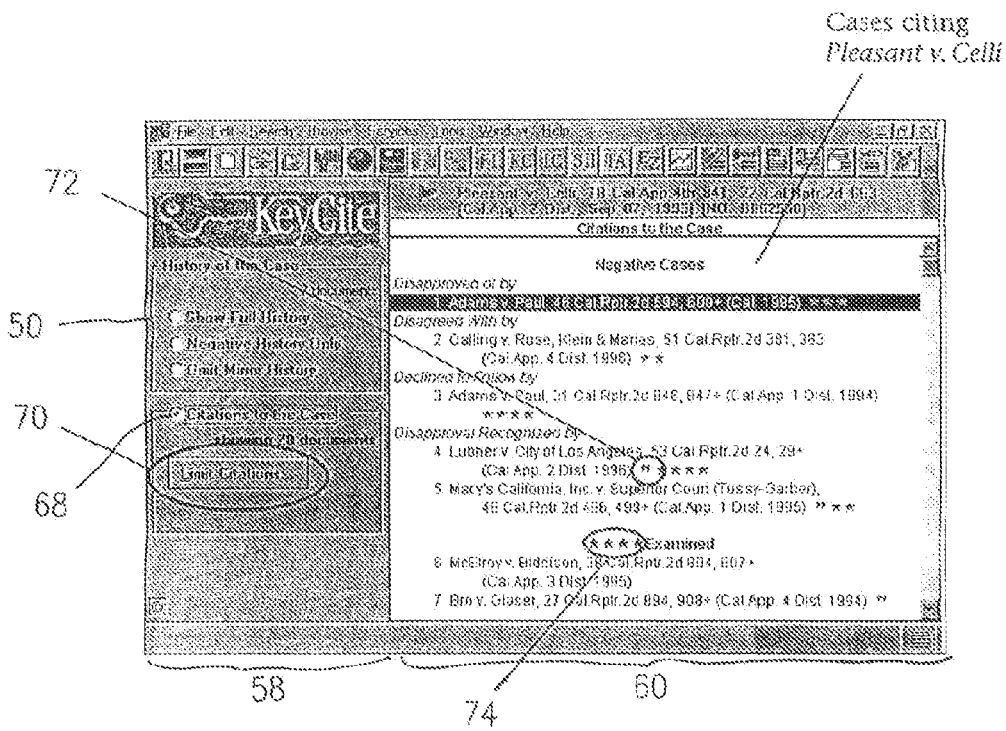

FIG. 2C is an example of a screen shot showing the computer screen 50 having the control interface portion 58, and the display portion 60. This screen displays the legal cases which have cited the legal case currently being reviewed (i.e., *Pleasant* v. *Celli* in the example). In this screen shot, the fourth radio button 68 is selected. Thus, the control portion may also have a button 70 which permits the user of the system to limit the types of citations displayed, as described below with reference to FIG. 2D. The display portion 60 may also display a quotation mark symbol 72 and a depth of treatment symbol 74, which are associated with the citations for the legal case, etc. which cite to the legal case of interest. The quotation symbol 72 indicates that the cited legal case directly quotes from the case of interest (i.e., in the example *Lubner* v. *City of Los Angeles* contains a quotation from *Pleasant* v. *Celli*). A method for identifying quotations and verifying the source of the quotations in accordance with the invention will be described below. The depth of treatment symbol 74, which may be, for example, one or more stars, where the number of stars indicate the degree to which the legal case's written opinion is treated, e.g., the amount of text in the cited case opinion which is devoted to the case of interest. The details of the depth of treatment assignment process will be described below in more detail. Now, a screen which permits a user to the limit the citations displayed in the display portion will be described with reference to FIG. 2D.

Figure 2D:
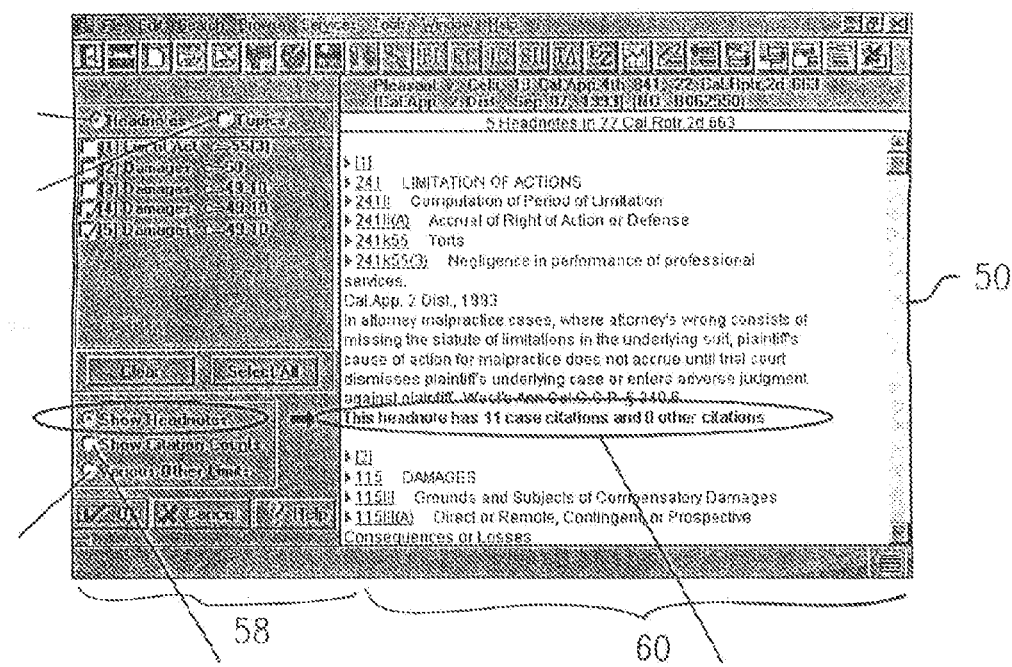

FIG. 2D is an example of a screen shot showing the computer screen 50 with the control portion 58 and the display portion 60. In this screen shot, it is assumed the user of the system has selected the limit citation button 70 shown in FIG. 2C. As shown, the user of the system may restrict the citations displayed based on headnotes or topics and the system will evaluate all of the citations against the selected headnotes or topics so that only the legal cases containing the selected headnotes or topics are displayed in the screen shot shown in FIG. 2C. A headnote may be a few sentences/paragraph which are located at the beginning of a legal case and indicate a summary of the law of a particular portion of the legal case. The user interface of the system permits a researcher to quickly and efficiently perform verification and collocation functions on a legal case. The details of the system for generating information about the legal case and providing the verification and collocation functions in accordance with the invention will now be described.

Figure 3:
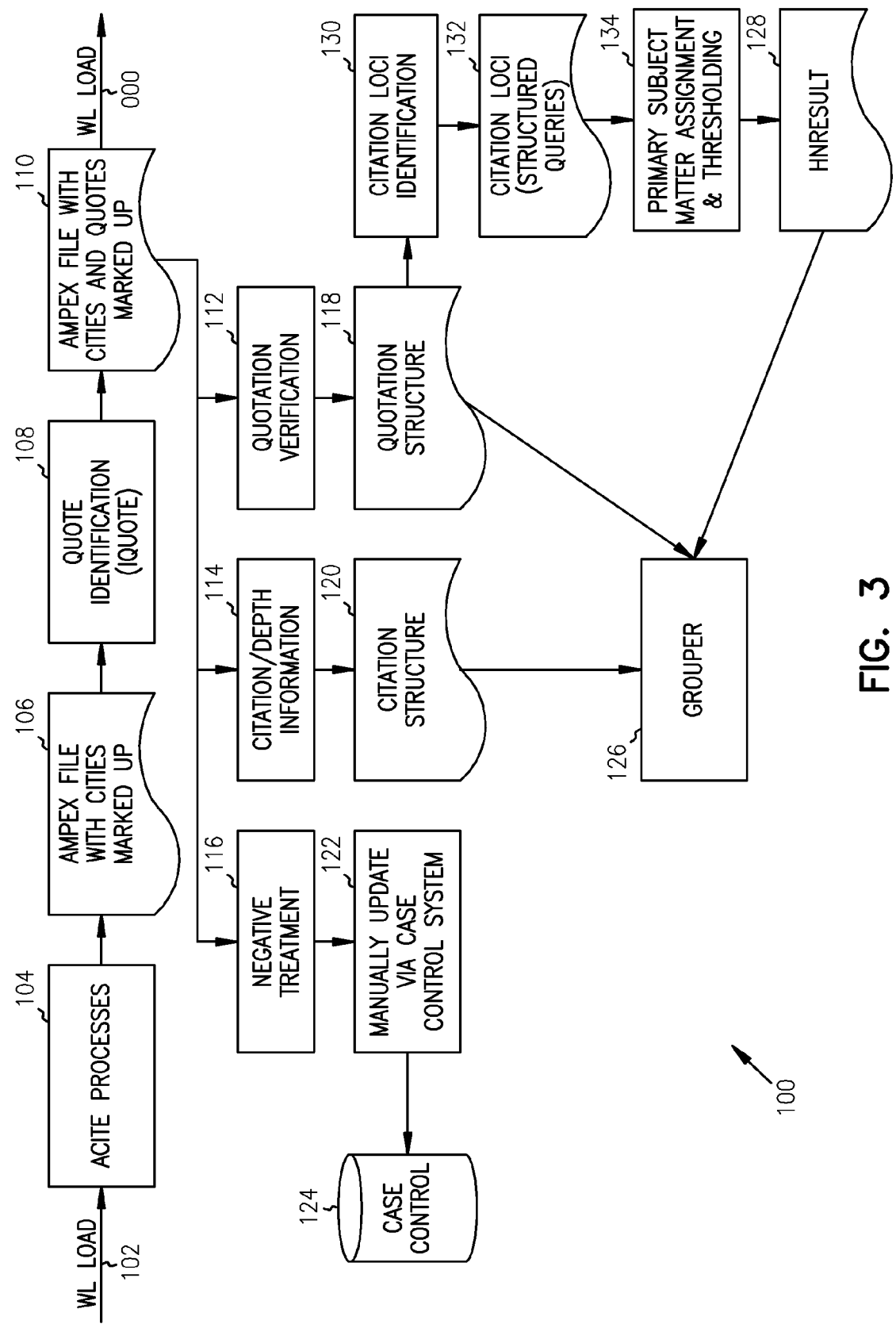
FIG. 3 is a diagram illustrating the flow of data in a case law citation system in accordance with the invention.

FIG. 3 is a diagram illustrating a method 100 in accordance with the invention which may be implemented on the computer system of FIG. 1 for processing a legal case to generate information about the legal case which may be used for verification and collocation functions. As an aid in understanding the processes, the movement of a single legal case will be described. It should be understood, however, that a plurality of legal cases may be processed at the same time since each legal case may be at a different point in the process. An electronic version of the text of a legal case 102, referred to herein as "WLLOAD", is fed into a citation identification process 104 (ACITE) that identifies candidate citations to other legal cases and other legal material within the text of the legal case, and marks up the text, i.e., adds a characteristic mark-up symbol to the text, so that the citations may be easily identified at a later time. An example of a mark up symbol may be that the symbol combination "% v" placed at the beginning and at the end of the citation. This identifies the citation for later processing.

Briefly, the citation identification process identifies candidate citations by identifying certain patterns of text in the legal document and compares these patterns to a predetermined set of reference patterns. In particular, digits may be first identified in the text. Next, the text is scanned for abbreviations proximate to the digits which correspond to known reporter abbreviations, such as "Cal." or "P.". Once a piece of text having the particular formatting and punctuation of a candidate citation is identified, a case control database 124 is queried to determine if the identified candidate citation corresponds to a valid citation in the case control database. If the identified candidate citation matches a citation in the case control database, a second processing pass is performed. If no match is located, the identified candidate citation may be flagged for later manual review. As described above, each citation has a predetermined format. The format may be <case name>, <volume number><abbreviation of reporter name><series number (if more than one)>. For example, in "18 Cal. App. 4th 841". "Cal. App. 4th" refers to the "California Appellate" reporter, 4th series; "18" refers to volume 18; and "841" refers to page 841, the page of volume 18 of Cal. App. 4th where the case decision begins.

As example of a citation to a legal case is *Pleasant* v. *Celli*, 18 Cal. App. 4th 841, 22 Cal. Rptr 2d 663 (1993) in which the first name portion, i.e., *Pleasant* v. *Celli*, identifies the parties of the legal case; the second reporter portions, i.e., 18 Cal App. 4th 841 and 22 Cal. Rptr 2d 663, identify the reporters which themselves have a particular characteristic format as described above.

Once text corresponding to a reporter name is located, the text adjacent the reporter name is analyzed to identify the volume, series and page number of the citation as well as the year of the published opinion. Once this information is found, the candidate citation is identified and marked up, as described above, to identify it as a citation. The citation identification process may use a two pass process in which first, full format citations, such as *Pleasant* v. *Celli*, 18 Cal. App. 4th 841, 22 Cal. Rptr 2d 663 (1993), are identified, matched to the case control database, and placed within a table. In a second pass through the legal case, short form citations, such as *Pleasant*, may be identified based on the text of the full citations that are contained in the table. It should be noted that these short form citations cannot be identified automatically without first identifying each full citation. For doubtful short form citations which don t match the table, a tentative identification may be made.

The citation identification process 104 in FIG. 3 outputs a file 106 containing the text of the legal case with any citations marked up. The file 106 may then be fed into a quote identification process 108 (IQUOTE) in which the text of the legal case is parsed quotations in the text of the legal case are identified and marked up, and a possible source of the quotation is also identified. At this point, the marked up quotations have not been verified. They are merely candidate quotations which must be further processed to be verified. The details of the quote identification process will be described below with reference to FIGS. 4-6. The quote identification process may output a file 110 that contains the text of the legal case in which both the citations and the quotations are marked up. At this point, the text of the legal case with the citations and quotations mark-ups may be stored in a database for later use and may also be fed into several processes. These processes may include a quote verification process 112, a depth treatment process 114, and a negative treatment process 116. As shown, these processes may execute in parallel on the same file since each process generates information about the legal case which is separate and independent from that generated by the other processes. Each of their processes will be described in more detail below with reference to FIG. 7, FIG. 9, and FIG. 8, respectively.

In general, the quote verification process 112 verifies that the candidate quotations identified by the quote identification process 108 are in fact from the source (i.e., the citing case) by comparing the candidate quotation in the cited case to the quotation in the citing case. The process then generates a data record 118 containing information about the verified quotation. The depth treatment process 114 uses information generated by the system, including the verified quotations to generate depth treatment information, such as the number of occurrences of a citation and the characteristics of the citation based on its position (e.g., whether it is free standing, at the head of a string or in the interior of a string). The process then generates a data record 120 containing information about the depth of treatment information that is applied to each citation in the case of interest. The negative treatment process 116 generates information about any negative treatment the case of interest has received by any of the citing cases and, in step 122, a database 124 containing information about each legal case being processed is updated manually to reflect the negative treatment. The data records 118, 120 from the quotation verification and depth treatment processes, respectively, may be combined together by a grouper process 126 along with a headnote assignment data record 128 (HNRESULT), as described below, to generate a single data record containing the depth treatment information, the quotation information, and the headnote assignment information, about the legal case being processed. This single data record may then be used to generate the information displayed on a computer screen to the user as shown in FIGS. 2A-2D.

The data record 118 containing the information about the verified quotations in the legal case also may be fed into a citation loci identification process 130 which attempts to identify the supporting text surrounding quotations and citations in the legal case to generate a citation loci data record 132. The citation loci data record may then be input into a subject matter assignment and thresholding process 134 which matches the words and phrases in the quotations to one or more headnotes or topics and then determines, based on a threshold value, which headnotes are selected, as described below with reference to FIG. 10. The subject matter assignment and thresholding process 134 outputs the data record 128 (HNRESULT) containing the selected subject matter text, such as headnotes, which is fed into the grouper 126, as described above. Thus, the system in accordance with the invention automatically generates information about a legal case and then provides that information, using a graphical user interface, to a person using the system when requested. The user may quickly and efficiently locate various information, such as citation information, depth of treatment information, negative treatment information and subject matter text, such as a headnote, about the legal case from a single source. More details about the system will now be described with reference to FIG. 4.

Figure 4:
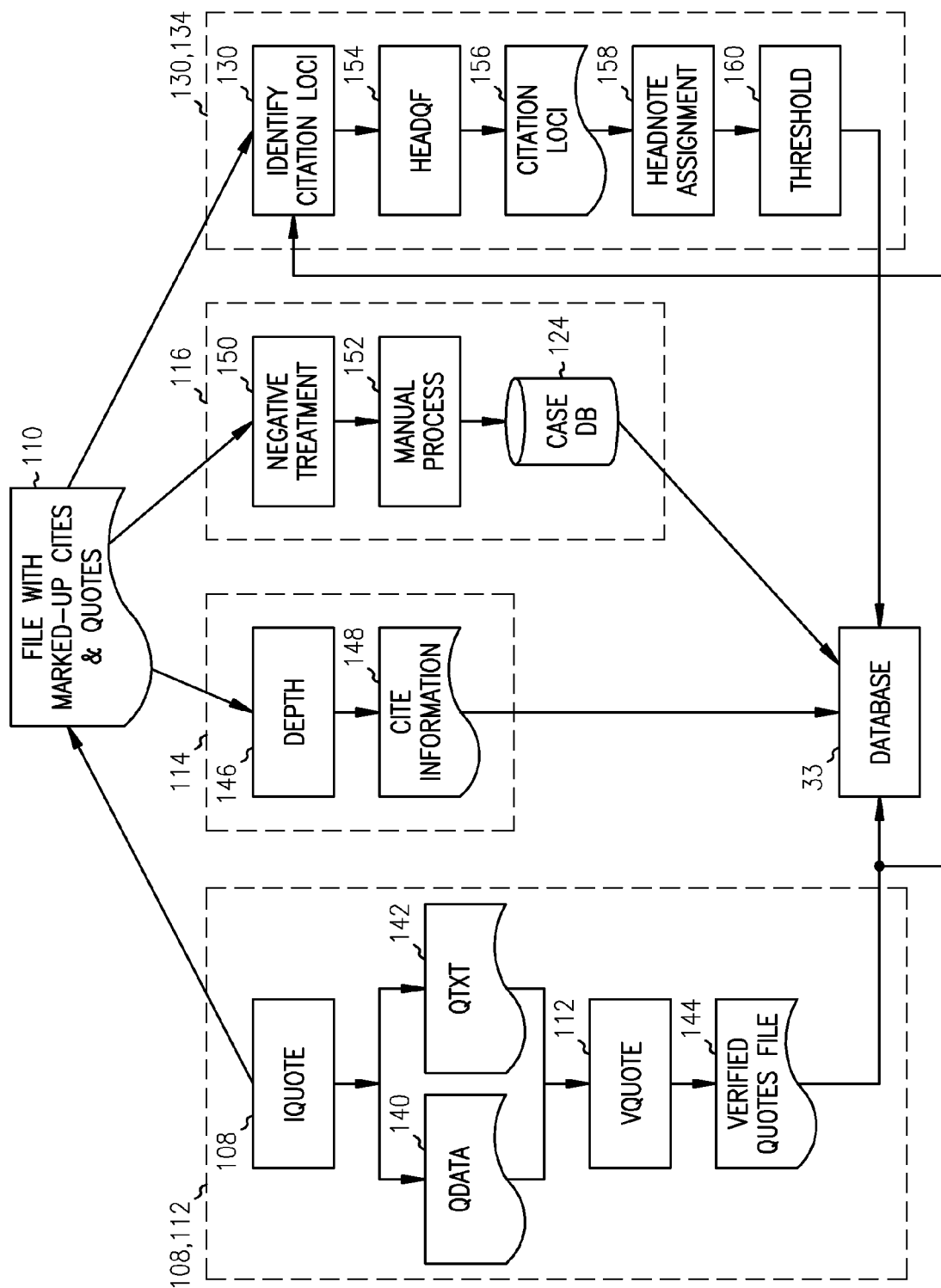
FIG. 4 is a diagram illustrating more details of the flow of data in the case law citation system of FIG. 3.

FIG. 4 is a diagram illustrating more details of the quote identification process 108, the quote verification process 112, the depth treatment process 114, the negative treatment process 116, the citation loci identification process 130 and the subject matter assignment and thresholding process 134 of FIG. 3. As shown, the outputs from each of these processes are fed into a system information database 33, as described above.

The quote identification process 108 uses the file containing the text of the legal case with marked up citations to identify and mark-up quotations as described above. The text the legal case contains unverified quotations while the file 144 containing the verified quotations is stored in the database 33. The output of the quote identification process is a plurality of data records in which each data record has an identified quotation and a possible source of the quotation. The output of the quote identification process may be combined with the file containing the text of the legal case and the marked up citations to produce a file with marked up citations and quotations 110 which is used as an input to the depth of treatment process 114, the negative treatment process 116, the loci identification process 130 and the subject matter assignment and thresholding process 134. During the quote identification process 108, as described below in more detail with reference to FIGS. 5 and 6, several processes are performed. First, candidate quotations in the text file are identified by scanning the text to identify symbols, e.g., quotation marks, which indicate the beginning or end of a quotation. Next, the beginning and end of the identified quotations are marked up with a quote identifier symbol, such as "% q". Finally, a possible source of the quotations, such as the legal case or other legal material from which the quotations originate is tentatively identified. The source of the quotation is then verified during the quote verification process 112 as described below. The output of the quote identification process 108 may include a Qdata file 140 which contains information about each quotation that is later verified against the probable source of the quotations and a Qtxt file 142 which contains the actual text of the quotations.

The Qdata and Qtxt files 140, 142 are then fed into the quote verification process 112 which uses an electronic database of legal cases, already available, to find and verify the possible source of each quotation found by the quotation identification process. For each quotation, the possible source of the quotation is retrieved. Next, the quotation identified by the quotation identification process is matched against the text of the possible source to locate text in the source corresponding to the quotation. This verifies the source as the origin of the quotation. For each quotation with a verified source, a data record 144 containing the verified quotations for a legal case is stored in the database 33. Then, when a legal case containing verified quotations is displayed as a citation to a legal case, the citation will contain a quotation symbol, as described above, indicating that the legal case has a verified quotation. The depth treatment process will now be described.

The depth treatment process 114 may receive the file 110 containing the legal case text with the marked up citations and quotations and, in step 146, the depth treatment process performs several processes in order to determine the significance of the citation based on a set of predetermined criteria that are related in some ways to significance. These criteria may be the number of times that the citation appeared in the legal case, the type of the citation, and the association of a verified quotation with the citation. First, the depth treatment process reads through the file 110 and identifies citations which have been marked up previously by the citation identification process. For each identified citation, the type of the citation is determined to be either an ordinary citation, a middle of a string citation, or the head of a string citation. An ordinary citation is a typical citation which usually appears within a legal case and that does not have other citations adjacent to it. A middle of a string (interior) citation is a citation that appears in the middle or at the end of a string citation in which a series of legal documents are cited together in a sentence or paragraph. An interior citation is usually perceived by users as contributing less to the depth with which the cited case is discussed. The head of string citation is a citation that appears at the beginning of a string citation and is perceived by users as contributing more to the depth since it is conventional to place the most pertinent citation at the head of a string citation. The depth of treatment process may also identify the page number of the legal case for all available pagination on which the citation appears so that a depth record is written as many times as page breaks occur in the legal case.

The information about each citation in a legal case, such as the total number of times that the citation appears in the legal case document, the types of each of these citations, and the page number for each citation occurrence is output in a file 148 which is stored in the database 33. This information, in addition to any verified quotations associated with any of the occurrences of the citation, may be used to generate both the "citations to the case" section described above and the depth of treatment symbols. The technique for generating the depth of treatment symbols will be described in more detail below.

The negative treatment process 116 may include an automatic processing step 150 and a manual verification step 152 which generate a list of the negative history (i.e., other written opinions from other legal case which disagree with or overrule the current legal case) for the legal case. During the automatic processing step 150, the file containing the legal text with the marked up citations and quotations is scanned in order to identify stems of certain words, such as "overrule", "recede", "disapprove", or "distinguish", which may indicate negative treatment. As an illustration, the process to identify the root of the word "overrule" in the text of the legal case is described. When an instance of the root "overrule" is identified, a set of heuristic rules, as described below, are applied to make a determination about whether the sentence containing the identified root is actually an overruling, as described below with reference to FIG. 8. Then, during the manual verification process 152, a human operator of the system verifies the results of the automatic process and the actual verified overrulings are added to the case control database 124. The human operator may also identify other negative history about the legal case which cannot be easily identified automatically, as described below. The negative treatment process aids a human operator in rapidly identifying overrulings. These overrulings are negative history which affect the authority of the reasoning of the legal case.

The loci identification process 130 uses the file containing the legal case text with marked up citations and quotations and a file 144 containing the verified quotations, identifies any marked up citations, and applies a set of heuristic rules, as described below, to identify and select a portion of text from around each citation which may indicate the text supported by the citation. If a citation appears multiple times in a legal case, the surrounding text for each of the occurrences of the citation is combined. In addition, if the quote verification process, as described above, has verified any quotation associated with that citation, the text of that verified quotation is also combined with the other text surrounding the citation. All of the identified text that surrounds each citation may then be used to determine one or more headnotes or subject matter headings which may be applicable to the citation. The subject matter heading classifies the citation based on a predetermined number of subject matter areas, such as Intellectual Property or Patents. A process 154 (Headqf) reads all of the text identified adjacent to a given citation and generates a natural language search query to search an existing database for matches to the identified text, as described below. The natural language query process is generally described in U.S. Pat. Nos. 5,265,065 and 5,418,948, which are assigned to the same assignee as the present application and are incorporated herein by reference. The Headqf process 154 generates a file 156 containing the natural language queries. Using the natural language queries, a subject matter assignment process step 158 runs the natural language queries against a headnotes database to identify subject matter headings, such as headnotes, which possibly match the text surrounding the citation. For each matched subject matter heading, the query also generates a belief score value indicating how close the subject matter heading match was to the text. A predetermined number of the most closely relevant subject matter headings and their belief scores are provided to a thresholding process step 160.

The thresholding step uses the subject matter headings identified and performs various calculations which take into account the rank of the subject matter headings, the belief score of the subject matter headings and the number of citations which reference that subject matter heading. After the calculations are performed, a predetermined number of top headnote hits and a flag for each headnote indicating if the headnote passed the thresholding are stored in the database 33 with a link to the citation. These subject matter headings permit citations in the legal case to be classified by and searched for using these subject matter headings, as described above with reference to FIG. 2D. Now, the quote identification process will be described in more detail.

Figure 5:
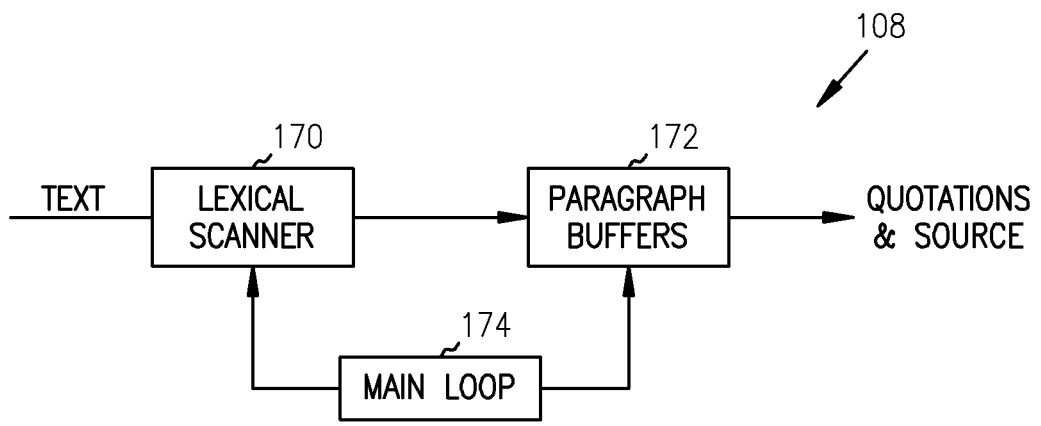
FIG. 5 is a diagram illustrating a system for quotation identification in accordance with the invention that may be part of the case law citation system.
Figure 6:
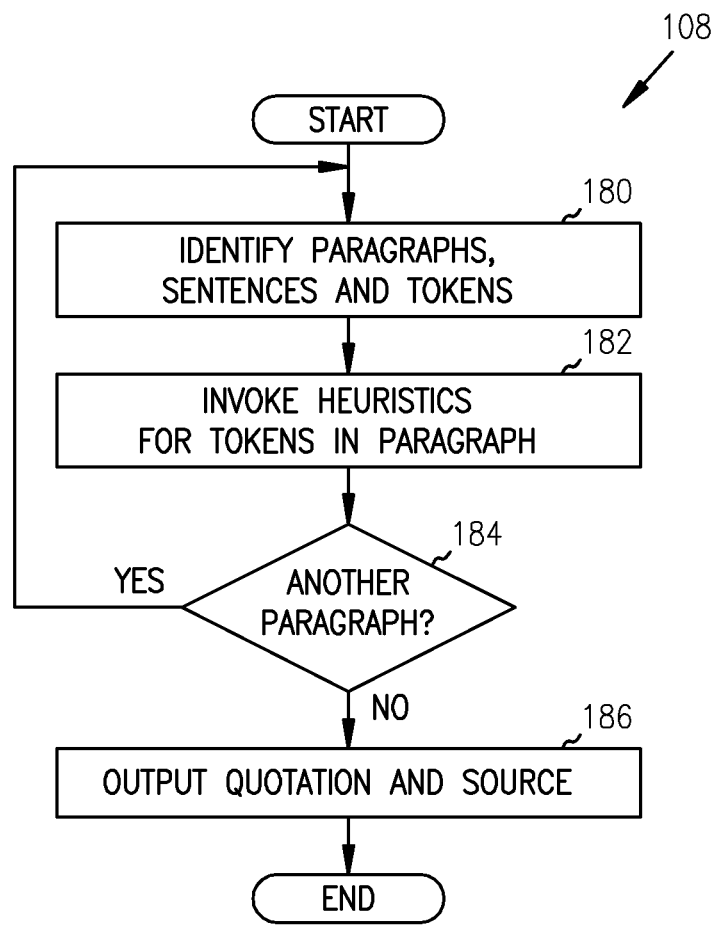
FIG. 6 is a flowchart illustrating a method for quotation identification and verification process in accordance with the invention.

FIGS. 5 and 6 are diagram illustrating more details about the quote identification process 108 in accordance with the invention. The quote identification process 108 may include a lexical scanner process 170, a paragraph buffer 172 and a main loop process 174 to receive the text of the legal case and automatically generate a file containing each quotation identified and a possible source for each quotation. The lexical scanner 170 splits documents into logical fragments, known as tokens, and these tokens are then used by the main loop process 174 to identify quotations. The tokens which are identified by the lexical seamier may include capitalized words, punctuation marks that might end a sentence, white space such as one or more spaces, case names, footnote references, star of quote markers and end of quote markers. The lexical scanner process used may be based on any of a number of commercially available software applications, such as, for example, an application known as FLEX, available from Sun Microsystems Inc, Mountain View, Calif. The lexical scanner accepts grammar specifying patterns and identifies an action when a specific pattern is located. In particular, the lexical scanner, in accordance, with the invention may divide a legal case into the certain types of paragraphs based on a predetermined set of criteria, such as a set of rules: 1) a paragraph which might contain a quotation; 2) paragraphs which are indented block quotations; 3) paragraphs which contain important information about the document, such as the star of the document, the document's serial number or the end of the document; and 4) paragraphs which are of no interest to the quotation identification process, such as headnotes, headings and the like. A variety of different criteria and rules may be used to identify these paragraphs.

An example of a set of rules which may be used by the invention will now be described. The set may include a rule that identifies paragraphs which do not contain any quotations and stores them in the paragraph buffers where they are overwritten by the next paragraph, and a rule for paragraphs with possible quotations in which the lexical scanner returns a tag to the main loop indicating that the paragraph is either a normal text paragraph, an indented block quotation paragraph, or that the text of the quotation appears in a footnote. Once the type of the paragraph is determined, the lexical scanner processes the text within the paragraph in the same manner to identify any tokens in each paragraph.

Within each paragraph, the lexical scanner may identify the following tokens: a capitalized word, a non-capitalized word, a numeric character string, an abbreviation, a proper name (i.e., "Mr. Smith"), a case citation, a section reference (i.e., "Section 150"), a case name (i.e., *Roe* v. *Wade*), an embedded reference, any end of the sentence punctuation, any other punctuation characters, a colon, semicolon or comma followed by a space, single or multiple white space characters, a start of a quotation, an end of a quotation, the number of a footnote, open and close parentheses, open and close brackets, open and close curly braces, a mark-up for a citation, and a mark-up for an embedded reference. More details about the operation and modification of the FLEX software application is available from the Sun Microsystems Inc. Reference Manual, Programmer's Overview Utilities and Libraries, Chapter 9, pp, 203-226, which is incorporated herein by reference.

The paragraph buffers 172 are where the tokens about the paragraph most recently scanned by the lexical scanner are stored before being processed by the main loop 174 and then possibly written out into an output file if a quotation is identified in the paragraph. The main loop 174 may decide what action to take for each token returned by the lexical scanner, manage the paragraph buffers, and decide when to discard data for a previous paragraph from the paragraph buffer, link several physical paragraphs together into a virtual paragraph for quotations which run over several physical paragraphs, determine where the breaks between sentences occur within a paragraph, and decide when to process a virtual paragraph by a set of heuristic rules, as described below.

FIG. 6 is a flowchart of the quotation identification process 108 in accordance with the invention. In step 180, the legal case text is scanned paragraph by paragraph and for each paragraph, the sentences and tokens in the paragraph are identified. In the step 182, a set of heuristic rules is applied to each token in a paragraph to determine if a quotation had been identified. One of the most important functions of the lexical scanner and the quotation identification process is to identify the beginning and end of a quotation. This is difficult since each writer may use a slightly different format for the beginning and ending of a quotation. Therefore, several rules are needed to identify the beginning and ending of a quotation. An example of a set of heuristic rules that may be applied to accomplish such identification will now be described. These rules may use the lexical scanner to identify a conventional start quotation punctuation symbol, such as """, to identify a conventional end of quotation delimiter, such as """, or to identify a start/end of quotation symbol in a longer string of characters. For example, a rule may attempt to identify strings in which the conventional end of quotation symbol is embedded within a sentence. For each of these rules, the characters surrounding the token may be checked to ensure that the token is in fact a star of end of the quotation.

Once the rules have been applied to each token in a paragraph, the quotation identification process determines if another paragraph exists in step 184 and loop to step 180 to process a new paragraph. Once all of the paragraphs have been analyzed, in step 186, the process output the data record containing the identified quotations and the possible source of those quotations. Now, the quotation verification process will be described.

Figure 7:
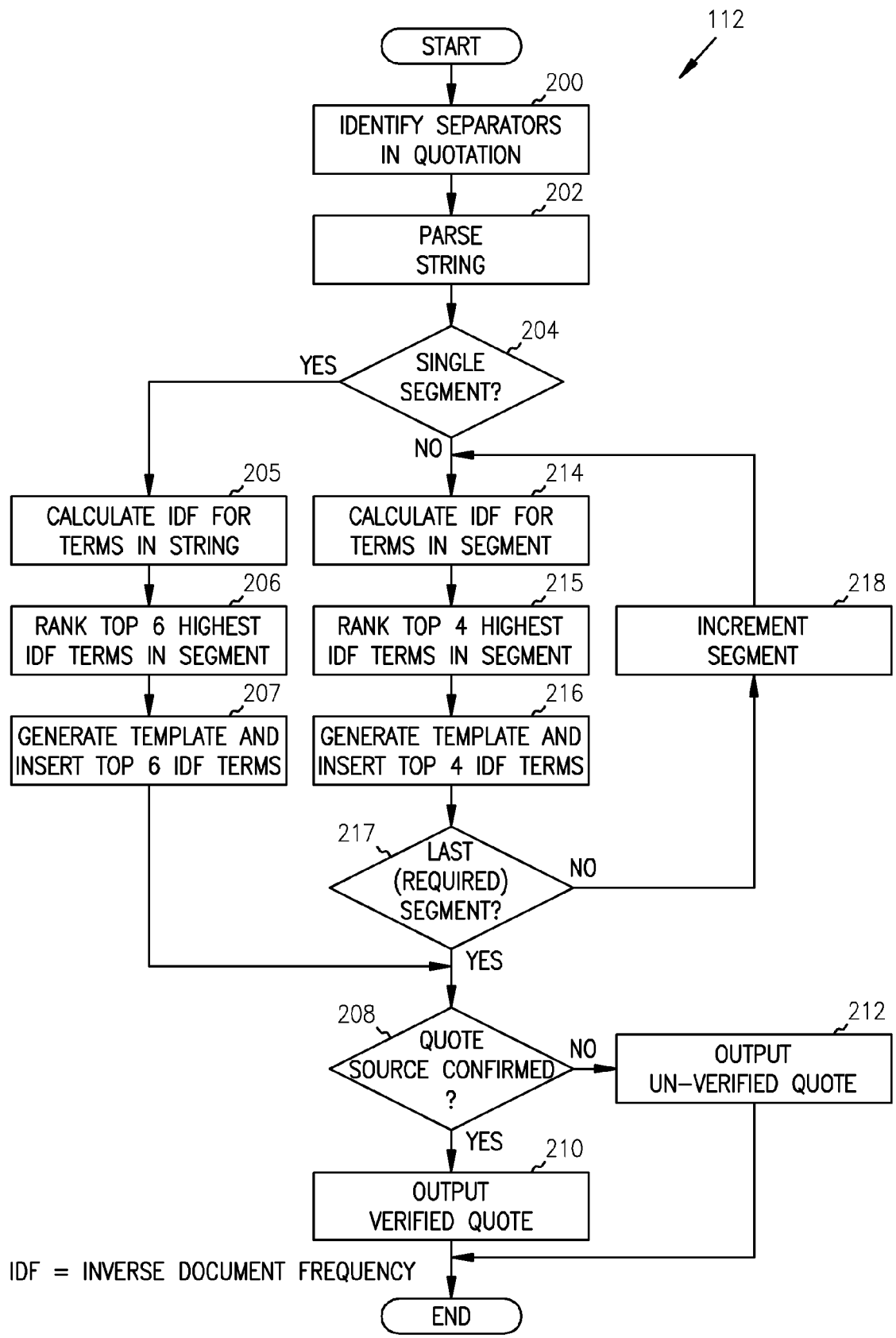
FIG. 7 is a flowchart illustrating a method for quotation verification in accordance with the invention.

FIG. 7 is a flowchart illustrating the method 112 for verifying a quotation in accordance with the invention. At step 200, the quote verification process reads in the text strings identified as quotations by the quote identification process 108 and identifies separators, when present, from a predetermined set of separators in the text strings. The separators may include ellipses, bracketed expressions, and stop phrases. The stop phrases include a variety of legal phrases and others which do not help identify the source of a quotation, for example, "citation(s) omitted", "sic", "emphasis provided" and the like. When present, the separators are used to parse the text string into segments in which each segment includes the works that occur between a pair of separators. In step 202, the text string is parsed to determine its length since the minimum verifiable quote length may be, for example, six non-stop words, where stop words are non-content bearing words such as articles and prepositions. The text string is also parsed to collapse any words which contain apostrophes or other punctuation marks (e.g., "T]hen"). The parsed quotation text string falls into one of two distinct categories: (1) a text string with a single segment, or (2) a text string with multiple segments. Thus, in step 204, the system determines if the text string has a single segment. If the text string has a single segment, then in step 205, the collection normalized inverse document frequency (IDF) for each term (word) in the single segment of the text string is determined. A document frequency value indicates the frequency of a particular term in a typical document collection, while IDF is equal to the reciprocal of document frequency (i.e., 1/doc freq), or in other words, the rarity of a term in a document collection. In a preferred embodiment, the collection normalized inverse document frequency (IDF) may be calculated, if the number of occurrences of a word is greater than zero, as:

$$\mathrm{idf\_score} = \frac{\log\frac{(\mathrm{Collection}\ Docs)}{(\mathrm{Doc\_Occurences})}}{\log(\mathrm{Collection\_Docs})}$$

where Doc_Occurences is the number of documents in which the given term is present and Collection_Docs is the total number of documents in the collection. The IDF is used for purposes of determining good terms for matching, since a rare word is more likely to be distinct and provide a good indication that the quotation is from the candidate source.

Once the IDF has been calculated for each term, a selected number of the terms (i.e., six) with the highest IDF values below a selected threshold may be ranked by IDF value (step 206) and placed into a "template" (i.e., storage array) (step 207) which indicates the position of each term in the text string. Any terms with an unusually high IDF value (e.g., greater than 0.80) are not used, since such infrequently occurring terms are often misspelled words. If there are several terms with the same IDF value, then the alphanumeric ordering of the terms may be used as a secondary key for ranking the terms for the template. Should there still exist equivalent terms (e.g., terms with the same IDF values and alphanumeric spellings) then the position of the terms in the text string may be used as a third key for ranking the terms in the template. The template may then be compared to the quotation from the candidate source document to determine if an exact match, based on the positions of the high IDF terms, occurs in step 208. If an exact match occurs, then in step 210, the verified quotation is output and fed into the database as described above. In the event that an exact match does not occur in step 212, a certification match failure message is generated and the quotation is not stored in the database.

In step 204, if the text string has multiple segments (i.e., it contains one or more separator terms in the text string, such as "The roof fell in . . . crashing down), the process goes to step 214 in which the IDF for each term within each required segment is determine. Then, a selected number of terms (e.g., four) within each segment, with the highest IDF values below the threshold, are ranked by IDF (step 215) and placed into a template (step 216) in order to determine the position of the terms in the segment for matching purposes (step 208). For a text string with more than four segments, the first two and last two segments may be used to match against the candidate source document (step 217-218). In this manner, the quotations identified by the automatic quote identification process are automatically verified and any verified quotations are identified by a quotation symbol, as described above. Now, the negative treatment process in accordance with the invention will be described.

Figure 8:
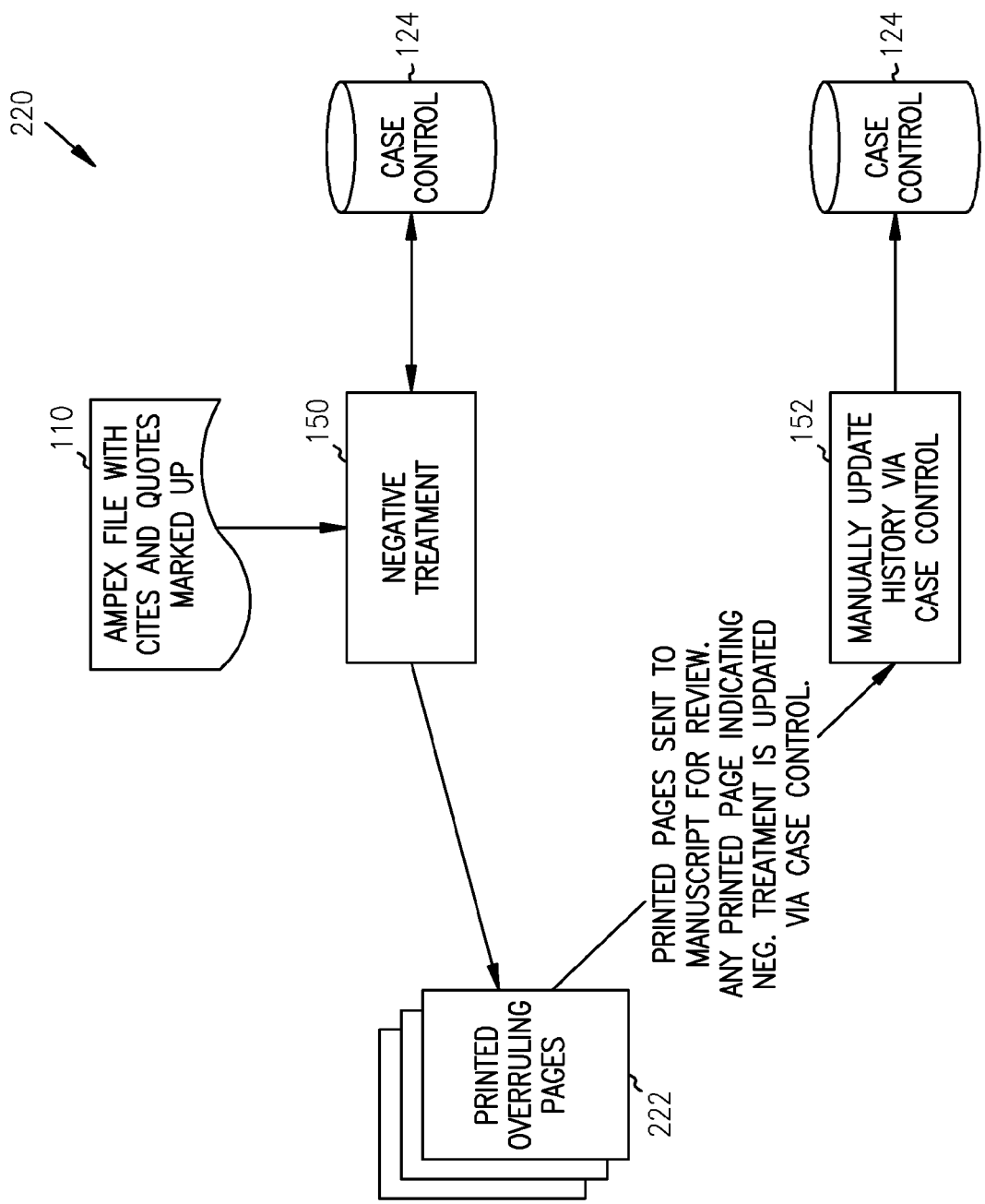
FIG. 8 is a diagram illustrating a negative history determining process in accordance with the invention.

FIG. 8 is a diagram illustrating a method 220 for determining the negative treatment of a legal case in accordance with the invention. The file 110 containing the text of the legal case with the marked up quotations and citations is input into the automatic negative treatment process 150. The automatic negative treatment process may 1) identify occurrences of the word stem "overrule" in the legal case; 2) determine the proximity of the stem to a citation; and 3) exclude any bad legal cases. Prior to identifying the stem "overrule", the case control database 124 may be checked and the automatic processing stopped if any history already exists for the legal case. To identify the occurrences of the stem "overrule", the text of the legal case is are scanned and the verb tense of any occurrences of the stem is determined. The verb tense of the stem indicates whether the overruling refers to the current case overruling a previous case or some other type of overruling. A set of heuristic rules may look for a particular verb tense and then take an action based on the verb tense.

An example of the set of the rules used will now be described, but the invention is not limited to any particular set of rules. For example, one rule may locate "overrule" or overrules" in a sentence and then scans backwards for up to four words. If "not" or never" is located, then the sentence is discarded since it does not refer to an actual overruling. If "we" is found, then the sentence is added to the list of possible overruling which are reviewed by a human being. If none of the phrases is located during the backwards scan, the sentence is also added to the list.

Another rule may locate "overrule" and then scans backwards for up to five words to attempt to locate non-case words which would indicate that something other than the legal case is being overruled so that the sentence is not added to the list. A few examples of these non-case words include "request", "motion", "objection", "claim", and "verdict". If the rule locates "point" or "points", then the sentence may be scanned forward to the end of the sentence and if "case", "cases" or "supra" is located, then the status of the sentence is unknown and it is passed on to the human reviewer.

Another rule may locate "overrule" and scan backwards or forwards, and reject or accepts possible overrulings based on the other words within close proximity to the word "overrule" since these additional words will provide the context in which the word "overrule" is being used. For example, once "overrule" is located, four words before the word may be scanned and the following actions are taken when the following words are located: 1) if "we" is located, and the word prior to "we" is "that", the "we" is ignored (discussion about overruling only), but if no word "that" is located, then the sentence is a possible overruling; 2) if the verb is modified by a word that indicates uncertainty, such as "rather", "might", etc. . . . the sentence is rejected since the court may be only indicating it might overrule the case; 3) if any word indicates a discussion of an overruling, then the sentence is rejected; 4) if a word indicates that another person did the overruling, then the sentence is rejected; and 5) if "will" or "should" are located, the process looks back five words for a positive word in order to accept the sentence. There may also be a similar set of rules for the verb "overrules", the infinitive form of the verb and the passive voice of the verb.

Another set of rules may look for various words which indicate a discussion of whether to overrule, whether a court has the authority to overrule or a past overruling since these sentences are rejected as not containing an actual overruling. Another set of rules may reject sentences which indicate that someone else is doing the overruling (i.e., another court in the past). Still another rules may look for "overruling" and then determine if the sentence is rejected or accepted based on the sentences surrounding the word, as described above.

There are also other rules which look for particular features of a sentence independent of the verb "overrule". For example, if the phrase "COURT:" is located at the beginning of a sentence, which indicates a direct quotation from the judge, the sentence may be accepted. If the word "Congress" is located at the beginning of a sentence, which may indicate that a Congressional statute is being overruled or that Congress itself is overruling a case, the sentence may be rejected. If the word "circulated" is found in a sentence near the word "overrule", the sentence may be accepted to catch unusual language, such as "because the decision overrules an opinion of this court, it was circulated to all active judges . . . " which could not be automatically identified in some other manner. Another rule may look for "overrule" within a quoted string and reject the sentence since it is usually an overruling by another court of a case which is being quoted by the current court.

In addition to the word stem "overrule", other synonyms may be searched for and identified. For example, the rules may also detect the word stem "abrogat" for California cases which use the term "abrogated" and the phrase "receded from" for Florida cases since these terms are used to indicate an overruling in each respective state. These verb tense rules may be applied in any order and the invention is not limited to any particular set of rules or any particular order of execution of the rules.

The output of the set of verb tense rules from the automatic negative treatment process is a list of possible overrulings. Then, a proximity rule is applied to each possible overruling to determine if the overruling applies to a particular legal case. For example, the proximity rule may eliminate a possible overruling if the sentence containing the stem does not contain a citation, if the previous or next sentence does not contain a citation or the sentence with the stem "overrul" does not contain a word or phrase used to refer to a case such as "case", "opinion", "holding", "precedent", their plurals or "progeny" or "v.", "ex rel", "ex parte" or "supra". Any sentences which contains the stem "overrul" and satisfies the proximity rules are added to a suggested list 222 of overruling in the legal case. These suggested overrulings are then reviewed and checked during the manual review process step 152 by a human being. The human being, during the manual review process, also determines the case which is overruled and that data is entered into the case control database 124 which tracks legal cases within the legal cases database.

In accordance with another aspect of this negative treatment process, the automatic process may also identify relationships other than overruled, such as "disting" for "distinguished" or "apposite" in a legal case, by extending the method to the language that characterizes those other relationships. In summary, the negative treatment process aids the human reviewer in determining possible overruling in the legal cases by automatically determining possible locations of overruling so that the amount of text that has to be actually reviewed by the human being is significantly reduced. Thus, the negative treatment process increases the speed with which overruling in a legal case may be identified and added into the negative history of the legal case. Now, the depth treatment process will be described in more detail.

Figure 9:
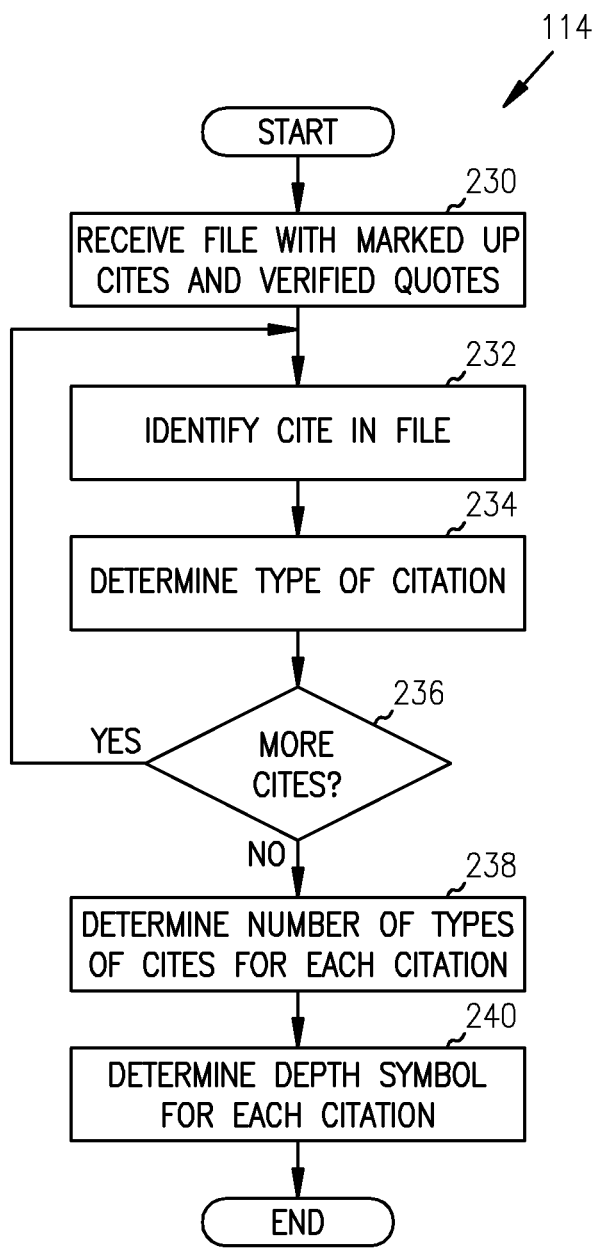
FIG. 9 is a flowchart illustrating a method for determining the depth of treatment of a legal case in accordance with the invention.

FIG. 9 is a flow chart of the depth treatment process 114 in accordance with the invention in which a depth treatment symbol is assigned to each citation within a legal case so that a person using the system may quickly determine the amount of text devoted to discussing a particular citation. This information may be utilized as one indication of the relevance of the citation since a court will devote more text and discussion to a highly relevant citation.

At step 230, the file with the text of the legal case and the marked up citations and quotations, as described above, is received by the depth treatment process. At step 232, the depth treatment process identifies a citation in the legal case, and then in step 234, the type of citation is determined. Each citation in the legal case may be 1) a citation at the head of a string citation; 2) a citation without other accompanying citations; 3) a citation within the interior of a string citation; or 4) a pro forma history citation (i.e., a citation that, in the context of the document, are cited solely as a ancillary historical references for one of the cases cited in its own right). Each of these types of citations has a different amount of significance. For example, a lone citation or a citation at the head of a string citation tends to be more significant than a citation in the middle of the string.

The depth treatment process next determines if there are any additional citations in the legal case in step 236 and loops back to step 232 to process the next citation in the legal case. Once all of the citations in the legal case have been identified and sorted into one of the types described above, they are fed into the grouper process 126 as shown in FIG. 3. After the grouper process, in step 238, the depth treatment process determines, for each different citation, the total number of each type of citation in the legal case. For example for a citation to *Pleasant* v. *Celli*, there may be a total of five cites in the legal case of which three are at the head of a string citation and two are within the interior of a string citation. This information about each citation in the legal case and any data about a verified quotation which is associated with a particular citation are used in step 240 to determine the depth symbol which will be assigned to the particular citation. Once the depth symbols have been assigned for each citation, the depth treatment process has been completed.

One example of a technique for assigning a depth symbol to a particular citation will now be described, but the invention is not limited to any particular technique for assigning the depth symbols. In addition, the invention is not limited to any particular type of depth symbol. In this example, a citation in the legal case with one to three occurrences of any type of citation (i.e., the citation standing along, the citation is the head of the string citation or the citation is in the middle of a string citation) in the legal case is assigned two stars (e.g., \*\*), a citation in the legal case with four to eight occurrences of any type of citation is assigned three stars (e.g., \*\*\*), and a citation with nine or more occurrences of any type of citation is assigned four stars (e.g., \*\*\*\*). To further refine these assignments, a citation with three occurrences of any type of citation and a verified quotation associated with the citation is assigned three stars (e.g., \*\*\*) while if a citation has only internal string citation types, one star is deducted from that citation. Thus, the depth symbol for a particular citation in the legal case is automatically assigned by the system in accordance with the invention. The depth symbols help a user of the system more quickly determine which citations are probably more relevant. Now, the subject matter text assignment process in accordance with the invention will be described.

Figure 10:
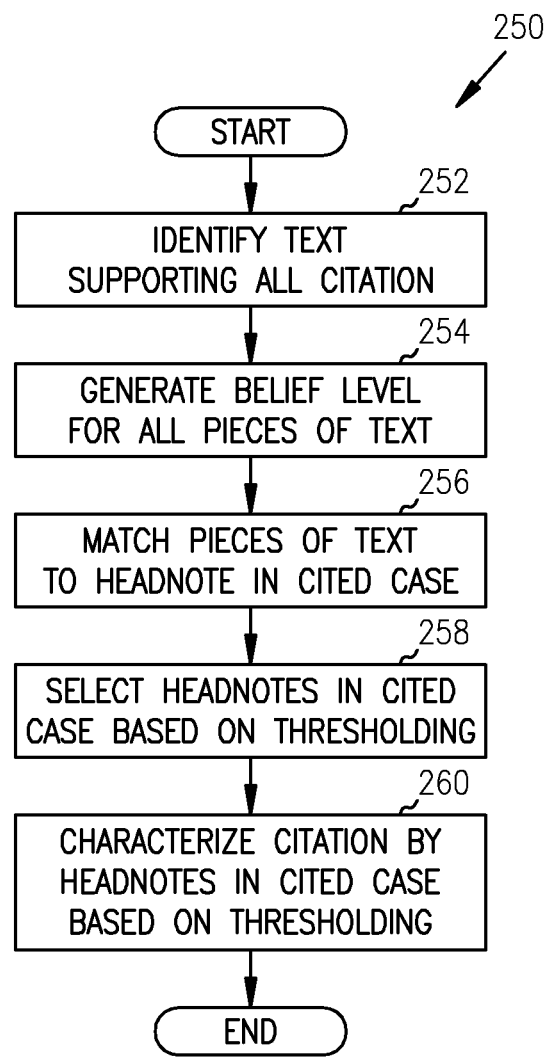
FIG. 10 is a diagram illustrating a method for assigning subject matter classifications in accordance with the invention.
Figures 1, 11:
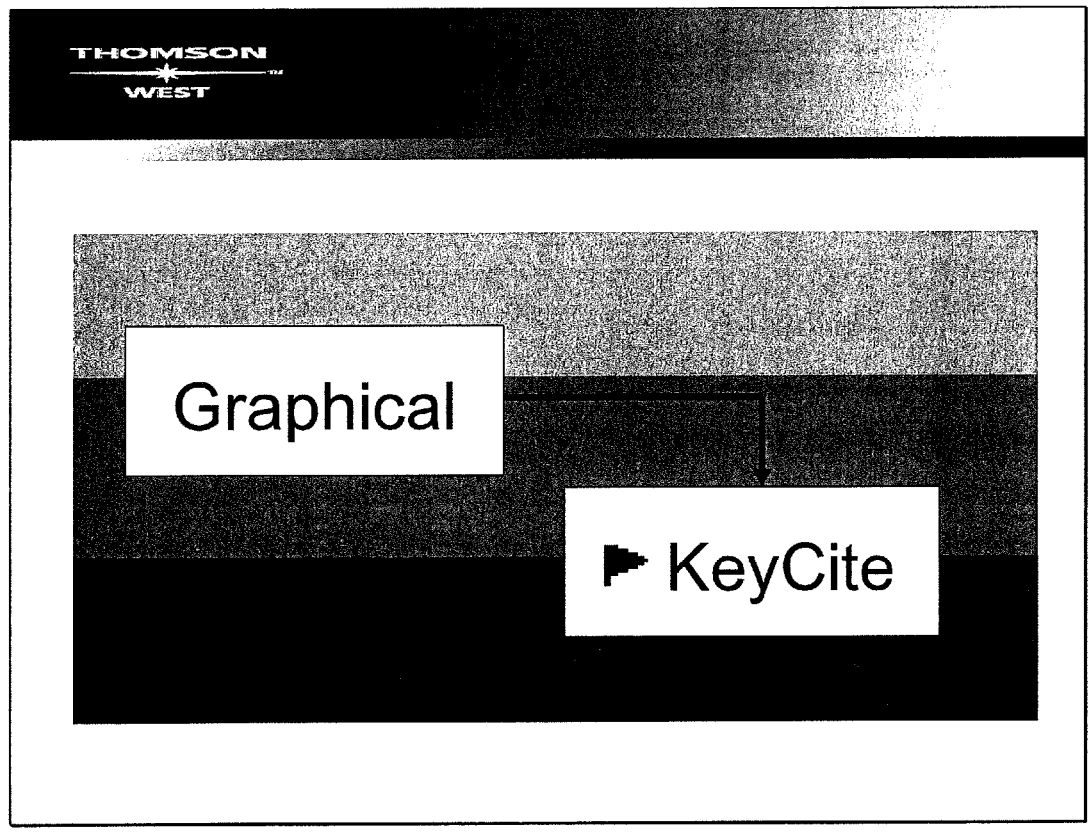
Figures 2, 11:
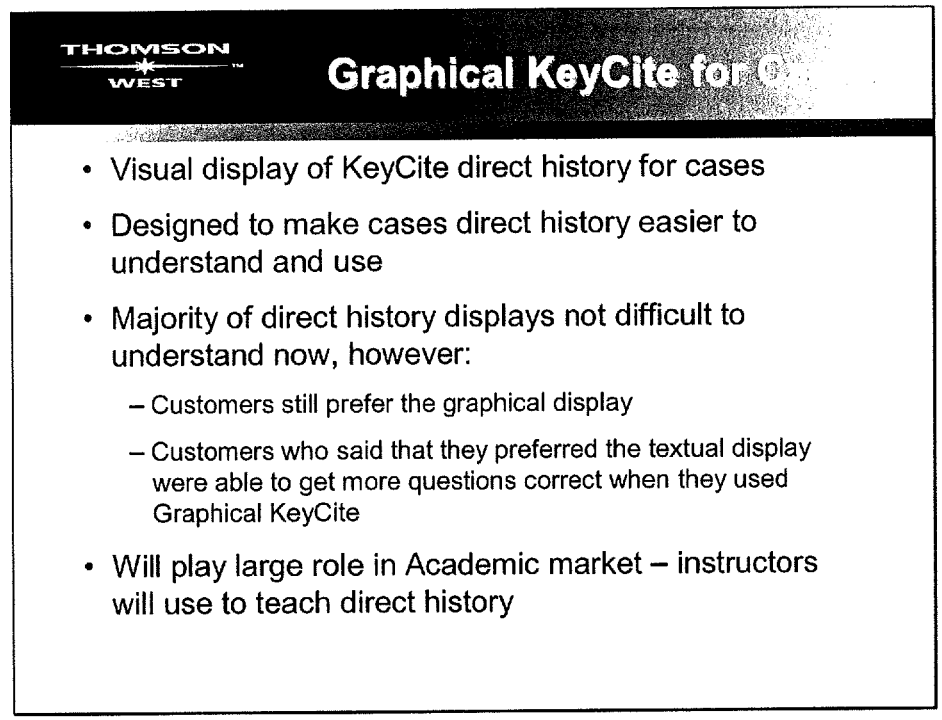
Figures 3, 11:
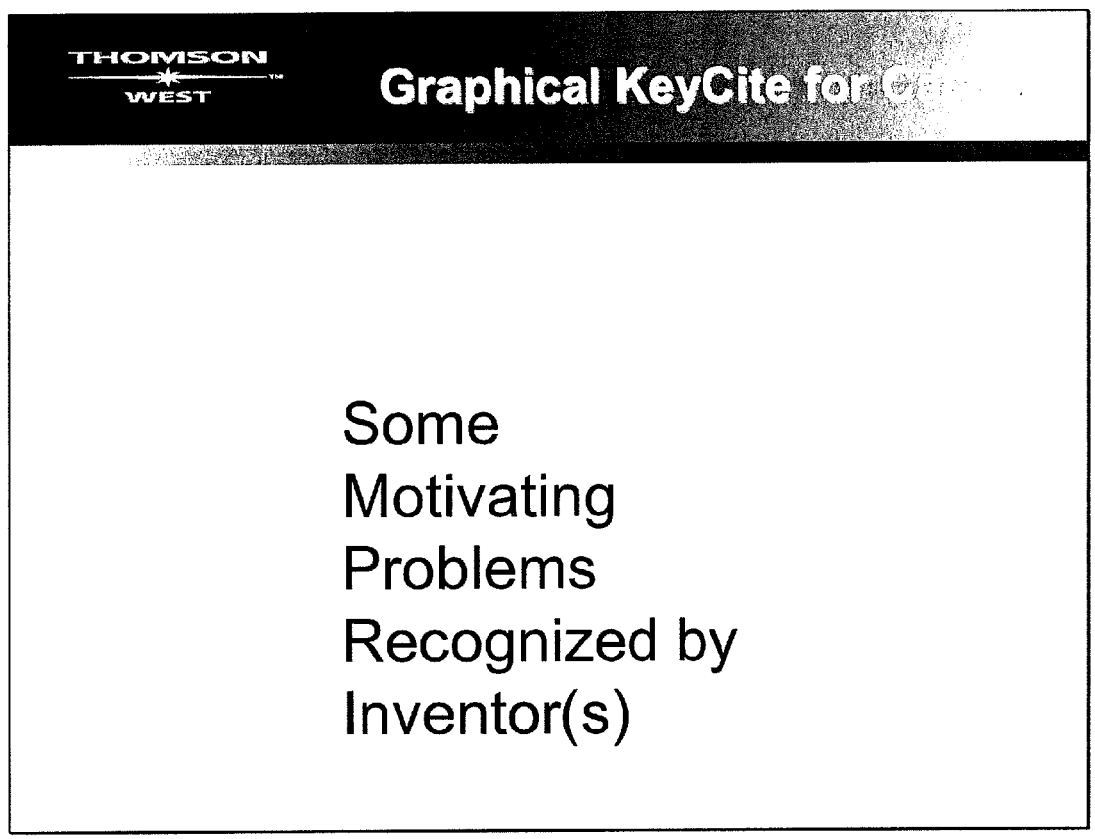
Figures 8, 11:
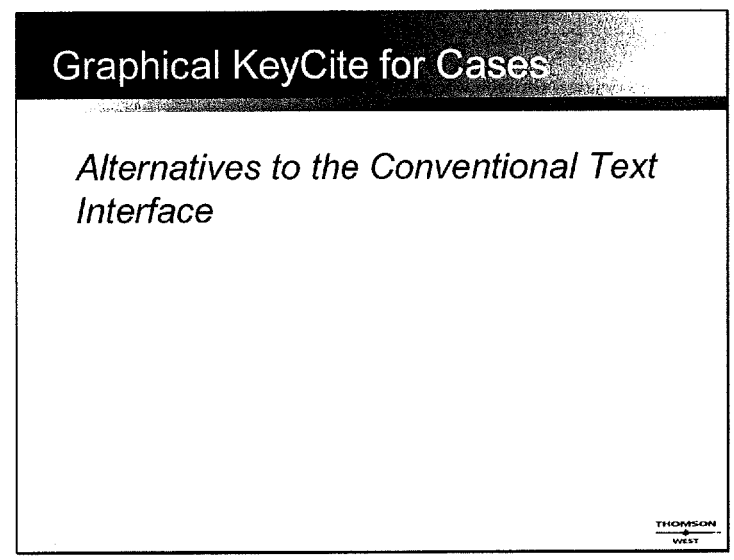
Figures 9, 11:
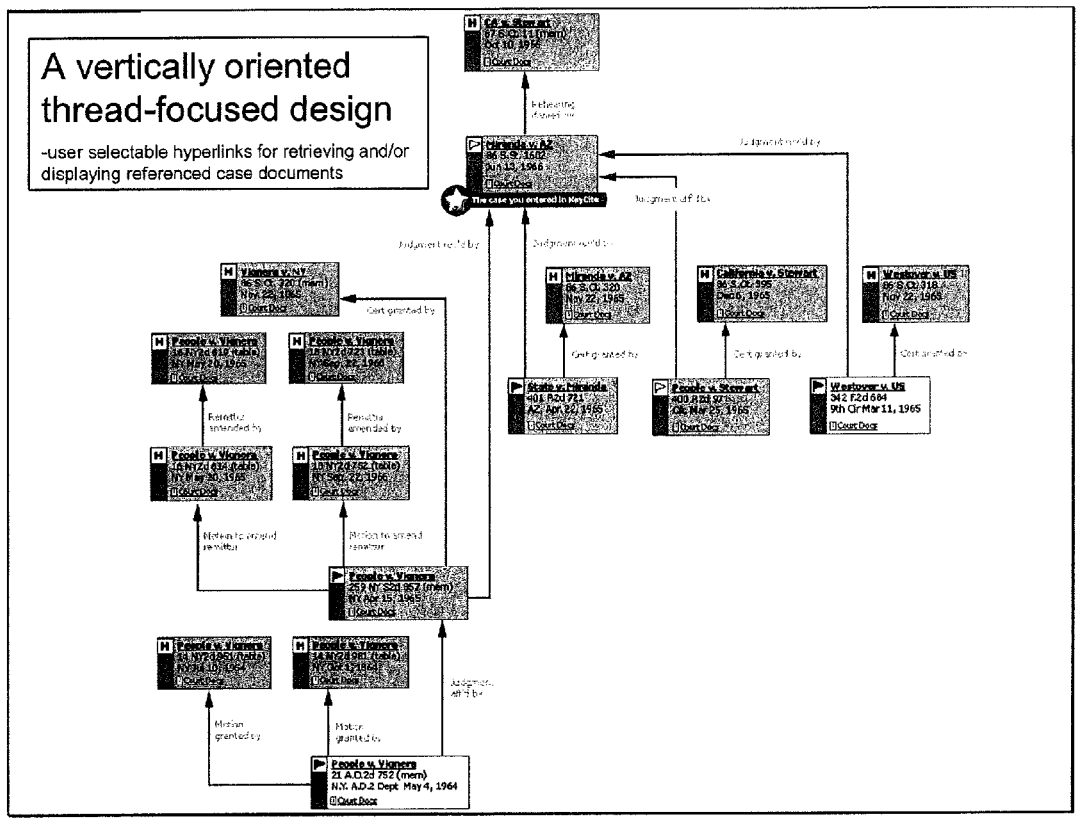
Figures 10, 11:
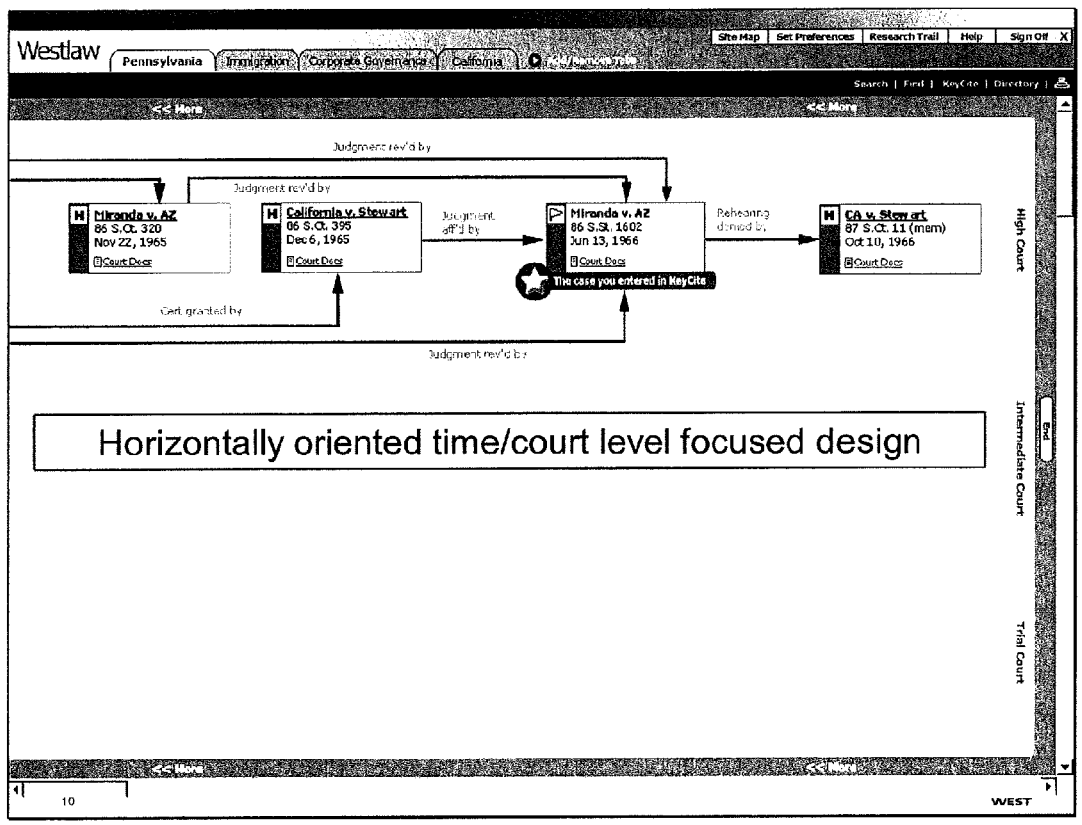
Figure 11:
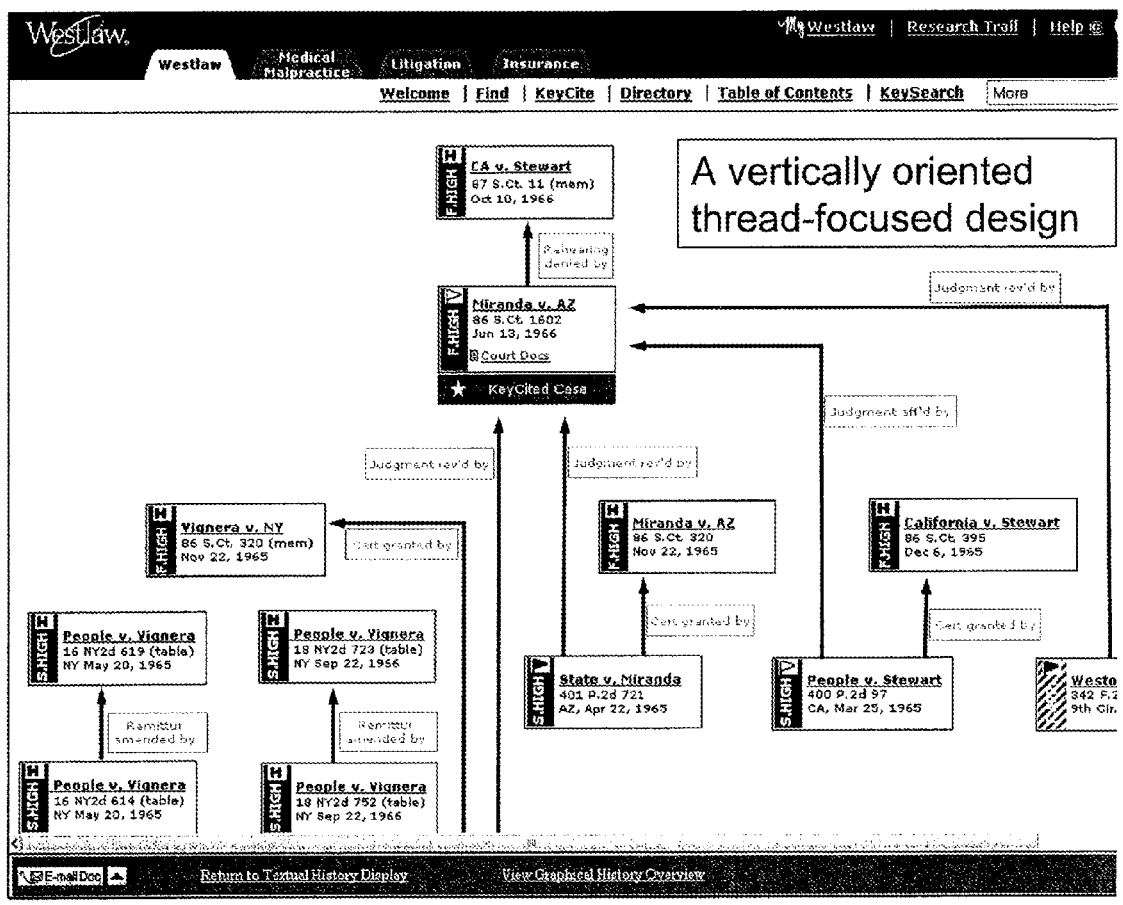
Figures 11, 12:
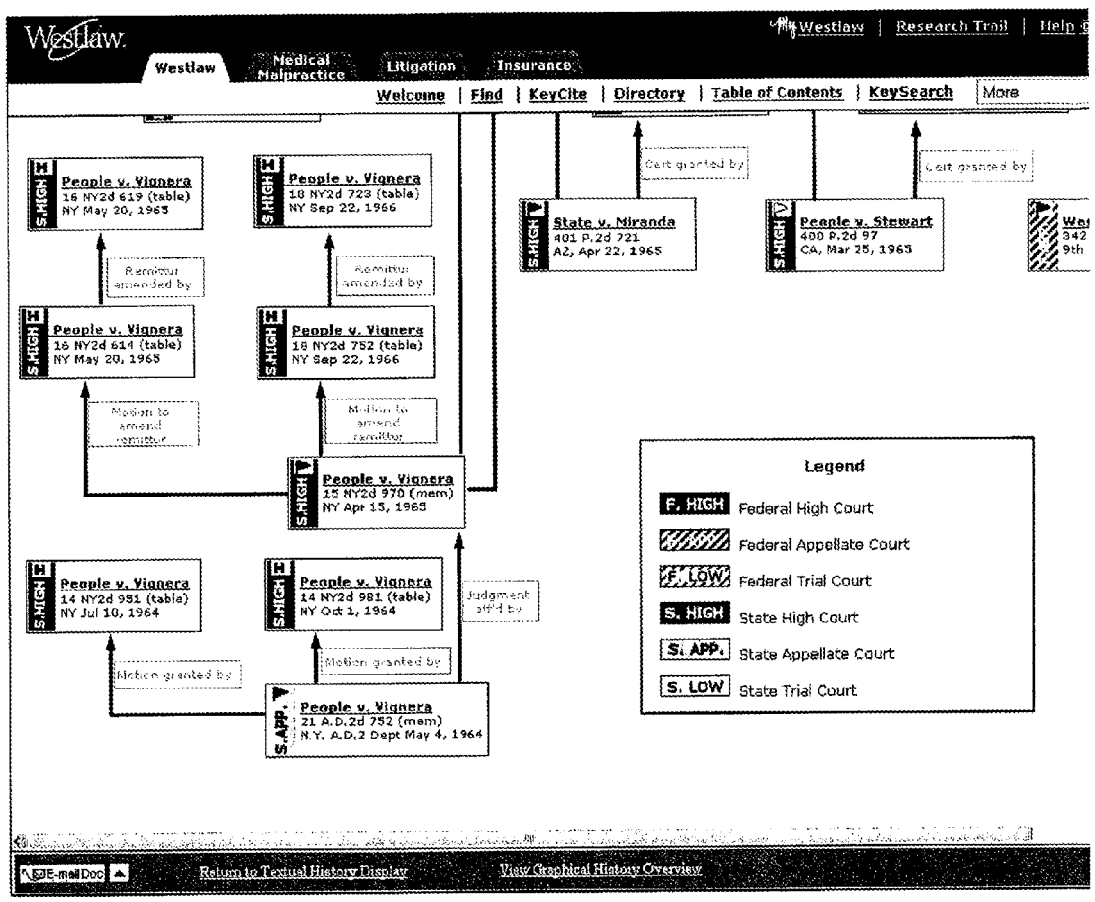
Figures 11, 12, 13:
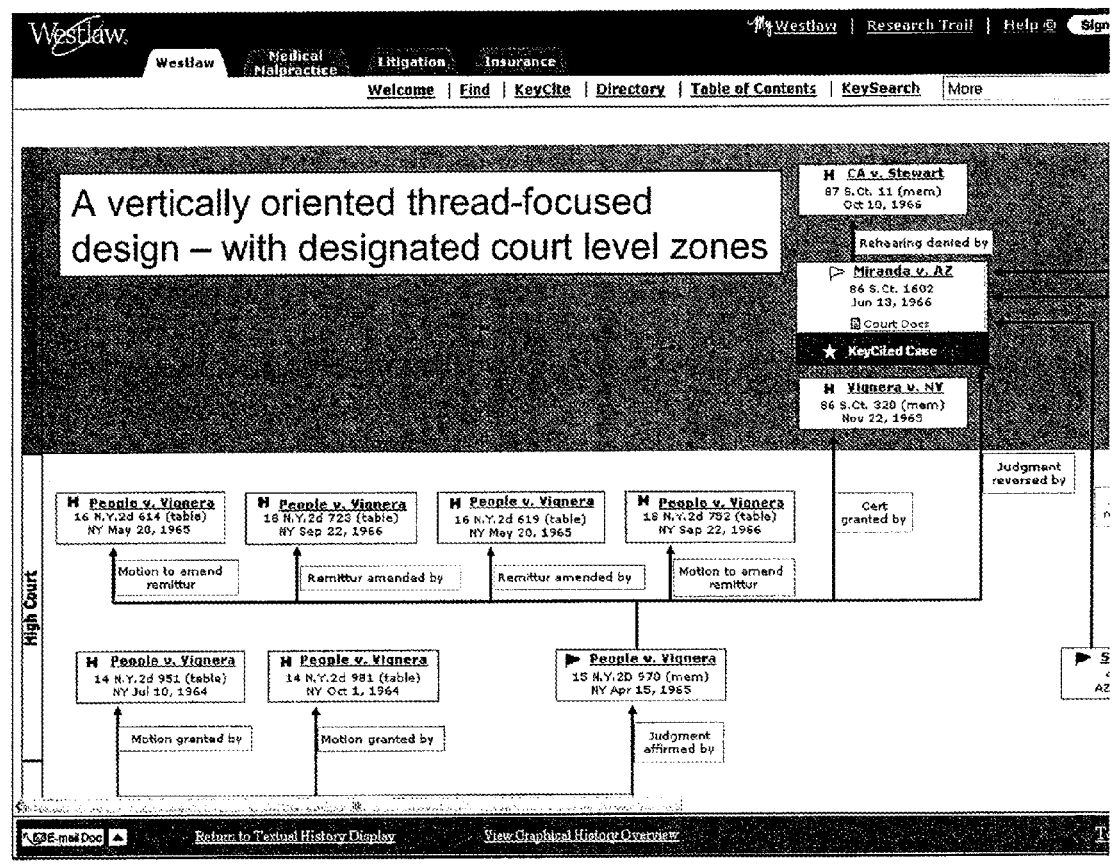
Figures 11, 12, 13, 14:
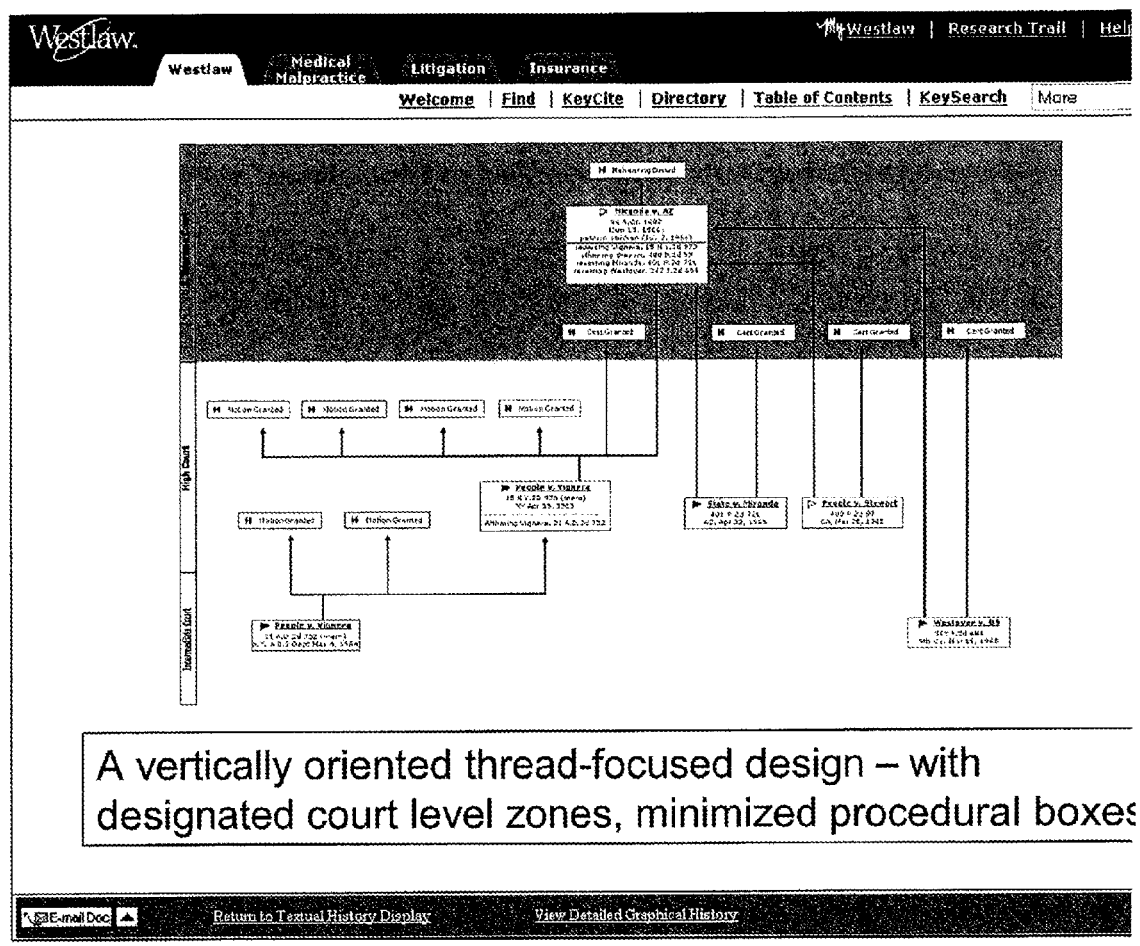
Figures 11, 12, 13, 14, 15:
Figures 11, 12, 13, 14, 15, 16:
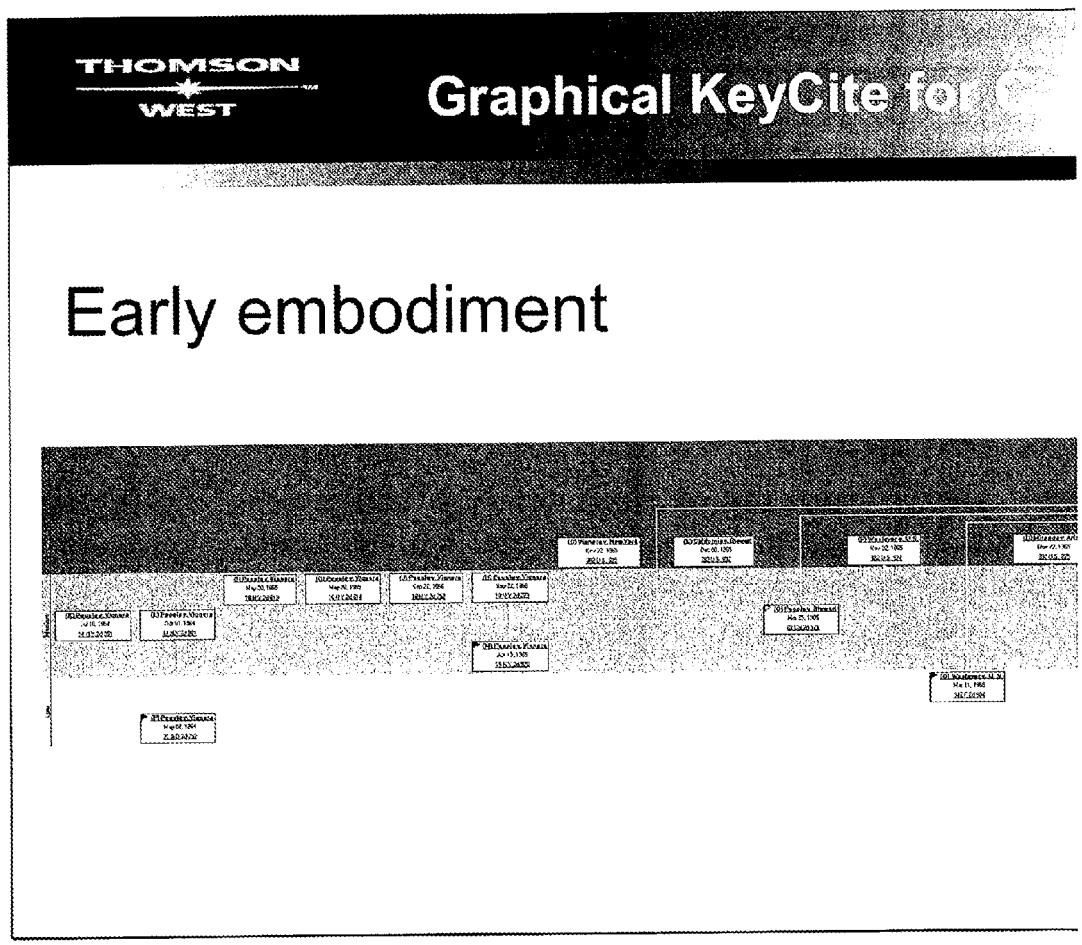
Figures 11, 12, 13, 14, 15, 16, 17:
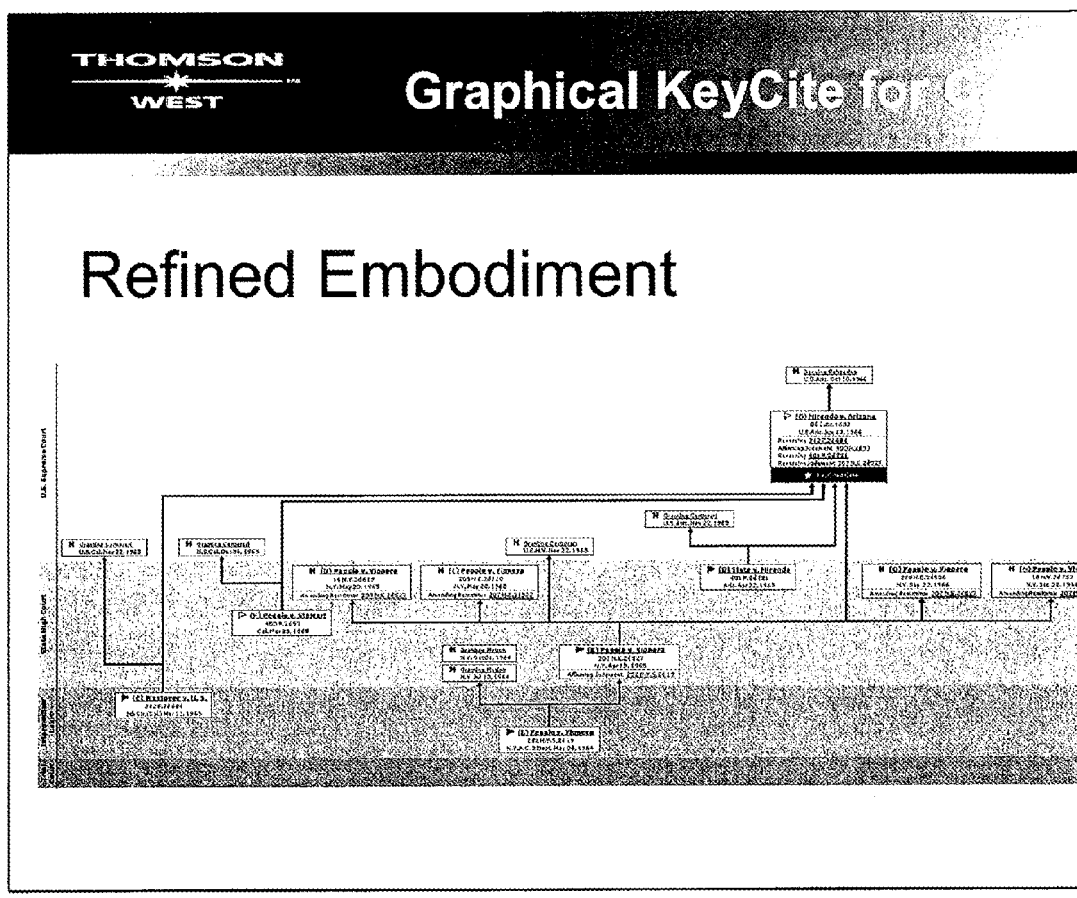
Figures 11, 12, 13, 14, 15, 16, 17, 18:
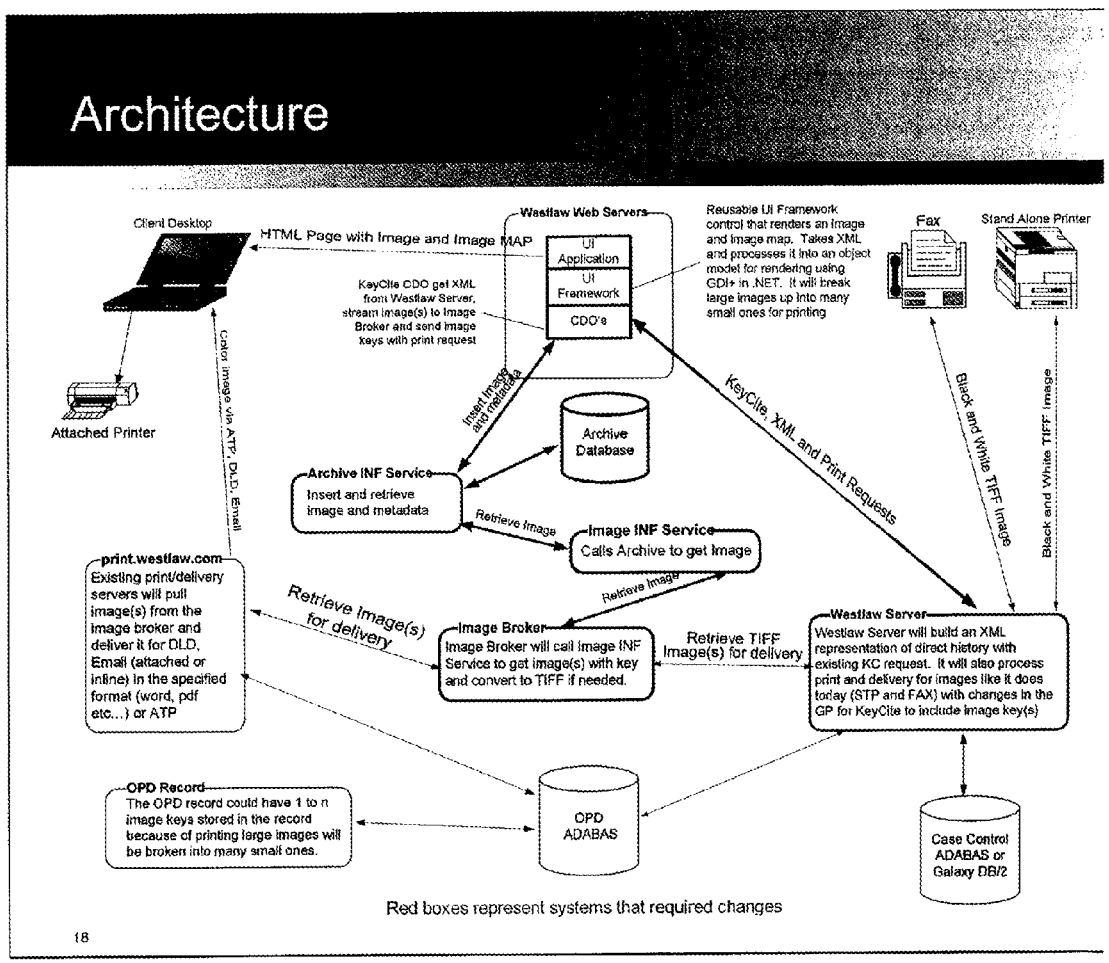
Figures 11, 12, 13, 14, 15, 16, 17, 18, 19, 20:
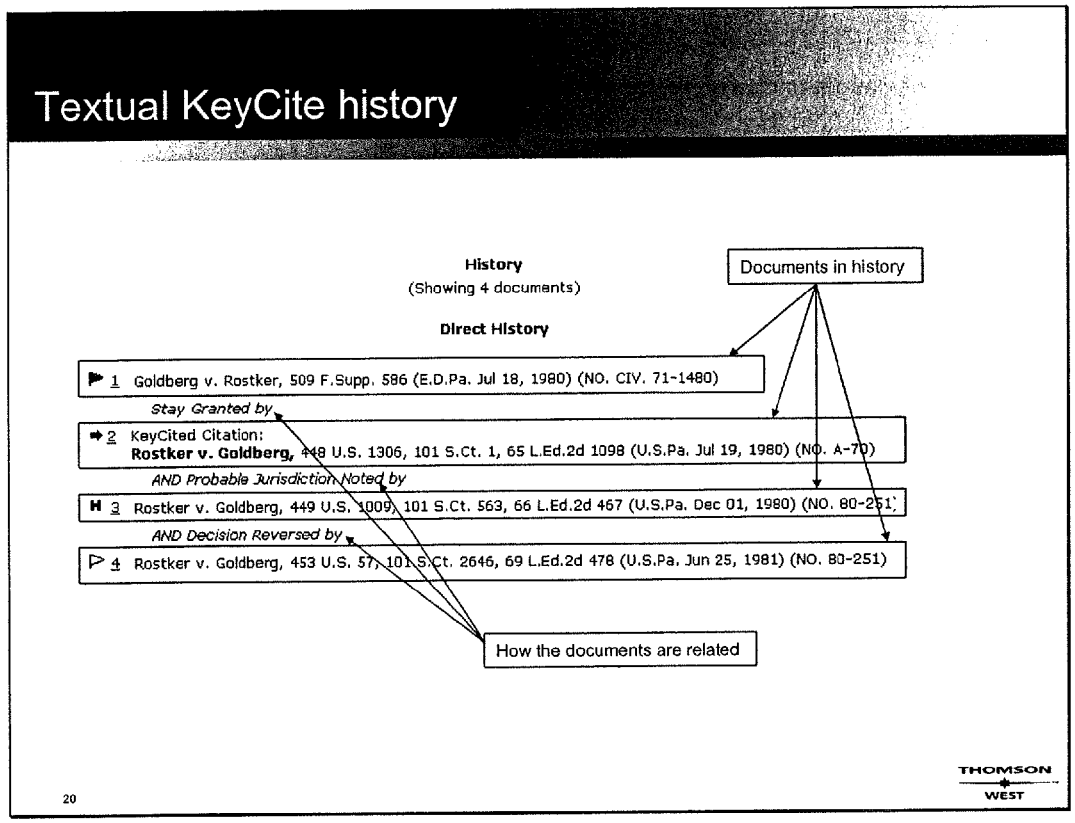
Figures 11, 12, 13, 14, 15, 16, 17, 18, 19, 20, 21:
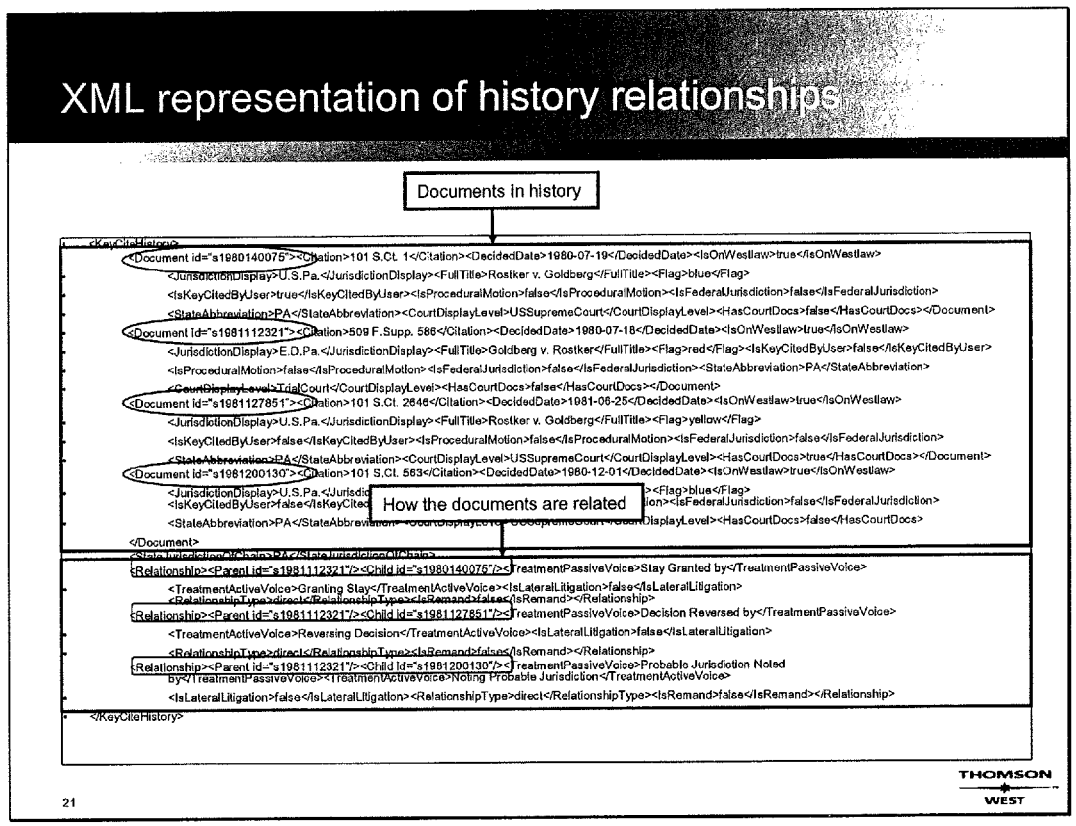
Figures 11, 12, 13, 14, 15, 16, 17, 18, 19, 20, 21, 22, 23:
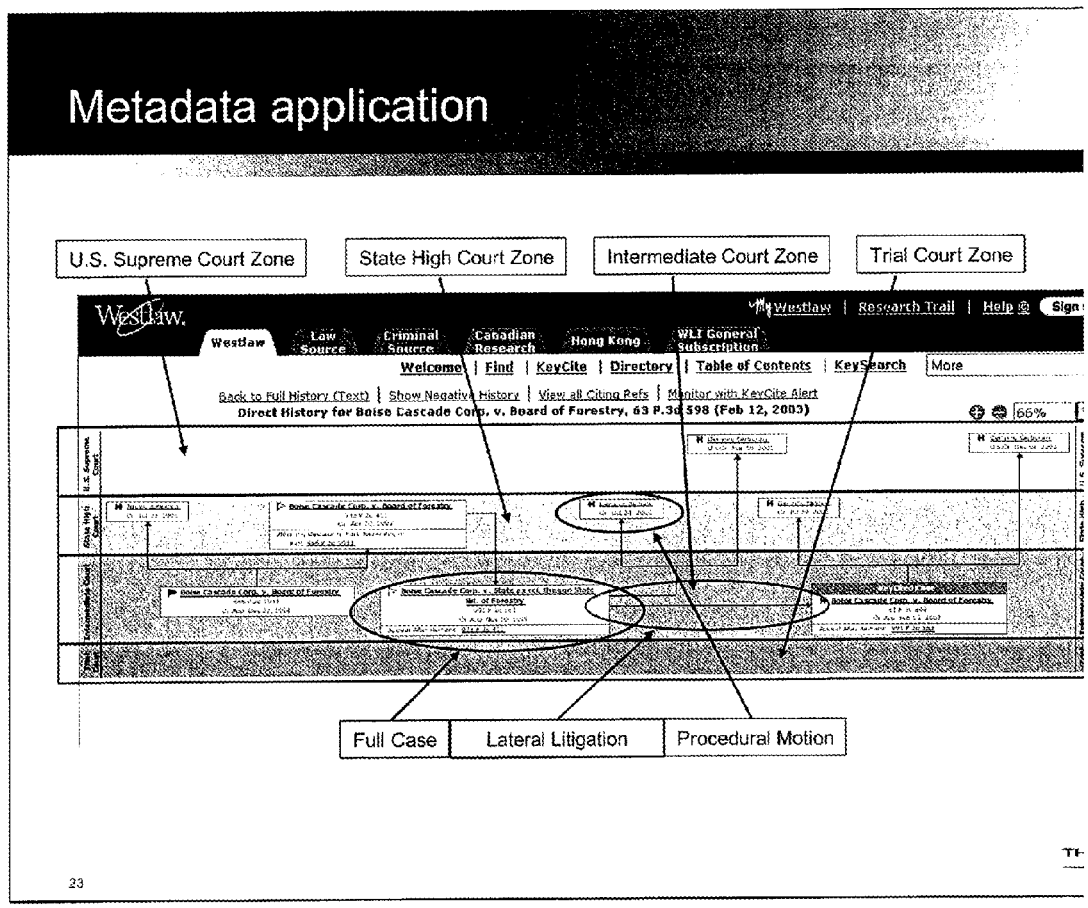
Figures 11, 12, 13, 14, 15, 16, 17, 18, 19, 20, 21, 22, 23, 24, 25:
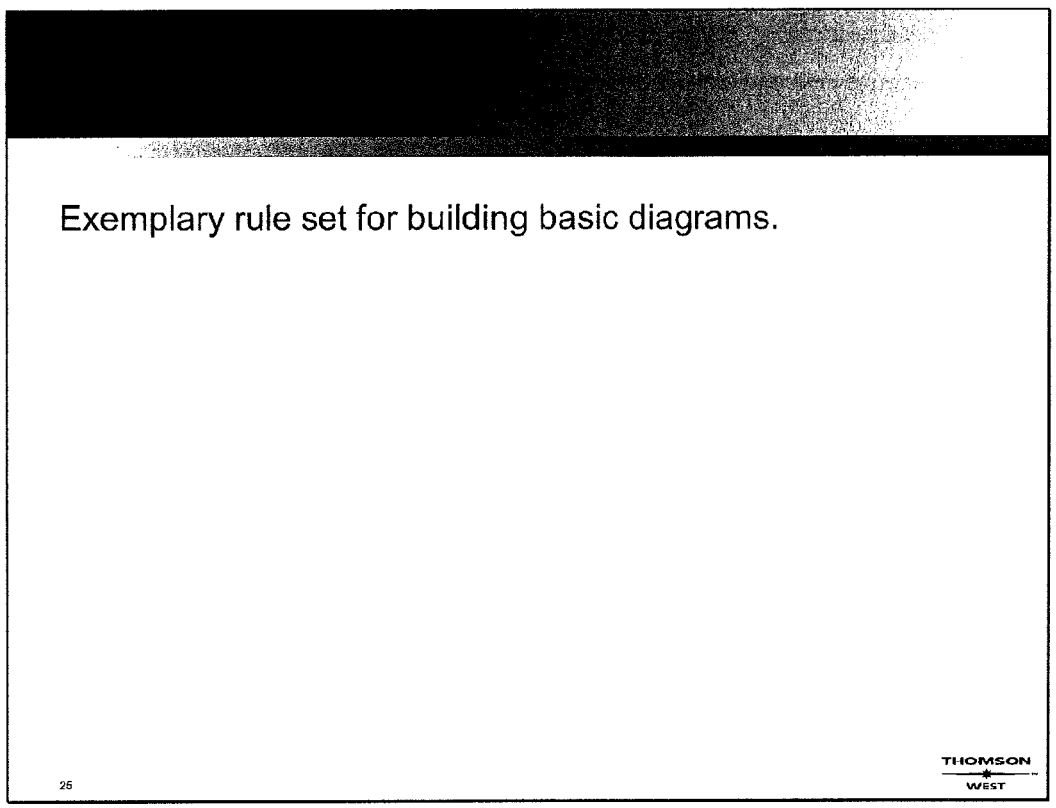
Figures 11, 12, 13, 14, 15, 16, 17, 18, 19, 20, 21, 22, 23, 24, 25, 26, 27, 28:
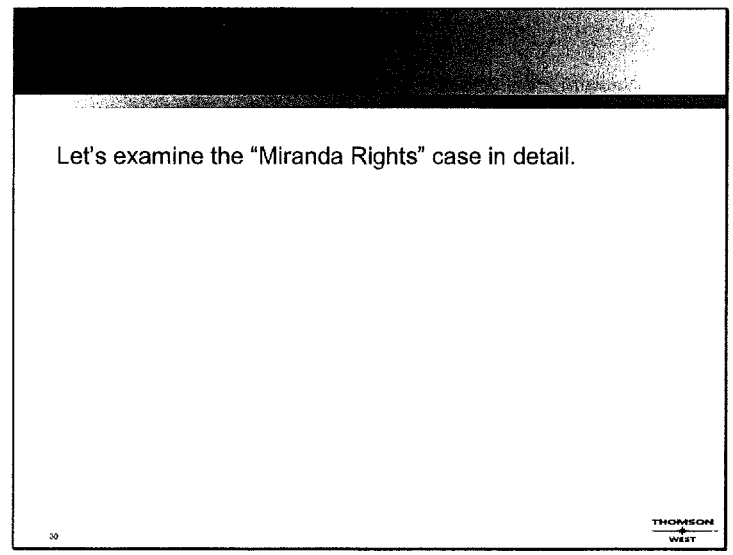
Figures 11, 12, 13, 14, 15, 16, 17, 18, 19, 20, 21, 22, 23, 24, 25, 26, 27, 28, 29:
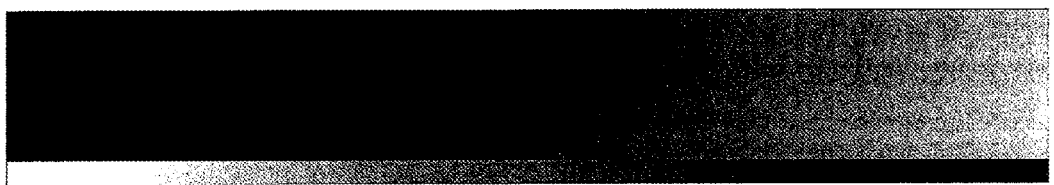
Figures 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54:
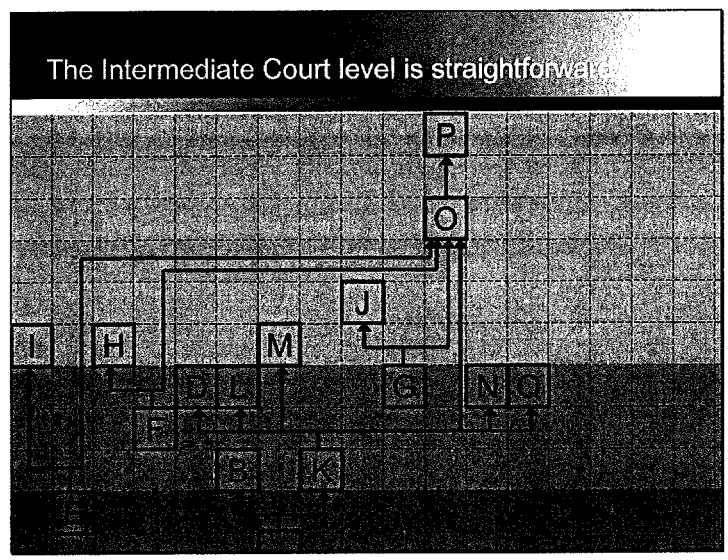
Figures 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55:
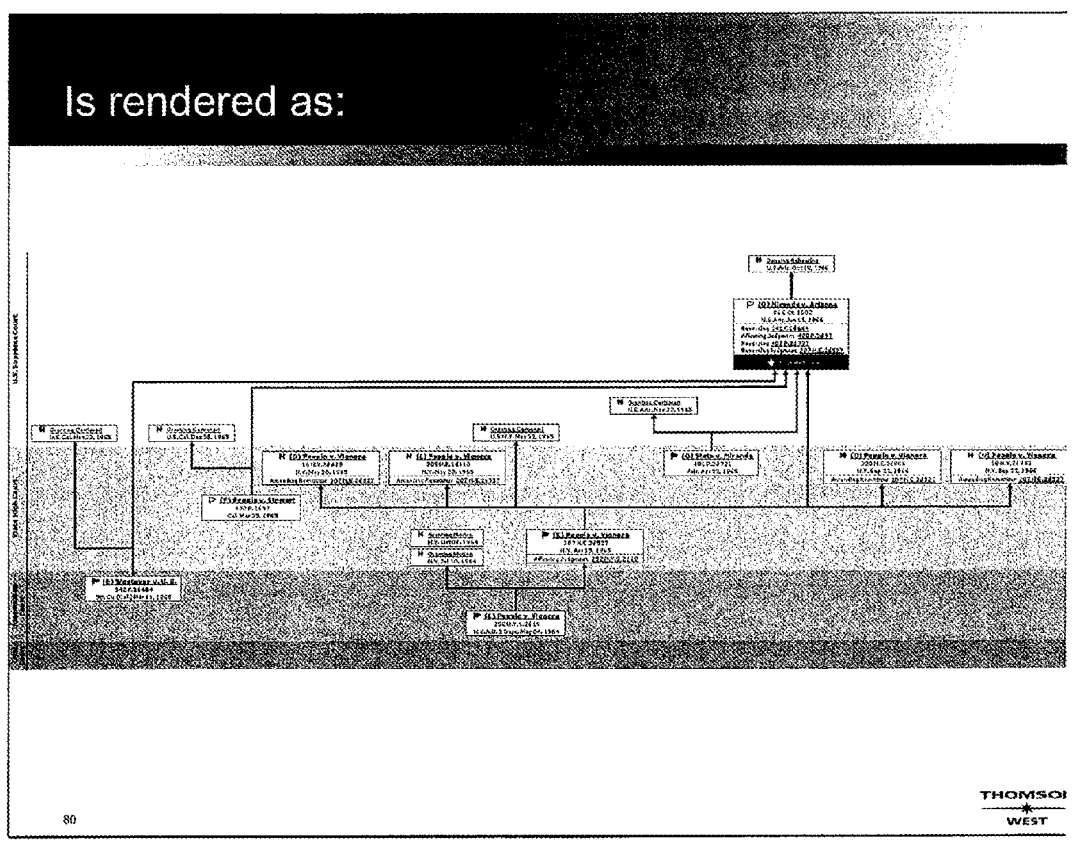
Figures 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57:
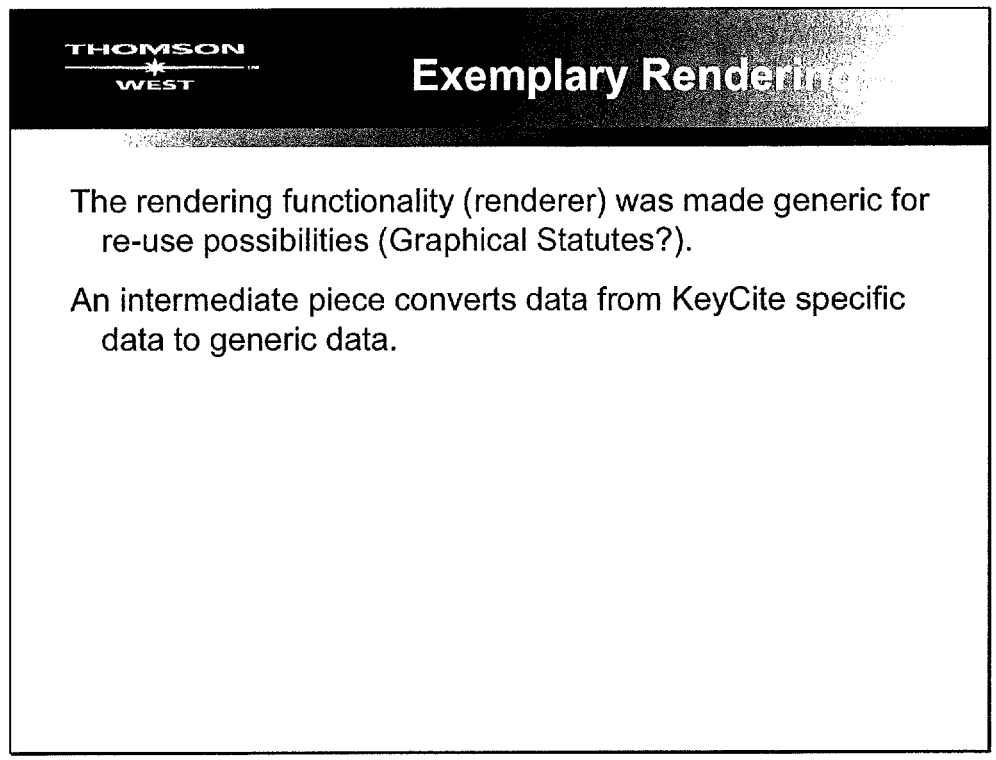
Figures 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58:
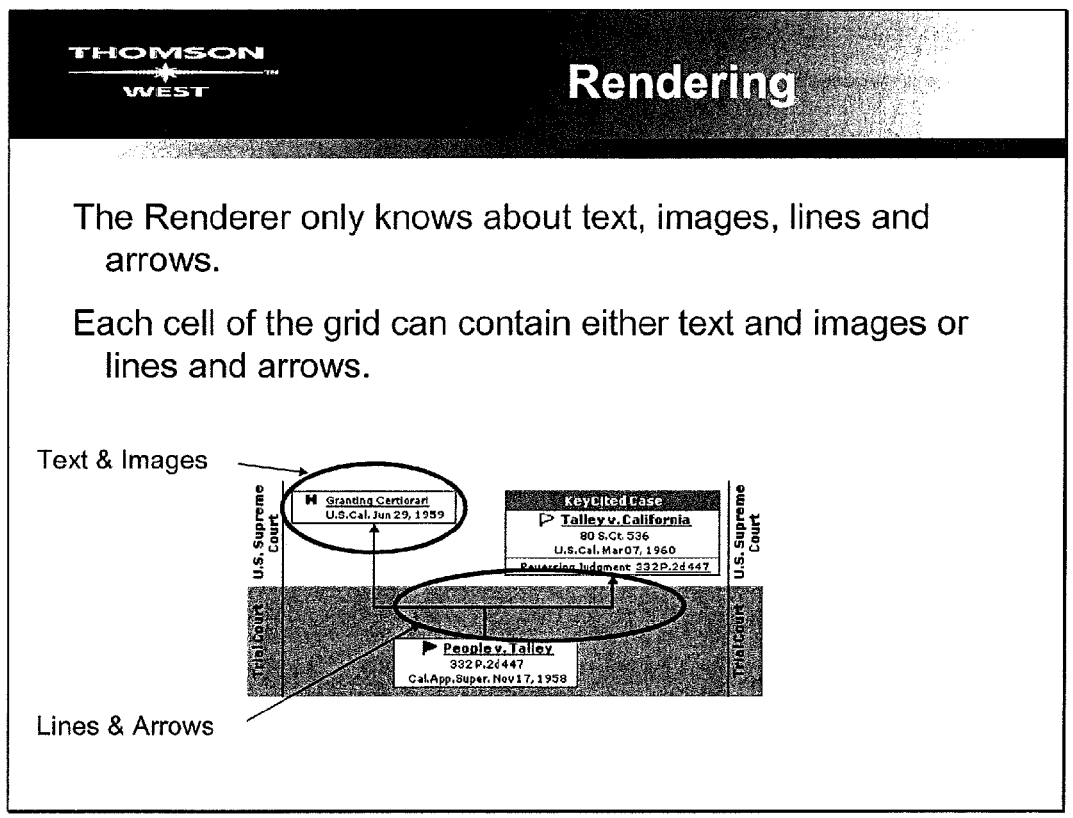
Figures 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59:
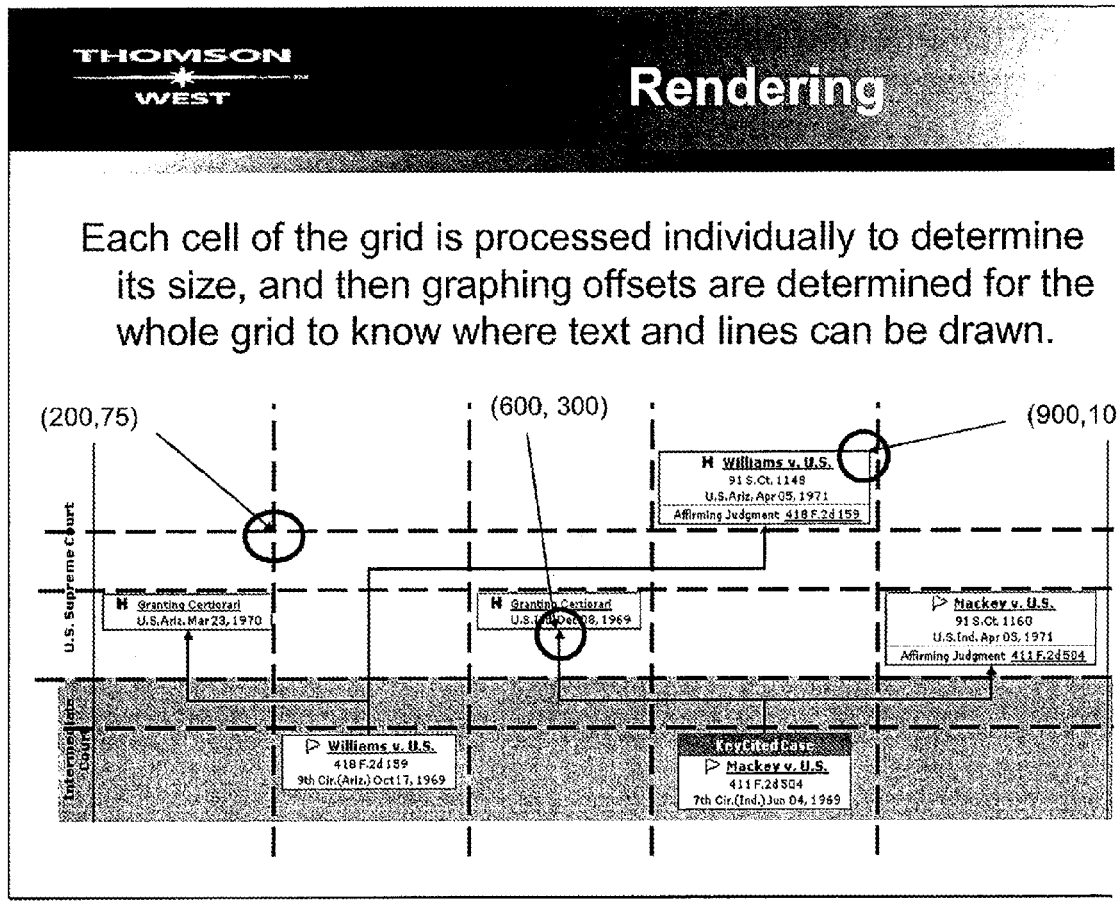
Figures 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60:
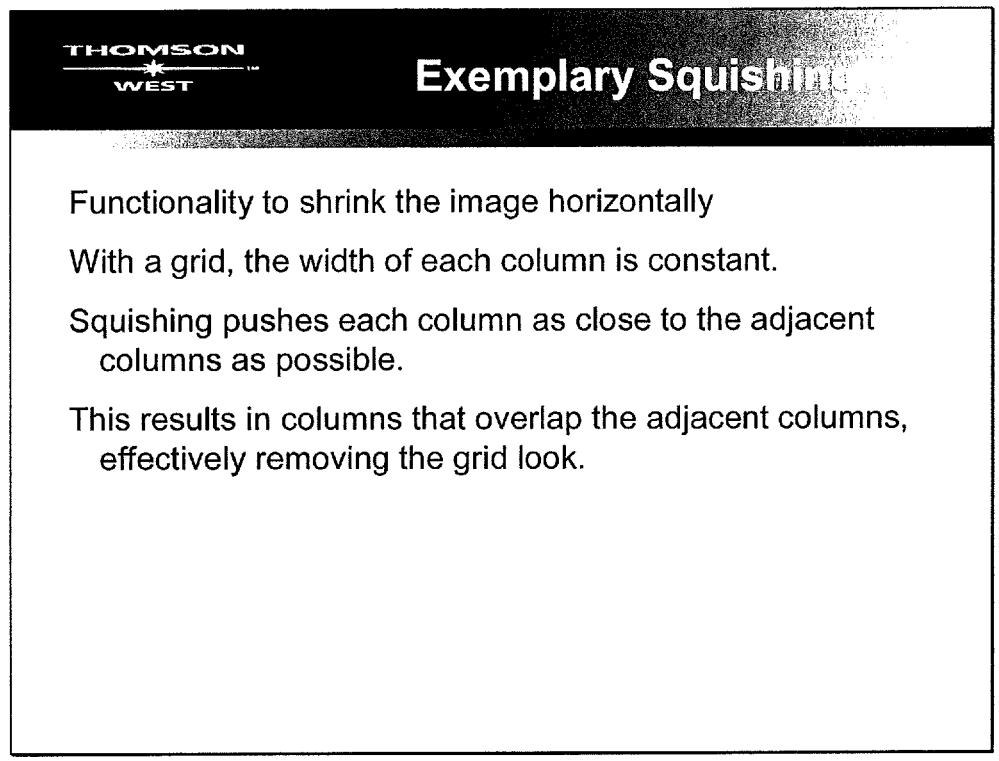
Figures 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61:
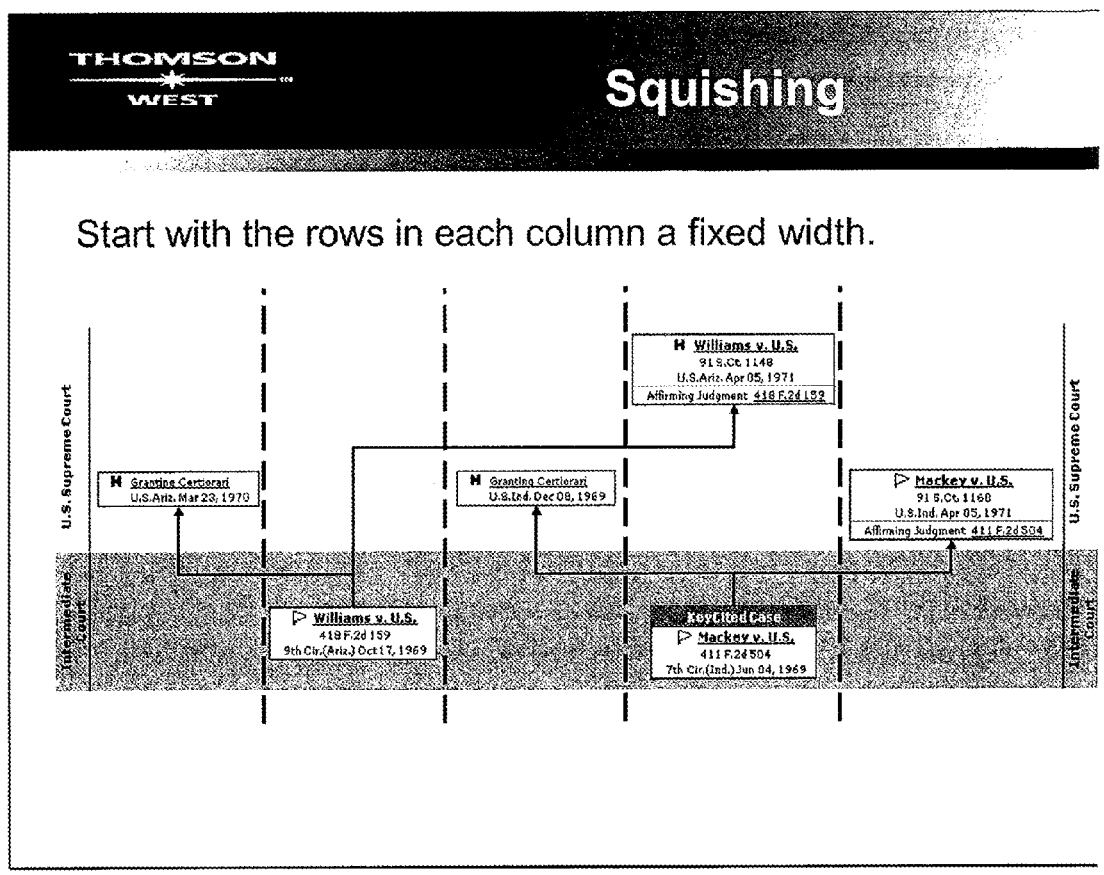
Figures 11, 62:
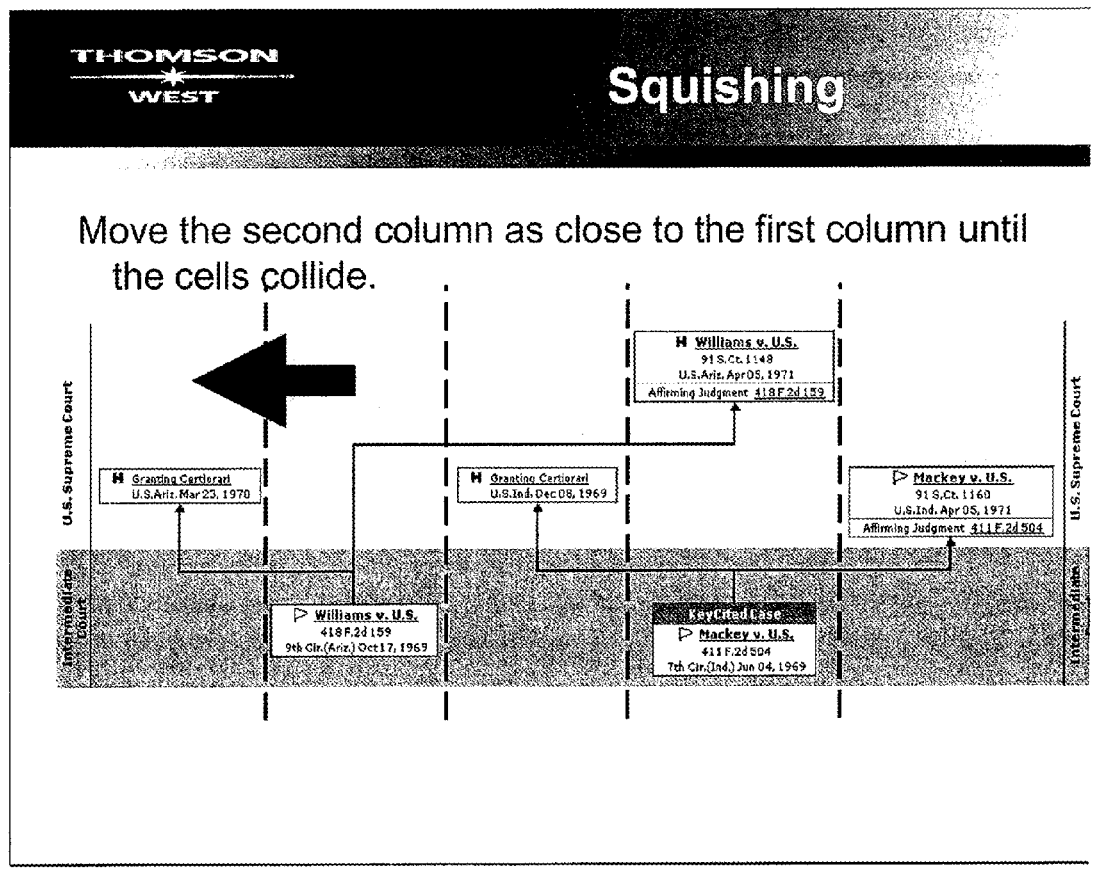
Figures 11, 63:
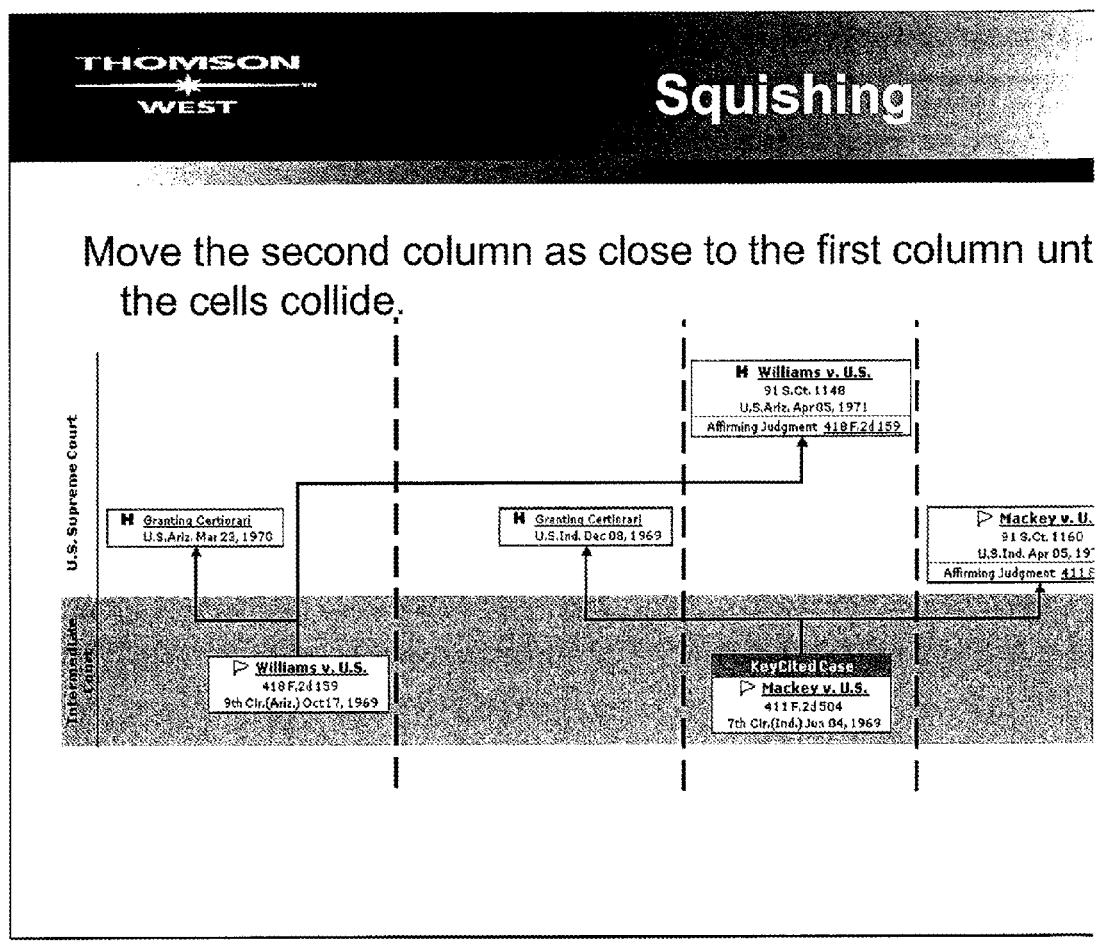
Figures 11, 64:
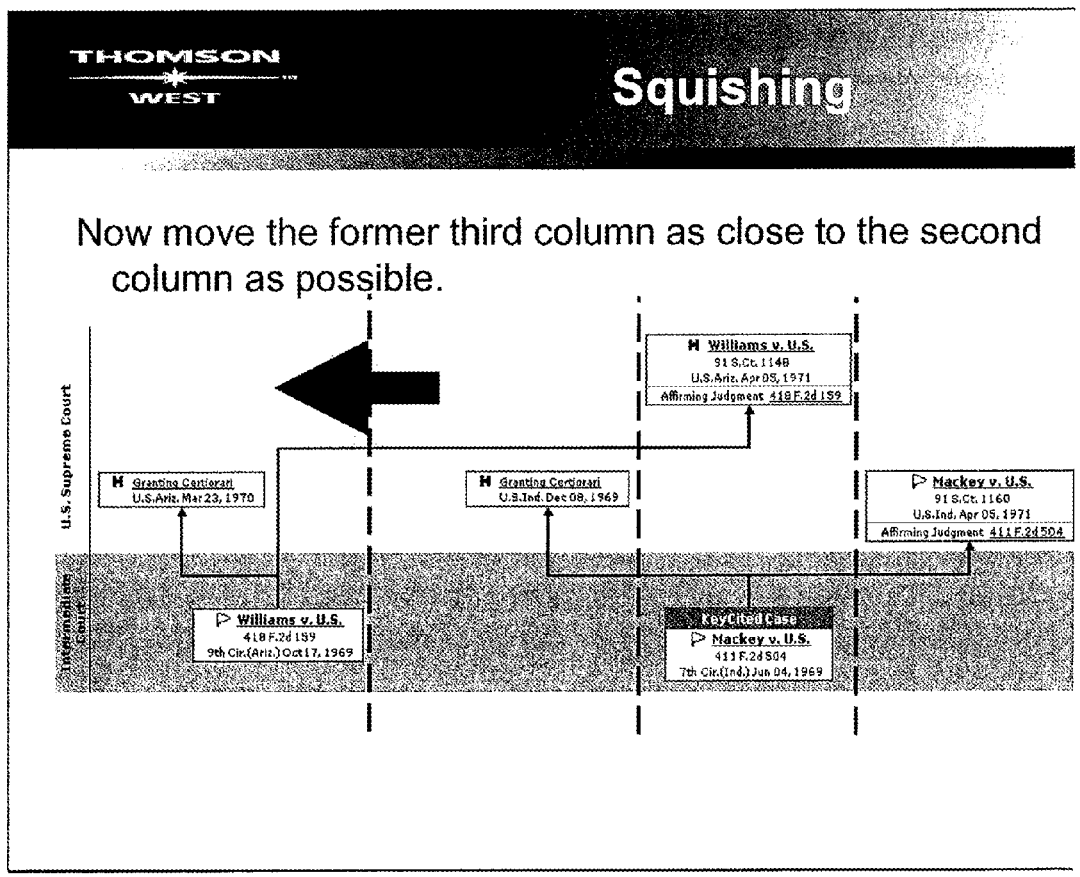
Figures 11, 65:
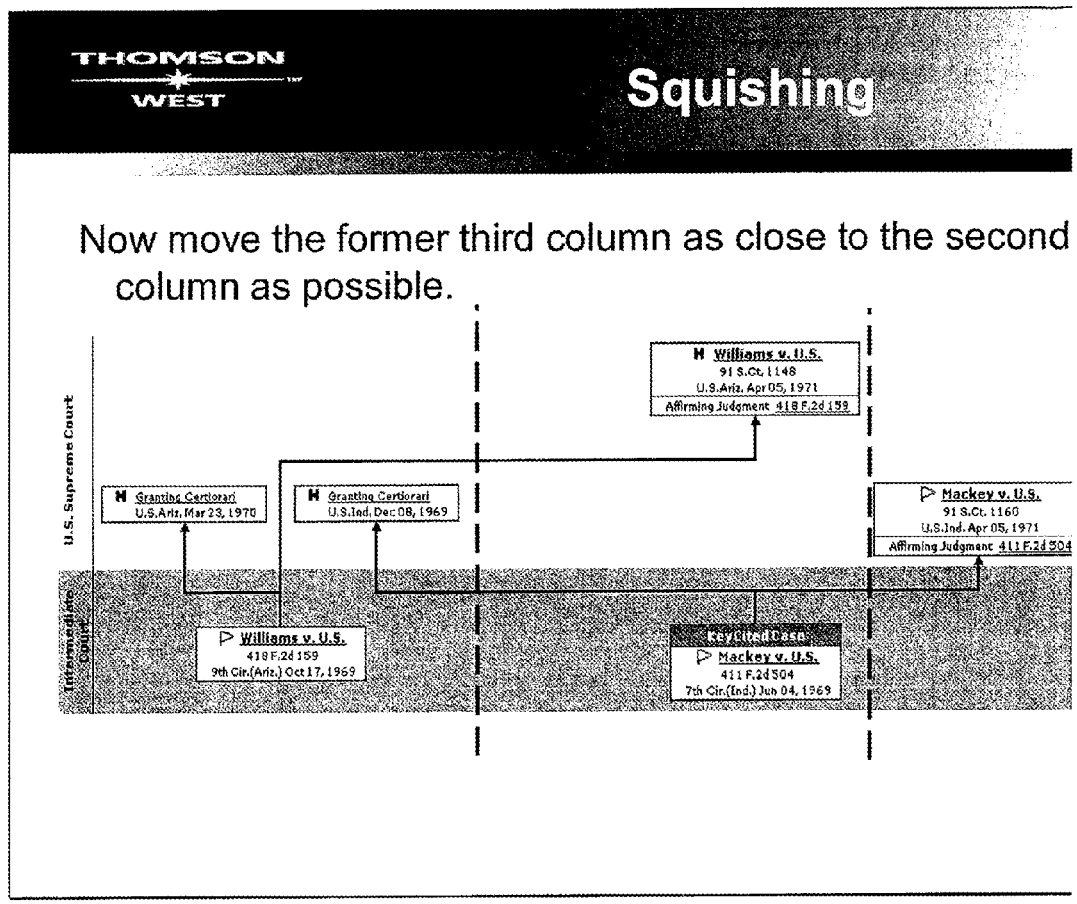
Figures 11, 66:
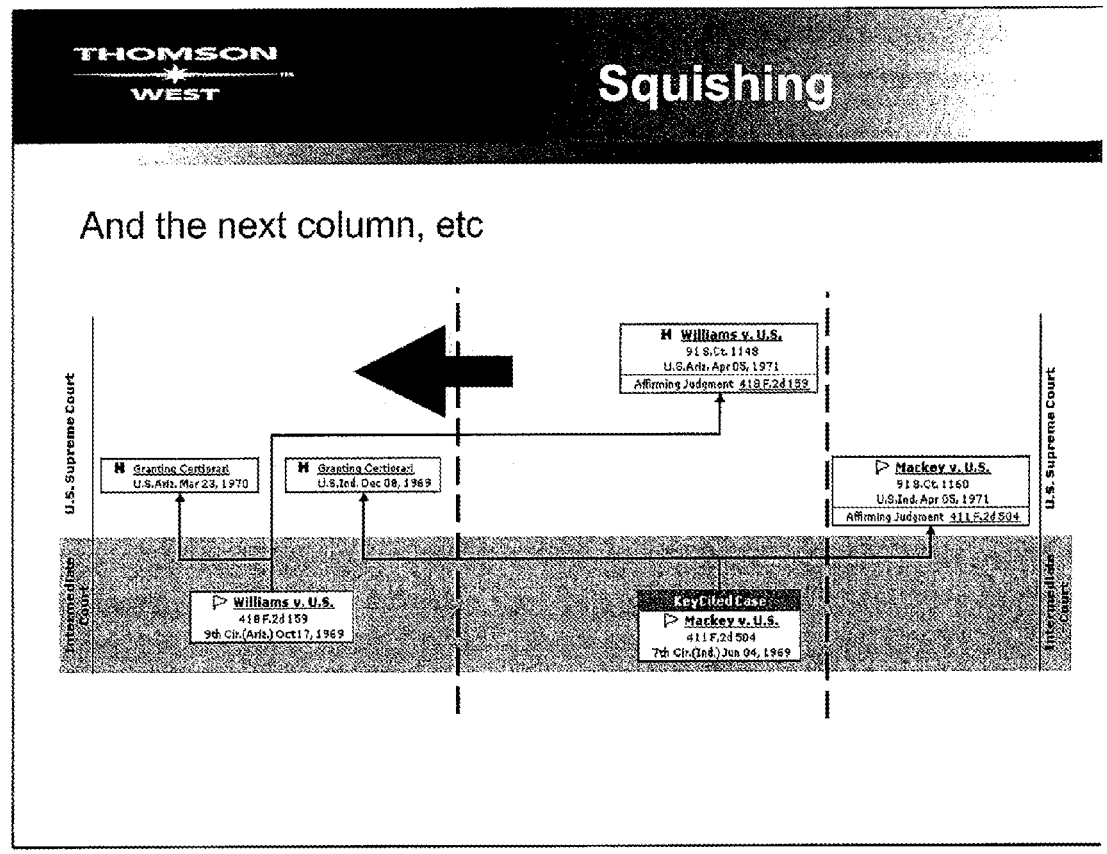
Figures 11, 67:
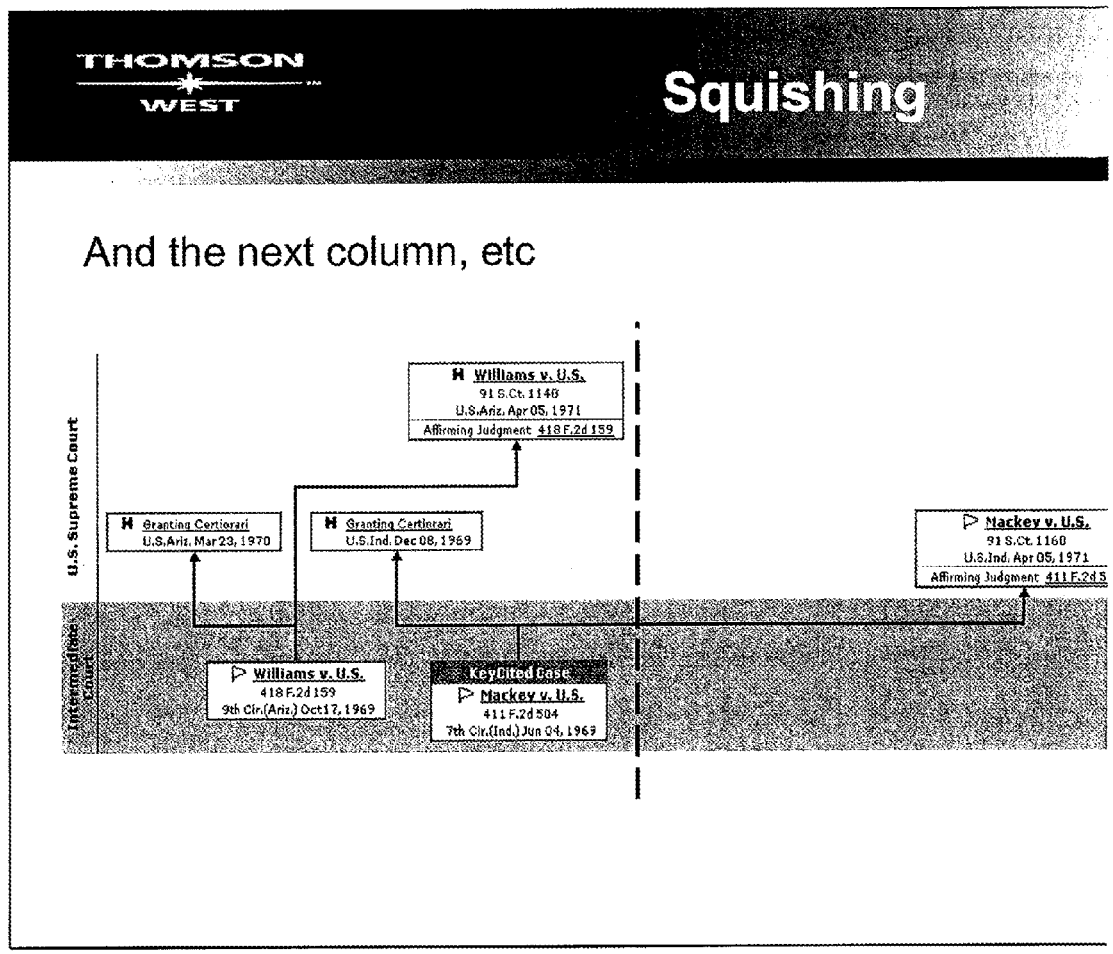
Figures 11, 68:
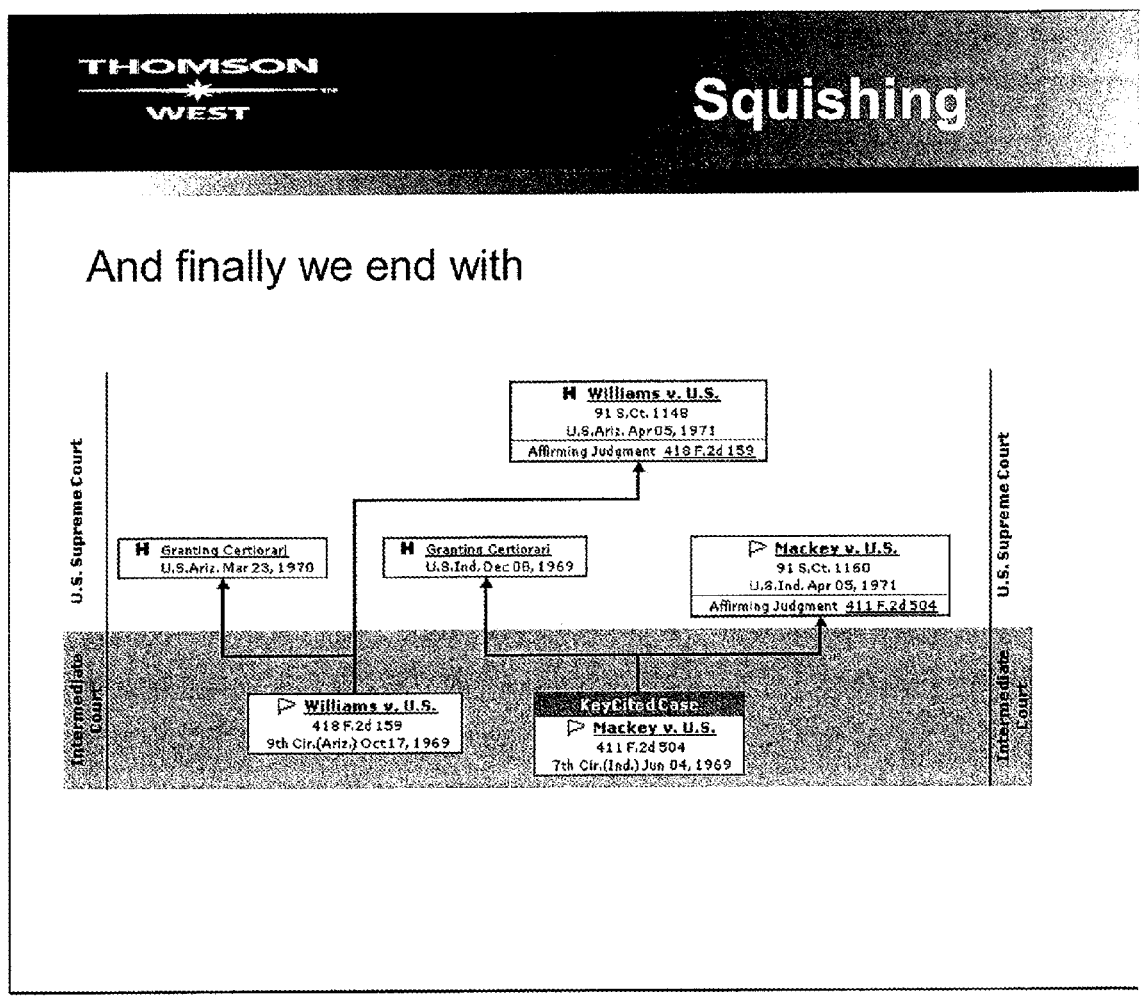
Figures 11, 69:
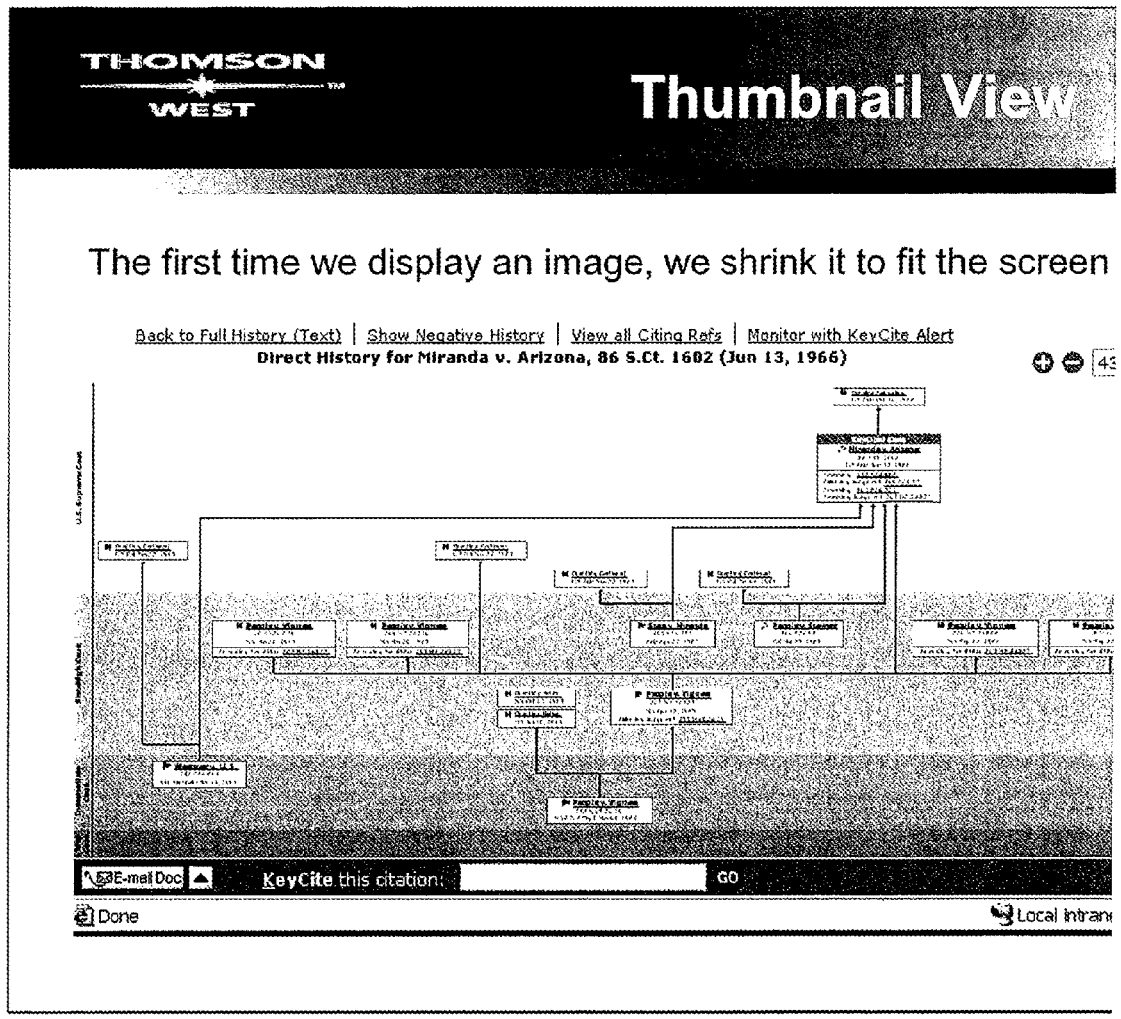
Figures 11, 70:
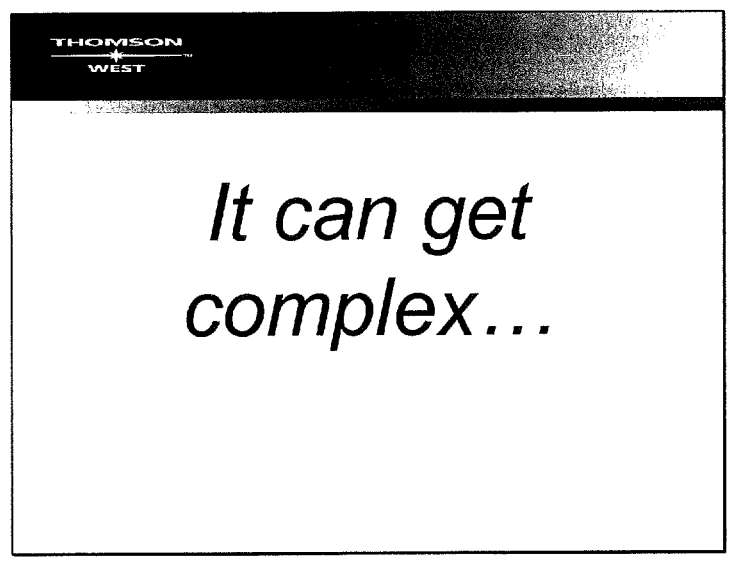
Figures 11, 71:
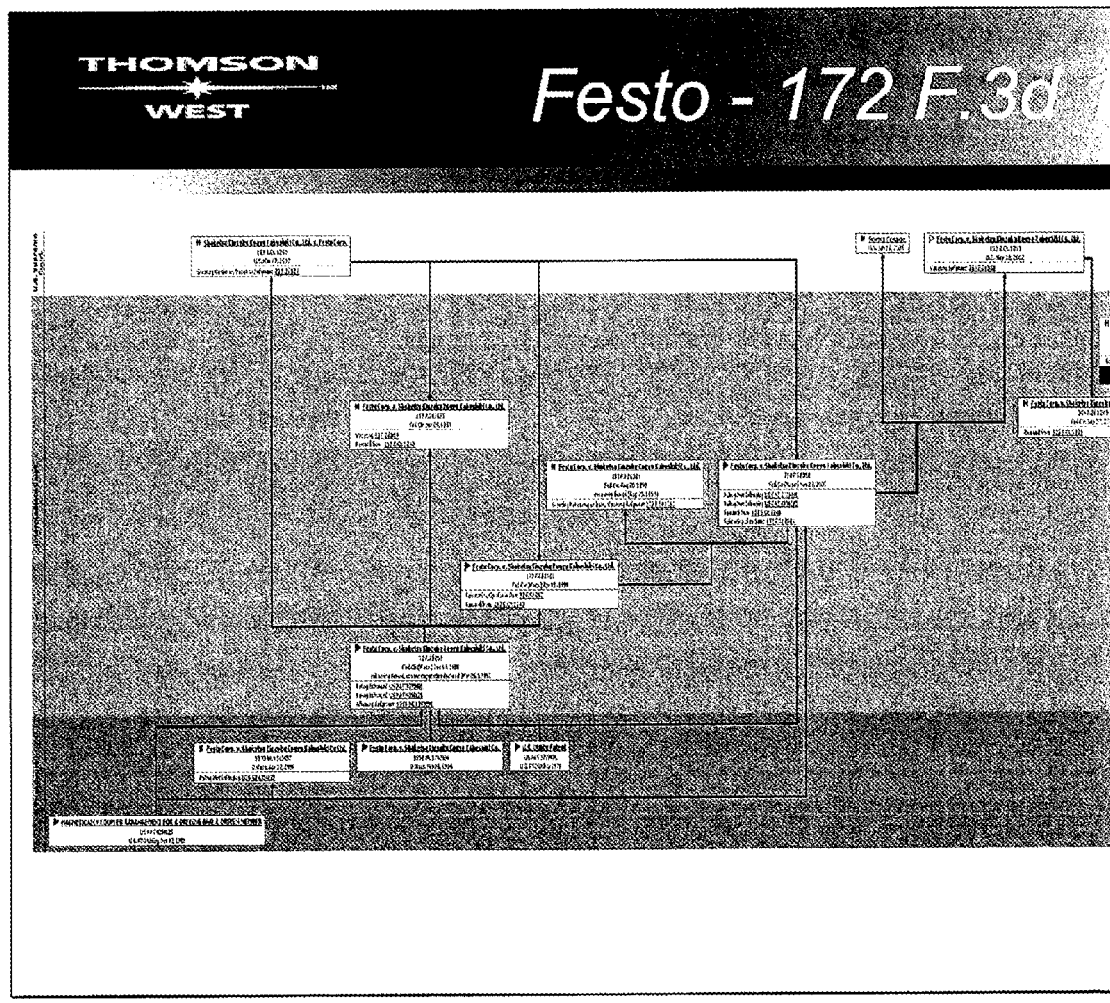
Figures 11, 72:
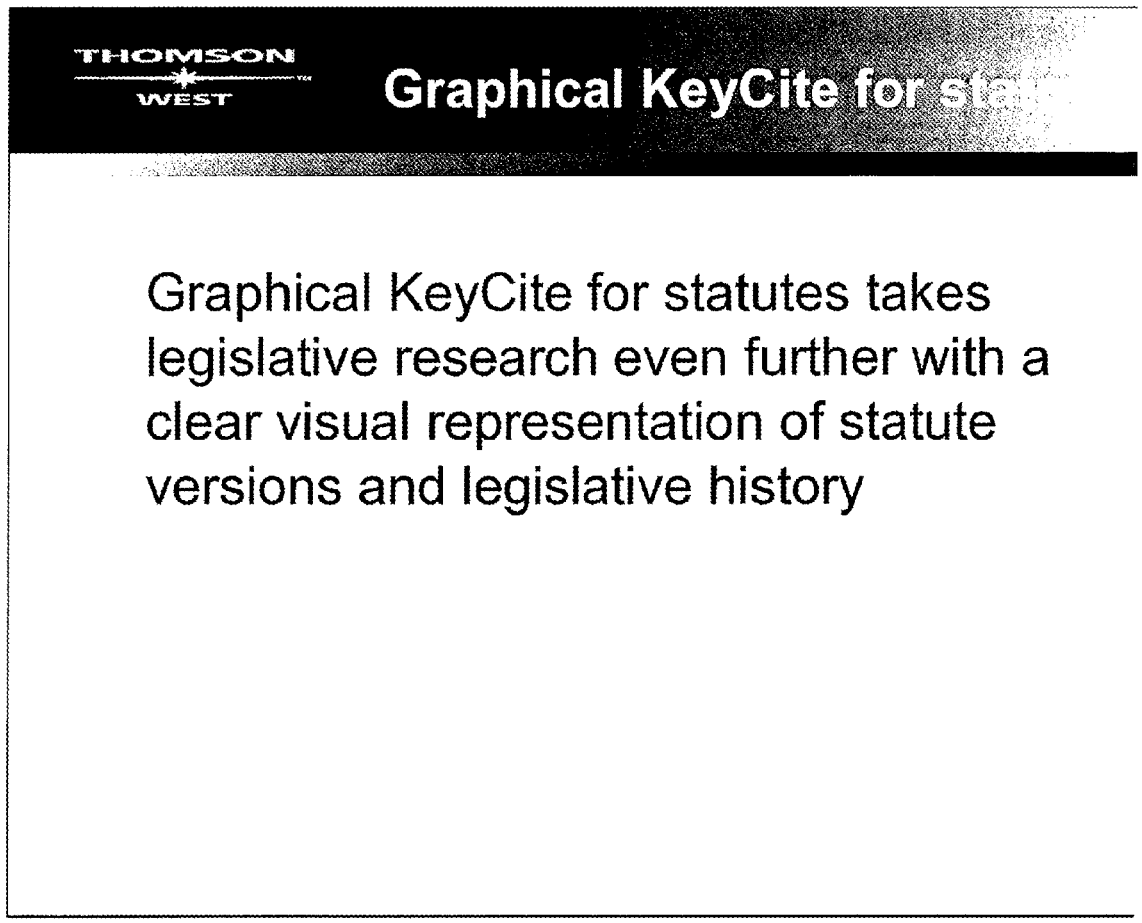
Figures 11, 73:
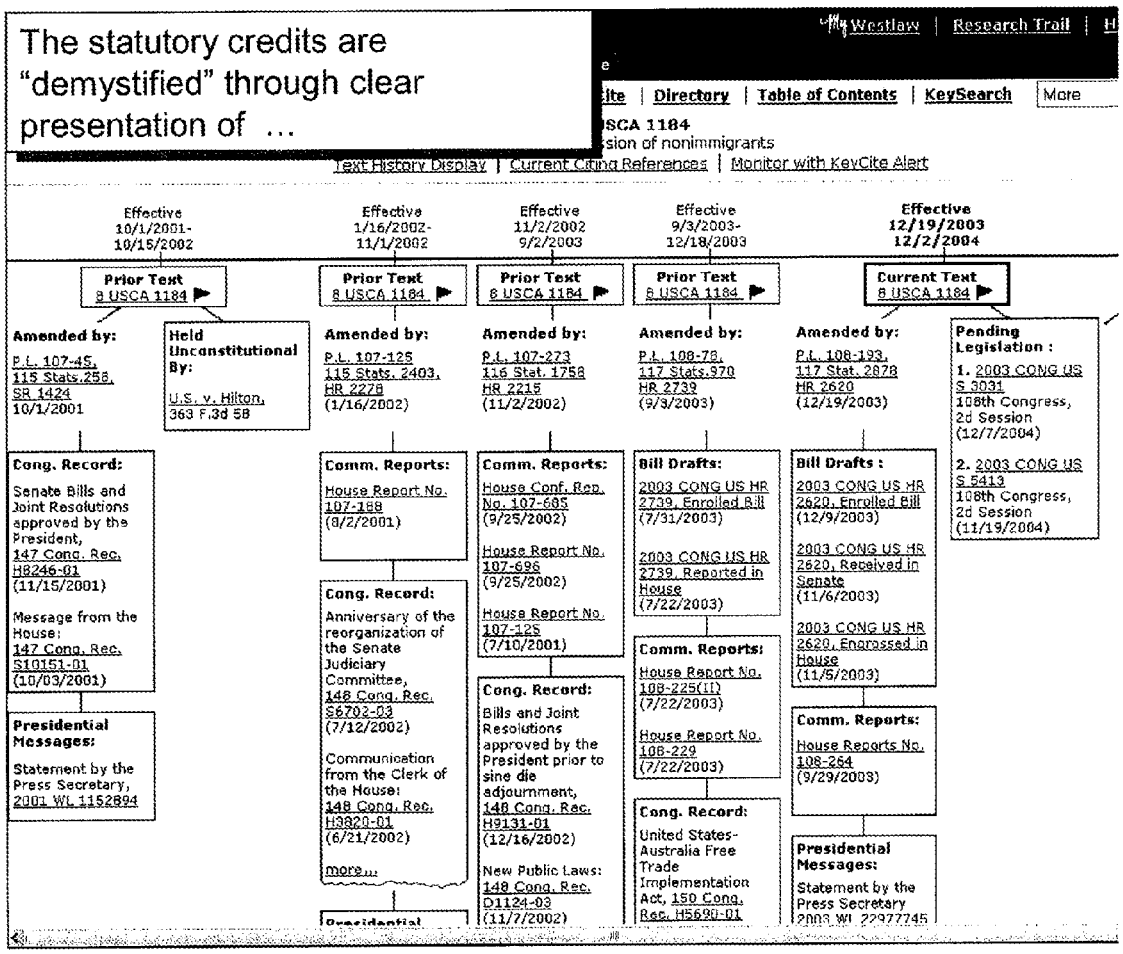
Figures 11, 74:
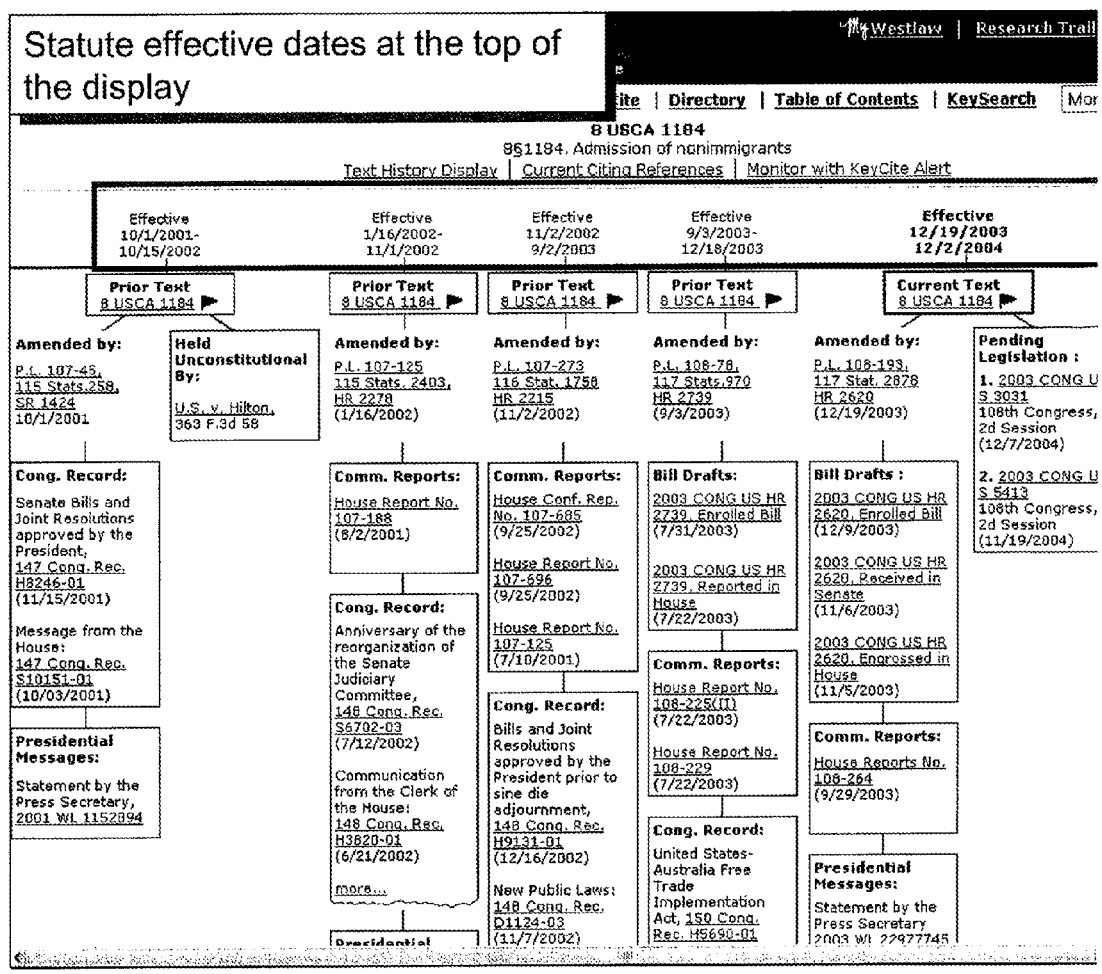
Figures 11, 75:
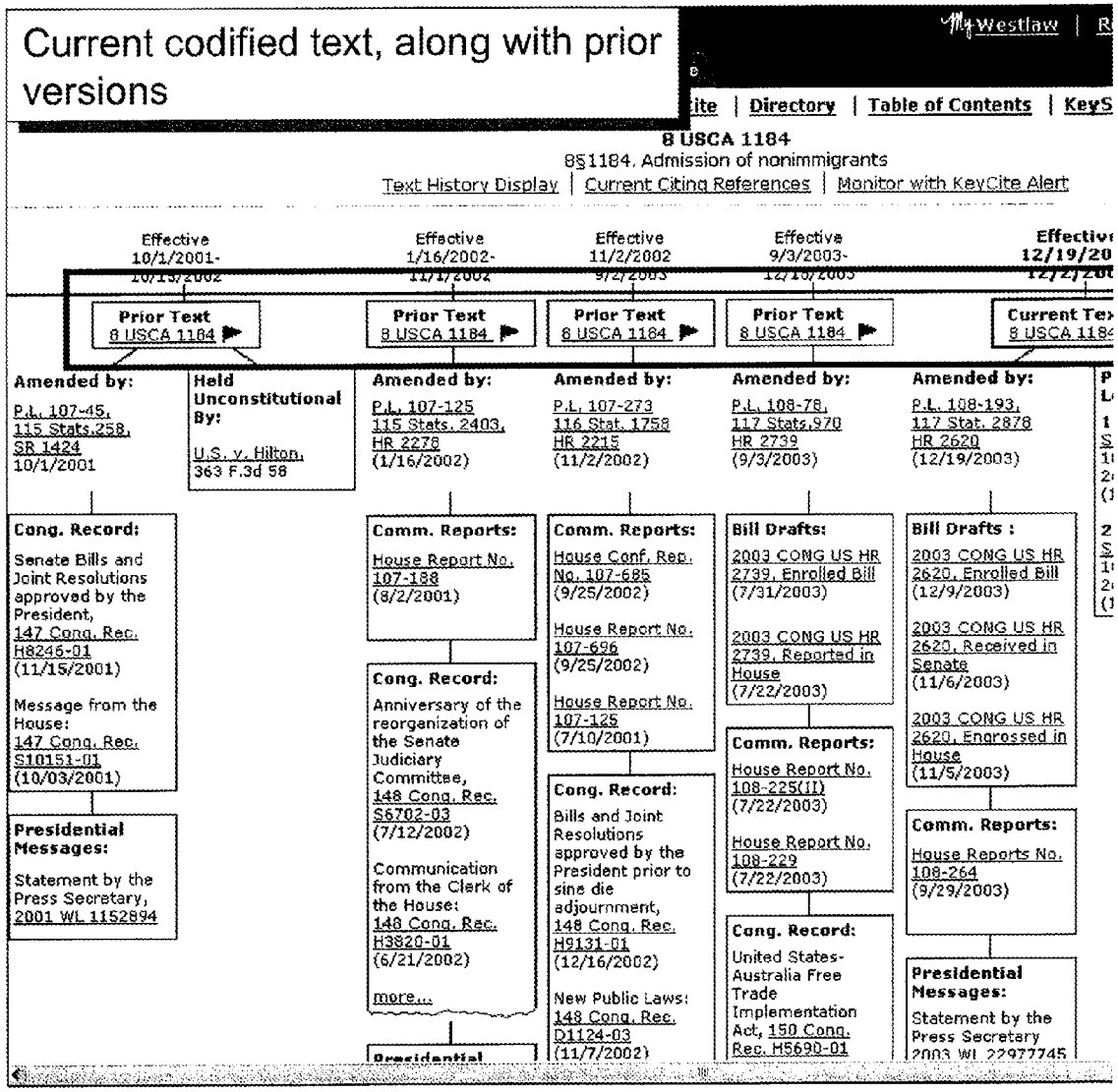
Figures 11, 76:
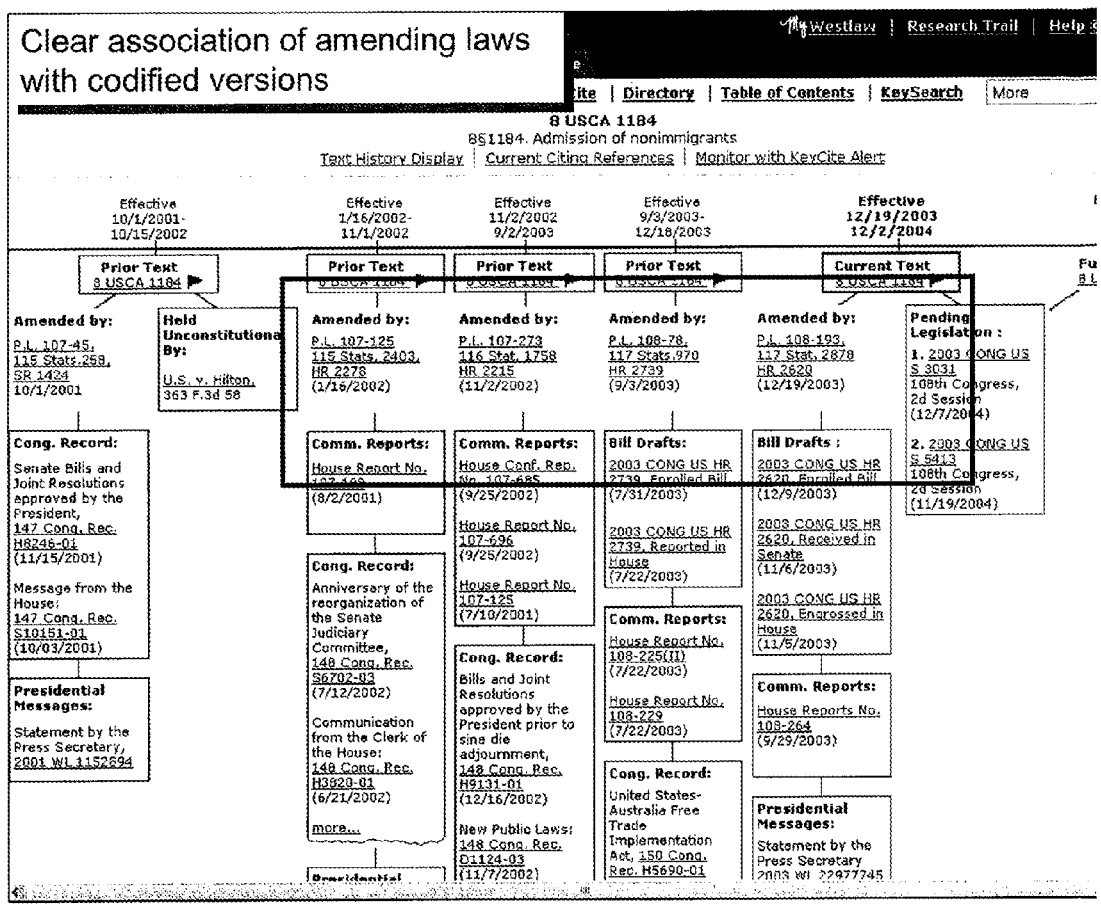
Figures 11, 77:
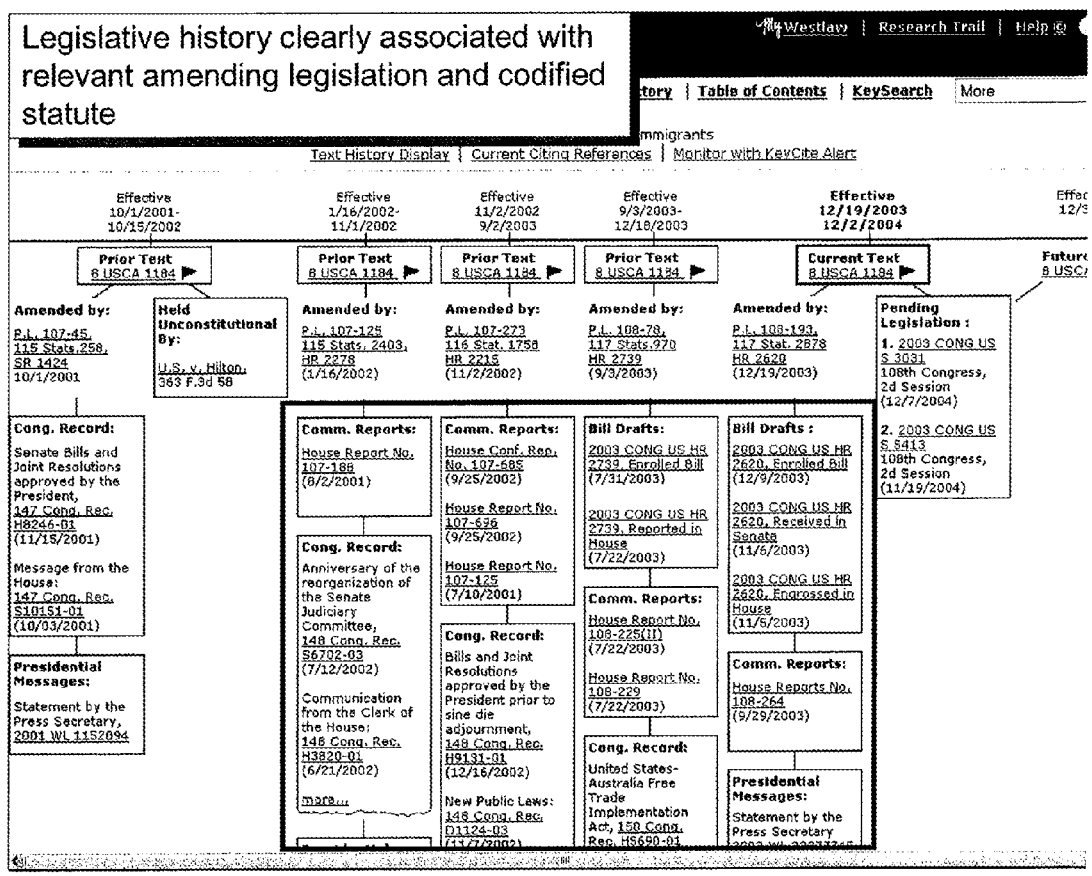
Figures 11, 78:
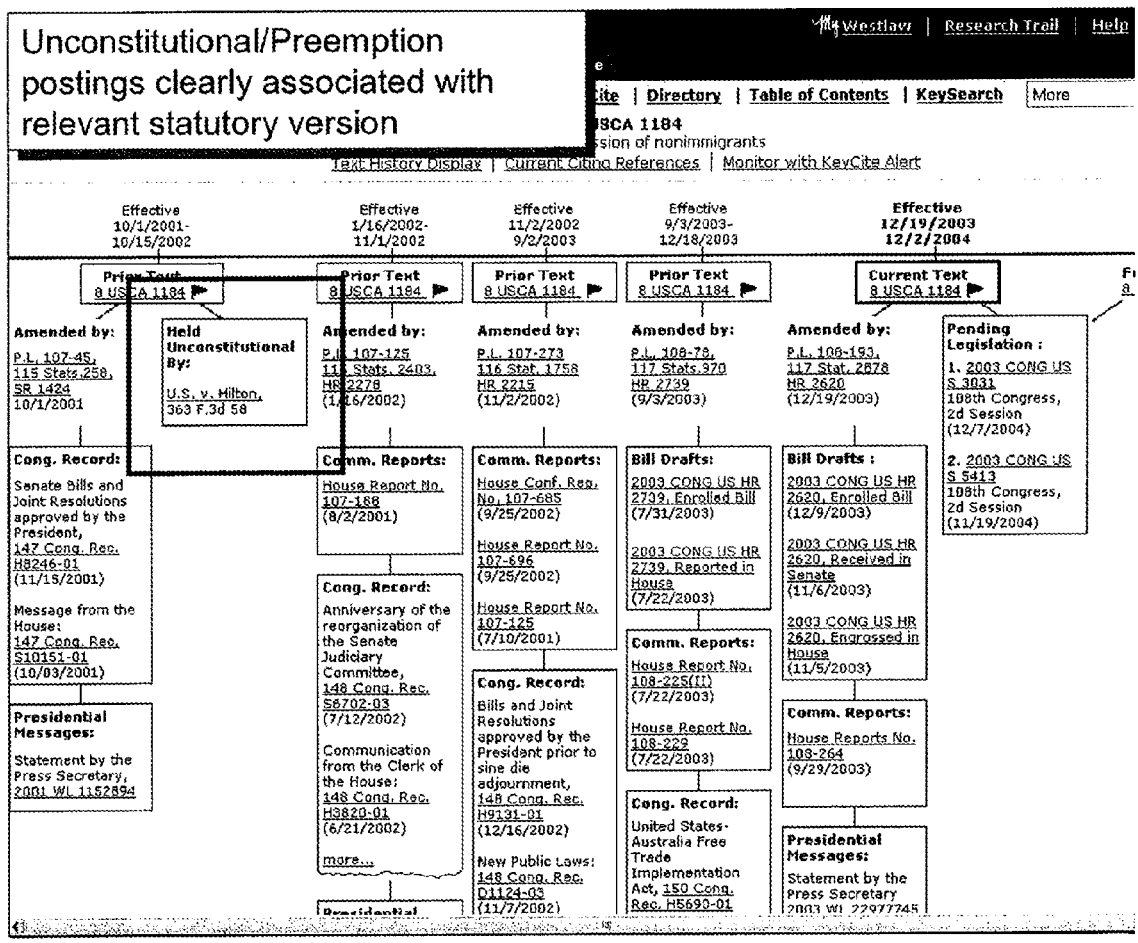
Figures 11, 79:
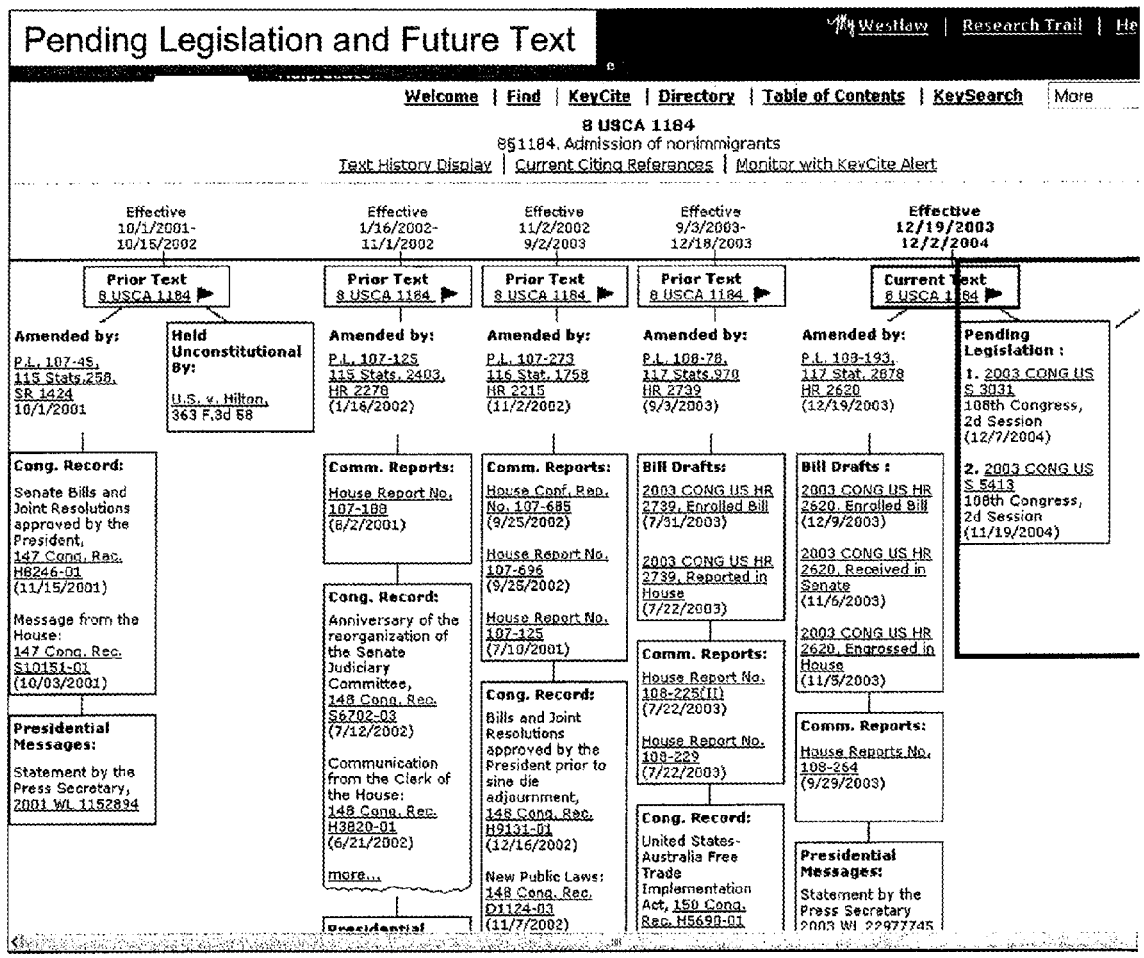
Figure 12:
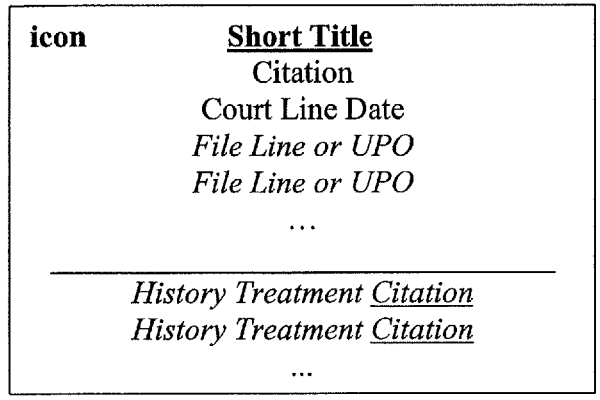
FIG. 12 is a block diagram illustrating the formatting of a Case Box Layout and a Procedural Motion Box Layout in accordance with the invention.
Figure 12:
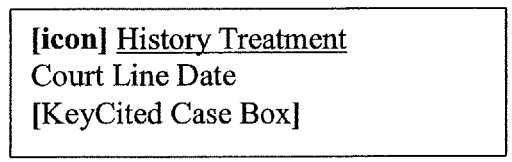
Figures 6, 13:
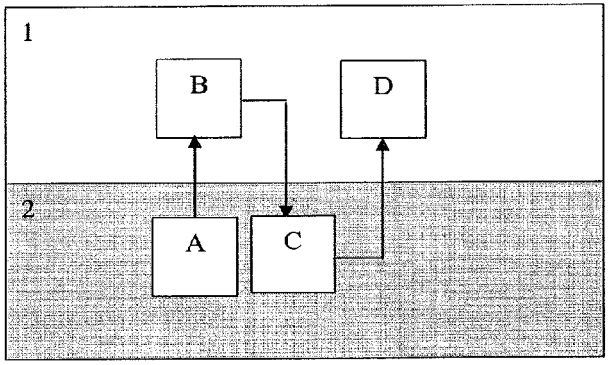
Figures 12, 13:
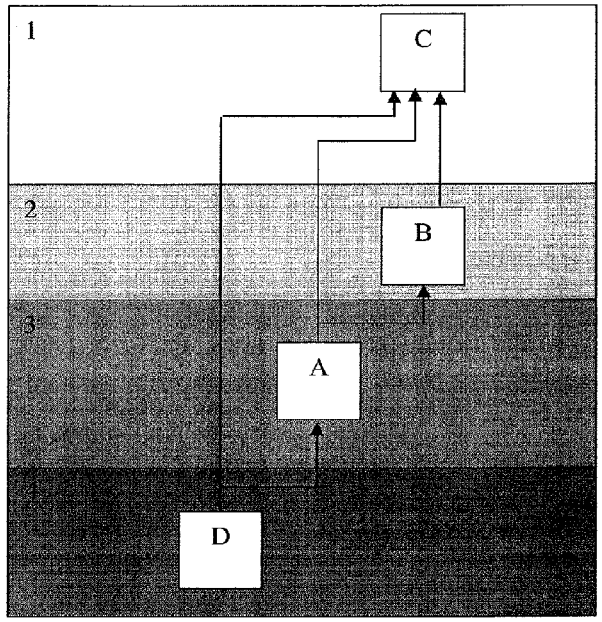
Figures 13, 14, 15, 16, 17, 18, 19, 20, 21, 22:
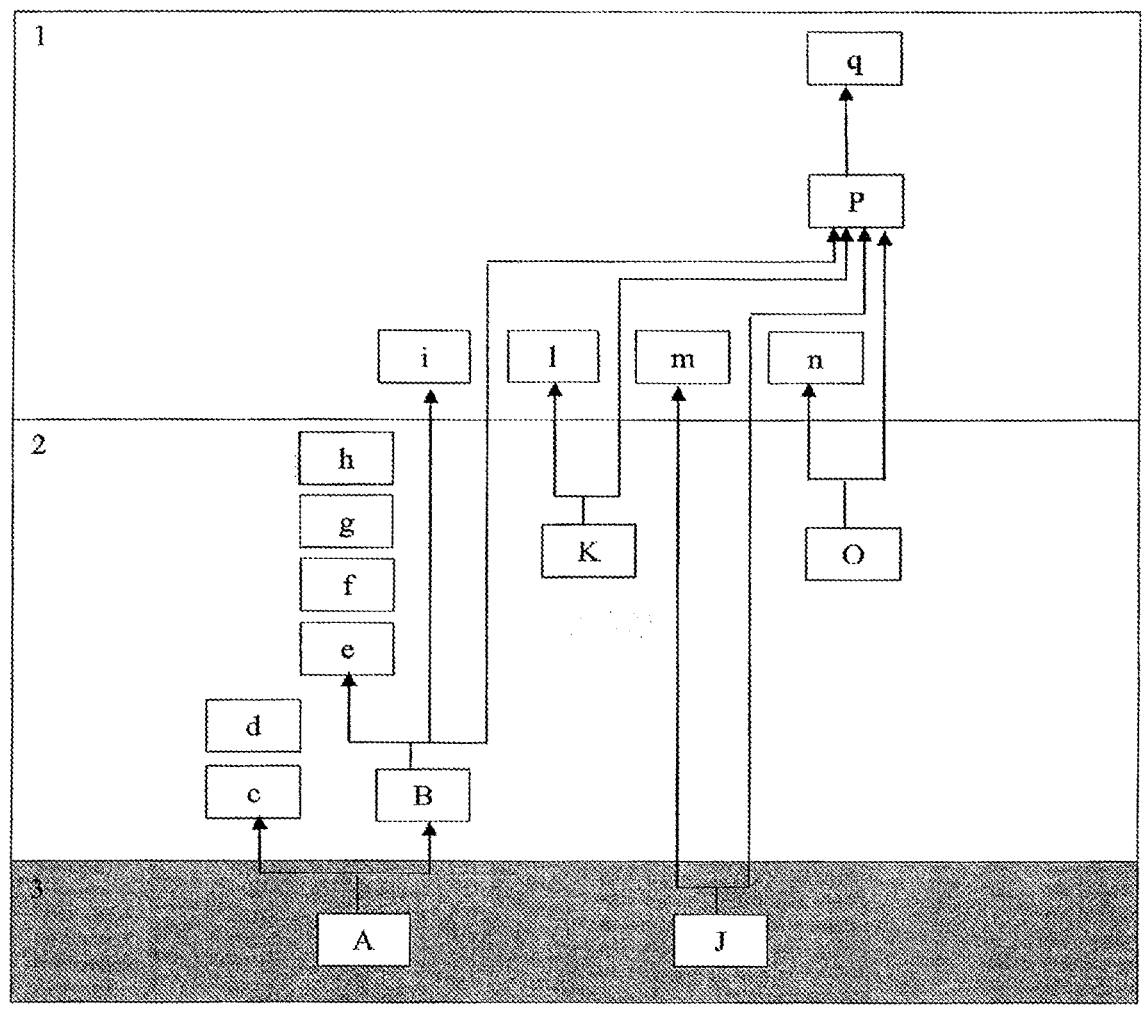
Figures 13, 14, 15, 16, 17, 18, 19, 20, 21, 22, 23, 24:
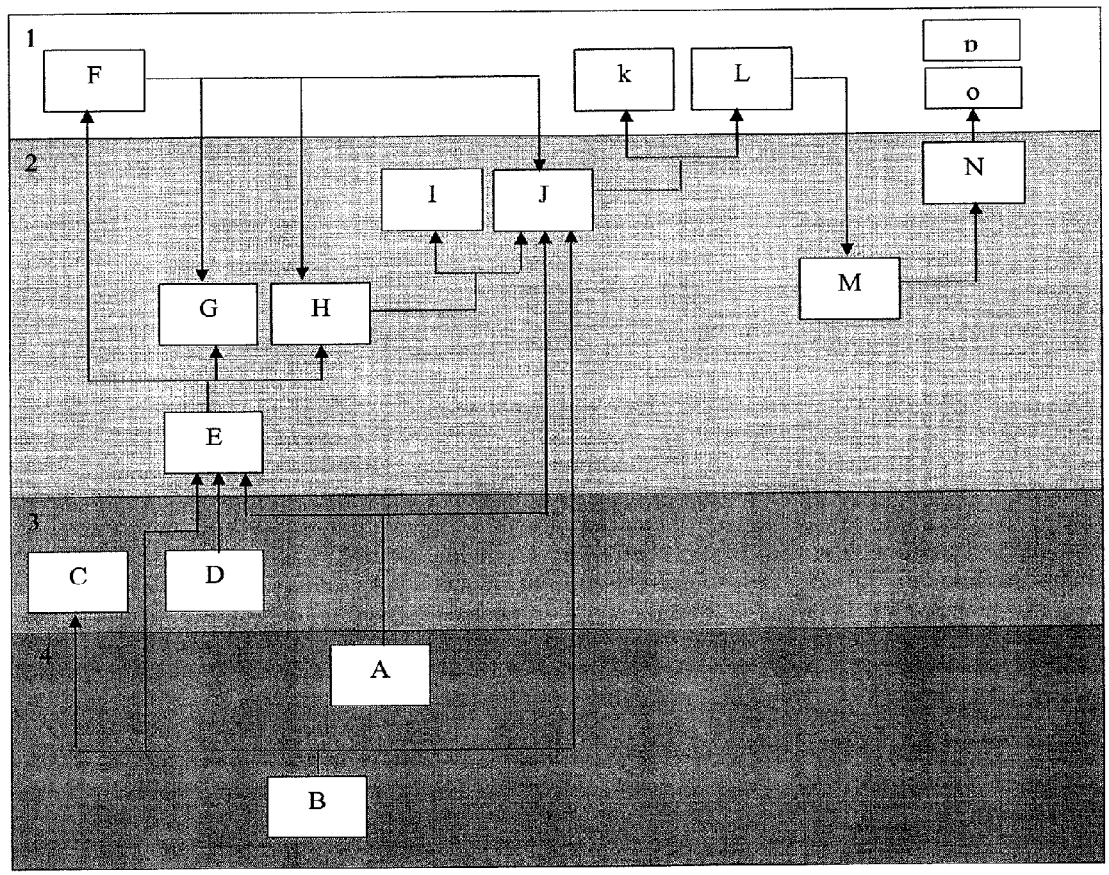
Figures 13, 14, 15, 16, 17, 18, 19, 20, 21, 22, 23, 24, 25, 26, 27, 28, 29:
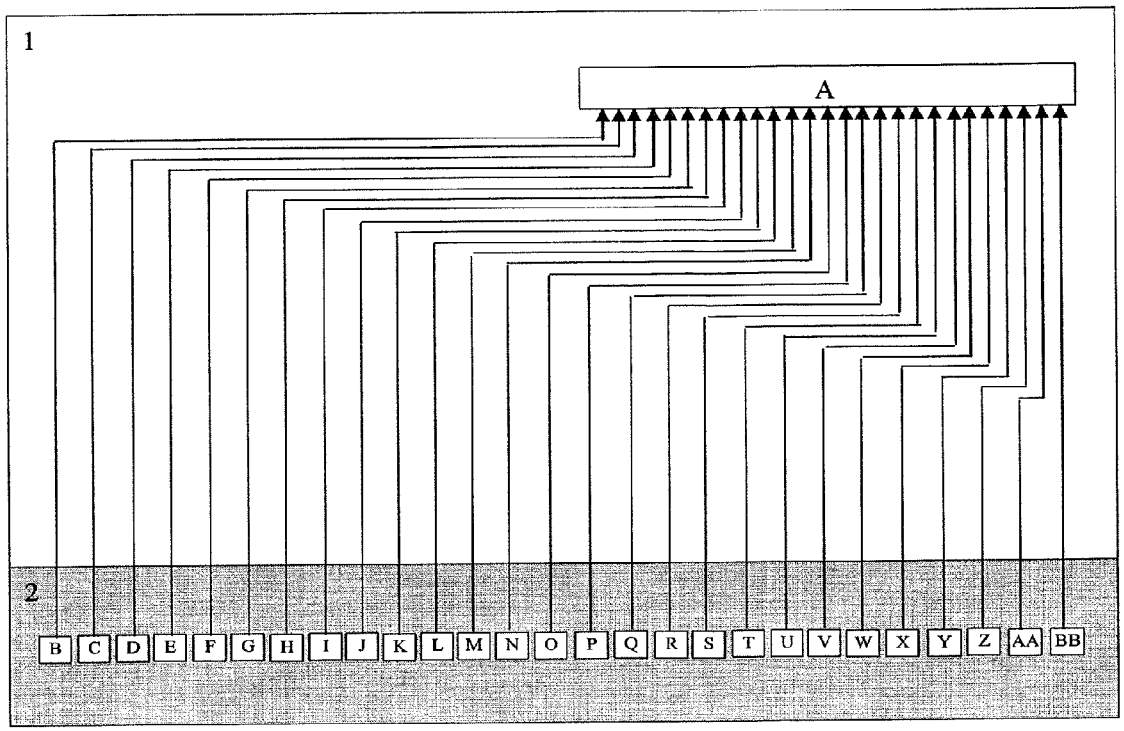
Figures 13, 14, 15, 16, 17, 18, 19, 20, 21, 22, 23, 24, 25, 26, 27, 28, 29, 30:
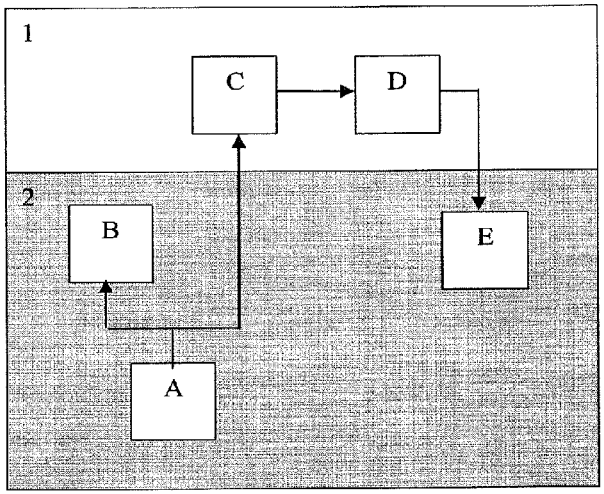
Figures 13, 14, 15, 16, 17, 18, 19, 20, 21, 22, 23, 24, 25, 26, 27, 28, 29, 30, 31, 32:
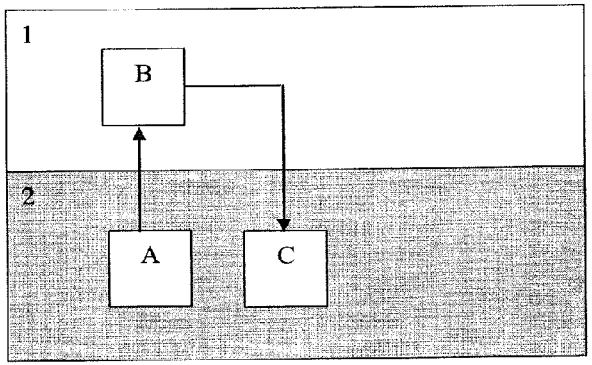
Figures 13, 14, 15, 16, 17, 18, 19, 20, 21, 22, 23, 24, 25, 26, 27, 28, 29, 30, 31, 32, 33:
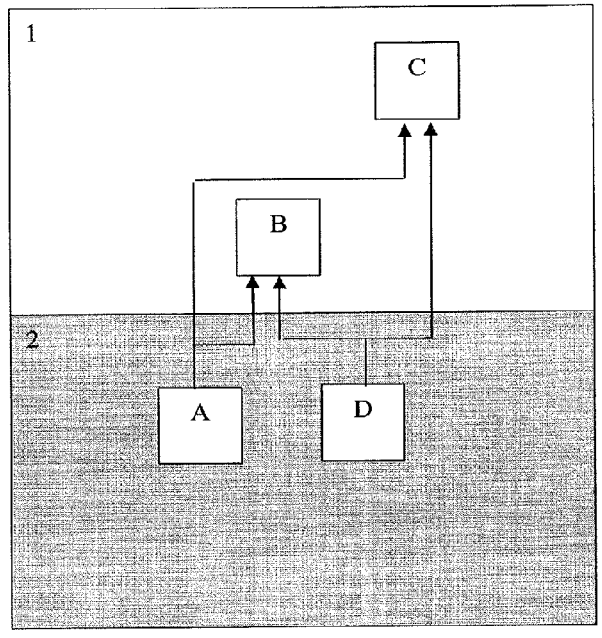

FIG. 10 is a flowchart illustrating a method 250 in accordance with the invention for assigning a piece of text nom the cited case to the citation in the legal case. In the example described below, the text of a headnote in the cited case is assigned to the citation, but the text assignment process in accordance with the invention may be utilized with a plurality of different pieces of text in the cited cases. In step 252, a citation locus (i.e., a region of text likely to correspond to the text supported by the citation) for each citation is assigned according to the a set of rules which are now described.

To identify the citation locus, several text-parsing rules may be used, some of which are stronger than others, but which collectively would be highly likely to identify the text. To allow for varying effectiveness of the different rules, the extracted text may be divided into three groups, "high", "medium" and "low", according to the likelihood that the extracted text was part of the correct citation locus. These rules may include:

| Category | Text |
| --- | --- |
| High | 1. any non-citation material contained in the sentence that includes the base citation. |
| | 2. all of the first non-citation sentence preceding the base citation within the same paragraph. |
| | 3. if there is no type 2 sentence, then all of the first non-citation sentence following the citation within the same paragraph. |
| | 4. all text that can be identified as a quotation form the cited case. |
| Medium | 5. all sentences occurring between the citation next preceding (but not contiguous to) the base citation and a type 2 sentence. |
| | 6. all sentences occurring between the citation next following (but not contiguous to) the base citation and a type 3 sentence. |
| | 7. if there is not type 2 or type 3 sentences, and the paragraph containing the base citation ends with a colon or comma, the whole of the paragraph next following the paragraph containing the base citation |
| | 8. if there is not type 2 or type 3 sentences and no type 6 paragraph, the whole of the paragraph next preceding the paragraph containing the base citation |
| | 9. if any of the text areas identified by any rule includes a headnote reference marker, include the headnote and its keyline |
| Low | 10. the whole of the paragraph containing the base citation |
| General | 11. if the citation occurs in a footnote, it is treated as if it occurred at both the footnote location and the location of the footnote marker |
| Not Posted | 12. citations occurring only in the subsequent history of another citation |

Then, in step 254, the terms in the citation loci are weighted according to the rule that was used to identify them, with a high, medium or low matching corresponding to weights of 2.0, 1.0 and 0.5, respectively. Different types of documents, such as legal cases or law review articles, may require a different set of rules to determine the weights. Once the pieces of text have been identified and assigned a belief value, in step 256, the identified pieces of text are matched against pieces of text which may be within the cited document. In one example, the pieces of text within the cited document may be headnotes, but the invention is not limited to any particular type of text which the identified pieces of text are matched against. The matching may be done using natural language query as described in previously referenced U.S. Pat. Nos. 5,265,065 and 5,418,948 which are owned by the assignee of this application and are incorporated herein by reference. The results of the search is a list of possible pieces of text from the cited case, such as a headnote, which may be assigned to the citation in the legal case and a belief score for each possible piece of text.

Next, in step 258, the one or more pieces of text that are going to be assigned to the citation are selected though a thresholding process. The thresholding process ranks the pieces of text for each citation based on the belief score. The piece of text may be posted to the database whenever the following quantity equals or exceeds 0.5:

$$\frac{1}{1+e^{-(\beta_0 + \beta_1 \sqrt{(\text{belief}-0.4)} + \beta_2 \ln(freq) + \beta_3 \ln(\text{belief}-\text{lag2}+0.0001))}}$$

The beta values for this equation are as follows:

| Document | Rank | $\beta_0$ | $\beta_1$ | $\beta_2$ | $\beta_3$ |
|---|---|---|---|---|---|
| non-ALR | 1 | 4.0451 | 3.1975 | 0.8477 | .9033 |
| non-ALR | 2 | 0.5573 | 9.0220 | 1.0348 | 0.6743 |
| non-ALR | 3 | −2.0421 | 11.2619 | 0.8949 | 0.2954 |
| ALR | 1 | −1.4256 | 50.4929 | 0.3488 | 0.0000 |
| ALR | 2 | −2.8199 | 65.6148 | 0.6207 | 0.0000 |
| ALR | 3 | −2.3701 | 40.8479 | 1.2445 | 0.0000 |
| ALR | 4 | −3.3474 | 60.8075 | 1.7349 | 0.0000 |
| ALR | 5 | −3.0805 | 55.6003 | 1.3188 | 0.0000 | where the columns marked "ALR" contain variables for ALR articles, as described above, which have a higher belief score than the non-ALR documents. The columns labeled "non-ALR" contain variables for non-ALR documents.

In the equation, Freq is the total citation frequency for the citation pair, and lag2 is the belief score of the second following candidate when the candidates are sorted by belief score in descending order (or 0.4 if there is no such candidate). Once the thresholding has been completed and the one or more pieces of text has been assigned to each citation in the legal case, one or more pieces of text are stored in the database in step 260 as described above so that it may be retrieved for a user when requested.

In summary, the subject matter assignment process automatically generates one or more pieces of text for a citation in the legal case based on pieces of text in the cited case such as a headnote. The process first automatically identifies supporting text in the legal case and assigns a belief value to the supporting text, matches all of the piece of text against pieces of text in the cited cases, and then automatically assigns a piece of text, such as a headnote, from the cited case to the particular citation. These subject matter assignments permit a citation to the legal case to be sorted or selected by the subject matters which helps during the collocation process.

Thus, the machine implemented system in accordance with the invention automatically processes a document, such as a legal case, and generates information about the document which may provide the user of the system with useful information about the contents of the document. In a conventional system, on the other hand most of this information about the document would be generated by a human being reading the document and making notes about the document which is a slow, expensive, error-prone process. For a legal case, the system may automatically generate information about the negative history the legal case, about the depth treatment of a citation by the legal case, about the quotation in the legal case which are verified as originating from a particular source, and about one or more headnote which are assigned to a particular citation in the legal case. Thus, the operator of the system may rapidly generate this information about the legal case and a user of the system may quickly locate this information since it is all readily accessible from a graphical user interface.

The following is a Summary of Rules relating to the figures of the present invention, as well as an article pertaining to Graphical Keycite:

Summary of Rules

Parents are centered below their children.

Non-remand relationships arrows should enter from the bottom of the box.

Where there is a T intersection between a parent and child, the bottom vertical line will be offset.

The relationship split will occur in the court level of the parent.

Cases sent down will start with a line from the right of the case to the top of the case sent down to.

When there is more than one case sent down from a single parent, the line from the right of the parent will continue on to accommodate the additional cases.

Parents that have a line coming into the top of the case will have a line coming out of the right that will then connect to it's children.

Parents will be drawn to the left of a child, when they are in the same court level and there relationship is on the Lateral Litigation List.

If a parent cannot be centered below a child, it will be offset below a child.

The width of the child will expand to the point necessary in order for all of it's parents relationships to be drawn.

When the parent would need to go around one child to get to another it will be offset.

Motions for the same parent in the same court level are stacked on top of each other.

Stacked procedural motions are ordered with the earliest on the bottom and the latest on top.

When the procedural motions have the same date, they are stacked in whatever order we receive them.

When ordering the children from left to right, an entire stack of procedural motions takes on the date of its earliest member.

The children will be in order with the earliest child on the left and the latest child on the right.

When lines need to cross their will be a bump on the horizontal line at the point where the lines cross.

If a procedural box has different history treatments to display, it shall be promoted to a substantive box.

A case has remanded Child and a lateral litigation child there should have two lines coming out of the right of the box.

Only stack procedural motions that have a common single parent.

Highlights

Beyond Citation Checking

Graphical KeyCite Paints a Picture of Procedural Case History

A picture is worth a thousand words. For legal researchers, the powerful, new Graphical KeyCite may be worth even more because it literally illustrates the procedural history of case law.

Thomson West, A business within The Thomson Corporation (NYSE: TOC; TSX; TOC) totally introduced Graphical KeyCite, the latest innovation to KeyCite®, the service that has revolutionized citation checking since it was first introduced.

In that year, law librarians at the American Association of Law Libraries applauded the intuitive KeyCite flags that instantly let legal researchers know whether a judicial opinion was still good law, as well as the depth-of-treatment stars and symbols that indicated how extensively the case had been relied on in other opinions. KeyCite also was the first citation checking service to enable researchers to effortlessly probe the history of a case.

Graphical KeyCite takes these innovations to a new plateau by literally painting a picture of a case's direct history. The feature links citations to later motions, pleadings and lower-court decisions as the case ascents to higher courts. This exclusive KeyCite feature helps researchers to instantly see how a case moved through the court system over time, and to quickly understand the impact as each level.

"For the first time, the history of the court case is illustrated, helping researchers understand the impact faster," said Jon Medin, director of Product Development for KeyCite.

Medlin added that KeyCite combined analysis from legal editors at Thomson West with technology to illuminate issued such as how much the citing case discussed the cited case. "The same attorney-editors who author West's extensive collection of authoritative case law headnotes also assign the KeyCite flags and symbols attorneys and the judiciary rely on to see whether citations are still good law," noted Medin.

Documents on Westlaw include more links to related sources than any other legal research service. Medin noted that Graphical KeyCite leverages those links and uses proprietary technologies to illustrate the connections between court documents as they move through the judicial system. Additionally, researchers can simply click icons to open the full text documents on Westlaw.

"In our tests, researchers using Graphical Keycite understood the direct history of cases faster and more accurately," said Mike Bernstein, senior director of Westlaw Marketing for Thomson West. "For anyone performing citation research, a Graphical KeyCite picture is definitely worth a thousand words.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A computer-implemented method for determining legal case history, comprising:
   receiving a request for a legal case history;
   identifying, in response to the request, the legal case history; and
   providing a set of data associated with a representation of the legal case history, wherein the representation comprises a parent case, at least one related case and a visual indicator connecting the parent case to the at least one related case.

2. An apparatus, comprising:
   one or more network interfaces to communicate with a computer network;
   a processor coupled to the network interfaces and adapted to execute one or more processes; and
   a memory configured to store a process executable by the processor, the process when executed operable to:
     receive a request for a legal case history;
     identify, in response to the request, the legal case history; and
     provide a set of data associated with a representation of the legal case history, wherein the representation comprises a parent case, at least one related case and a visual indicator connecting the parent case to the at least one related case.

3. The method of claim 1 wherein the representation of the legal case history is adapted to be displayed.

4. The method of claim 1 wherein the legal case history is associated with at least one piece of text in a document.

5. The method of claim 1 wherein the receiving step includes receiving the request from a client computer device.

6. The method of claim 1, further including the step of identifying occurrences of a piece of text having a predetermined format in a document.

7. The method of claim 1, further including the steps of: determining a legal case history for at least one piece of formatted text in the document and storing the legal case history in a database.

8. The method of claim 1, wherein the at least one related case comprises at least one of a child case and a lateral litigation case.

9. The method of claim 1 wherein the providing step includes configuring the set of data to display the legal case history on a client computer device in a graphical flow-chart format, wherein the graphical flow-chart format includes a graphical representation of a parent case and a graphical representation of at least one related case, the graphical representation of the parent case being visually connected to the graphical representation of the related case by a visual indicator, the graphical representations of the parent case and at least one related case being positioned to illustrate a relationship between the cases.

10. The apparatus as in claim 2 wherein the representation of the legal case history is adapted to be displayed.

11. The apparatus as in claim 2 wherein the legal case history is associated with at least one piece of text in a document.

12. The apparatus as in claim 2 wherein the receiving step includes receiving the request from a client computer device.

13. The apparatus as in claim 2, wherein the process when executed is further operable to identify occurrences of a piece of text having a predetermined format in a document.

14. The apparatus as in claim 2, wherein the process when executed is further operable to determine a legal case history for at least one piece of formatted text in the document and storing the legal case history in a database.

15. The apparatus as in claim 2, wherein the at least one related case comprises at least one of a child case and a lateral litigation case.

16. The apparatus as in claim 2, wherein the providing step includes configuring the set of data to display the legal case history on a client computer device in a graphical flow-chart format, wherein the graphical flow-chart format includes a graphical representation of a parent case and a graphical representation of at least one related case, the graphical representation of the parent case being visually connected to the graphical representation of the related case by a visual indicator, the graphical representations of the parent case and at least one related case being positioned to illustrate a relationship between the cases.

17. The method of claim 4 wherein the at least one piece of text is a legal citation and the document is a legal case.

18. The method of claim 5 wherein the set of data is operative to generate at least a portion of a user interface on the client computer device.

19. The method of claim 7, wherein the identifying step includes searching the database to retrieve the requested legal case history.

20. The method of claim 9, wherein the visual indicator is an arrow.

21. The method of claim 9, further comprising configuring the set of data such that the graphical representations are positioned within one of a plurality of designated court-level zones, with each court-level zone representing a tier of a court system.

22. The method of claim 9, further comprising configuring the set of data to display a case validity indicator, the case validity indicator being adjacent to each graphical representation in the graphical flow-chart format.

23. The method of claim 9, further comprising configuring the set of data such that a hyperlink is embedded within the graphical representation for the parent case and the at least one related case, wherein the embedded hyperlink is selectable to initiate retrieval of a corresponding legal case document.

24. The method of claim 9, further comprising configuring the set of data such that the graphical representation of the parent case and the graphical representation of the at least one related case are positioned in the graphical flow-chart format according to a set of rules.

25. The apparatus as in claim 11 wherein the at least one piece of text is a legal citation and the document is a legal case.

26. The apparatus as in claim 12 wherein the set of data is operative to generate at least a portion of a user interface on the client computer device.

27. The apparatus as in claim 14, wherein the identifying step includes searching the database to retrieve the requested legal case history.

28. The apparatus as in claim 16, wherein the visual indicator is an arrow.

29. The apparatus as in claim 16, wherein the process when executed is further operable to configure the set of data such that the graphical representations are positioned within one of a plurality of designated court-level zones, with each court-level zone representing a tier of a court system.

30. The apparatus as in claim 16, wherein the process when executed is further operable to configure the set of data to display a case validity indicator, the case validity indicator being adjacent to each graphical representation in the graphical flow-chart format.

31. The method of claim 24, wherein the set of rules includes the following rule: when the parent case has one or more related cases that are children to the parent case, and where the parent and child cases are decided in different courts, the graphical representation of the parent case is positioned visually below the graphical representations of the child cases.

32. The method of claim 24, wherein the set of rules includes the following rule: when the parent case has one or more related cases that are children to the parent case, and where the parent and child cases are decided in the same court, the graphical representation of the parent case is positioned visually to the left of the graphical representations of the child cases.

33. The method of claim 24, wherein the set of rules includes the following rule: when the parent case has more than one child case, the graphical representations of each child case are positioned visually by date of decision, with an earliest date of decision child case positioned on the left and a latest date of decision child case positioned on the right.

34. The apparatus as in claim 16, wherein the process when executed is further operable to configure the set of data such that a hyperlink is embedded within the graphical representation for the parent case and the at least one related case, wherein the embedded hyperlink is selectable to initiate retrieval of a corresponding legal case document.

35. The apparatus as in claim 16, wherein the process when executed is further operable to configure the set of data such that the graphical representation of the parent case and the graphical representation of the at least one related case are positioned in the graphical flow-chart format according to a set of rules.

36. The apparatus as in claim 35, wherein the set of rules includes the following rule: when the parent case has one or more related cases that are children to the parent case, and where the parent and child cases are decided in different courts, the graphical representation of the parent case is positioned visually below the graphical representations of the child cases.

37. The apparatus as in claim 35, wherein the set of rules includes the following rule: when the parent case has one or more related cases that are children to the parent case, and where the parent and child cases are decided in the same court, the graphical representation of the parent case is positioned visually to the left of the graphical representations of the child cases.

* * * * *